United States Patent
Abe et al.

(10) Patent No.: US 7,673,320 B2
(45) Date of Patent: Mar. 2, 2010

(54) INFORMATION TRANSMISSION/RECEPTION SYSTEM AND METHOD AND INFORMATION PROCESSING METHOD AND APPARATUS FOR AUTOMATIC DETECTION OF DATA FOR COMMERCIAL MESSAGES

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 09/887,491

(22) Filed: Jun. 22, 2001

(65) Prior Publication Data

US 2002/0069408 A1 Jun. 6, 2002

(30) Foreign Application Priority Data

Jun. 22, 2000 (JP) ............................ P2000-188495

(51) Int. Cl.
*H04N 7/173* (2006.01)
*H04N 7/10* (2006.01)
*H04N 7/025* (2006.01)

(52) U.S. Cl. .................. 725/110; 725/32; 725/105; 725/115

(58) Field of Classification Search ................ 725/110, 725/112

See application file for complete search history.

(56) References Cited

U.S. PATENT DOCUMENTS 3,919,479 A * 11/1975 Moon et al. ................. 704/237
5,585,858 A * 12/1996 Harper et al. ............... 348/485
5,600,364 A * 2/1997 Hendricks et al. ............ 725/9
5,761,606 A * 6/1998 Wolzien ...................... 725/110
5,818,441 A * 10/1998 Throckmorton et al. ..... 715/717
5,929,849 A * 7/1999 Kikinis ....................... 725/113
5,957,695 A * 9/1999 Redford et al. .......... 434/307 R
5,987,509 A * 11/1999 Portuesi ...................... 725/113
6,018,768 A * 1/2000 Ullman et al. .............. 709/218
6,025,837 A * 2/2000 Matthews et al. ........... 715/721

(Continued)

FOREIGN PATENT DOCUMENTS

JP 07-079206 3/1995

(Continued)

OTHER PUBLICATIONS

Japanese Patent Office Action corresponding to Japanese Serial No. 2000-188495 dated Oct. 27, 2009.

*Primary Examiner*—Christopher Kelley
*Assistant Examiner*—Justin E Shepard
(74) *Attorney, Agent, or Firm*—Sonnenschein Nath & Rosenthal LLP

(57) ABSTRACT

It is targeted that CMs by e.g., television broadcast be detected automatically, an access site to detailed contents of a specified one of the CMs be acquired automatically, and connection be made automatically to the access site to enable accessing to the detailed information. A broadcasting station 302 sends out airing signals containing CMs. A consumer terminal (303) detects these CMs from the aired signals and connects to an access site information furnishing device (305) based on the airing time and the airing channel of the detected CM to acquire the access site information of the distribution terminal (301) for e.g., an article of commerce owning the detailed information pertinent to the CM. Based on the access site information, the consumer terminal (303) accesses the distribution terminal (301) to acquire the detailed information pertinent to the CM.

31 Claims, 36 Drawing Sheets

U.S. PATENT DOCUMENTS

| | | | | |
|---|---|---|---|---|
| 6,061,719 A * | 5/2000 | Bendinelli et al. | | 709/218 |
| 6,177,931 B1 * | 1/2001 | Alexander et al. | | 725/52 |
| 6,215,483 B1 * | 4/2001 | Zigmond | | 725/112 |
| 6,226,444 B1 * | 5/2001 | Goldschmidt Iki et al. | | 386/83 |
| 6,330,595 B1 * | 12/2001 | Ullman et al. | | 709/219 |
| 6,530,084 B1 * | 3/2003 | Del Sesto et al. | | 725/61 |
| 6,560,777 B2 * | 5/2003 | Blackketter et al. | | 725/110 |
| 6,721,958 B1 * | 4/2004 | Dureau | | 725/136 |
| 6,745,223 B1 * | 6/2004 | Nobakht et al. | | 709/200 |
| 6,862,611 B1 * | 3/2005 | Marics et al. | | 709/218 |
| 2001/0042249 A1 * | 11/2001 | Knepper et al. | | 725/42 |
| 2002/0001042 A1 * | 1/2002 | Terakado et al. | | 348/460 |
| 2002/0015105 A1 | 2/2002 | Abe et al. | | |
| 2002/0021759 A1 | 2/2002 | Abe et al. | | |

FOREIGN PATENT DOCUMENTS

| | | |
|---|---|---|
| JP | 09-102944 | 4/1997 |
| JP | 9-160852 | 6/1997 |
| JP | 09-162818 | 6/1997 |
| JP | 10-056632 | 2/1998 |
| JP | 2000-032405 | 1/2000 |

* cited by examiner

| ITEM | SYMBOL | UNIT | EXAMPLE OF INDISPENSABLE CONDITION (19a) | EXAMPLE OF SUPPLEMENTARY CONDITIONS (20a) | EXAMPLE OF DECISION (21a) |
|---|---|---|---|---|---|
| START TIME | Ts | HOUR, MINUTES, SEC | 1:23'45 | 1:23'45 | 1:23'45 |
| LENGTH (SOUND LENGTH) | Tw | SEC | 14.63 | 14.63 | 14.63 |
| FORE BREAK LENGTH | Q1 | ms | - | 300.0 | 300.0 |
| BACK BREAK LENGTH | Q2 | ms | - | 300.0 | 300.0 |
| FORE BREAK MIN AMPLITUDE | Q3 | NOTE | - | 0.00015 | 0.00015 |
| BACK BREAK MIN AMPLITUDE | Q4 | NOTE | - | 0.00020 | 0.00020 |
| LEFT/RIGHT CORRELATION | Q5 | - | - | 0.934 | 0.934 |
| AVERAGE AMPLITUDE | Q6 | NOTE | - | 0.010 | 0.010 |
| NUMBER OF CUTS | Q7 | NUMBER | - | 9 | 9 |
| AIRING MODE | Q8 | - | - | 1 | 1 |
| NUMBER OF NEIGHBOURING CANDIDATES | Q9 | NUMBER | - | 2 | 2 |
| FORE SPECTRUM DIFFERENCE ENERGY | Q10 | - | - | 0.41 | 0.41 |
| BACK SPECTRUM DIFFERENCE ENERGY | Q11 | - | - | 0.63 | 0.63 |
| SCORE | R | - | - | - | 1.80 |
| SCORE DECISION RESULT | Z | - | - | - | 1 |

NOTE : AMPLITUDE VALUE OF AUDIO SIGNAL IS INDICATED AS RATIO TO MAX AMPLITUDE

FIG.15

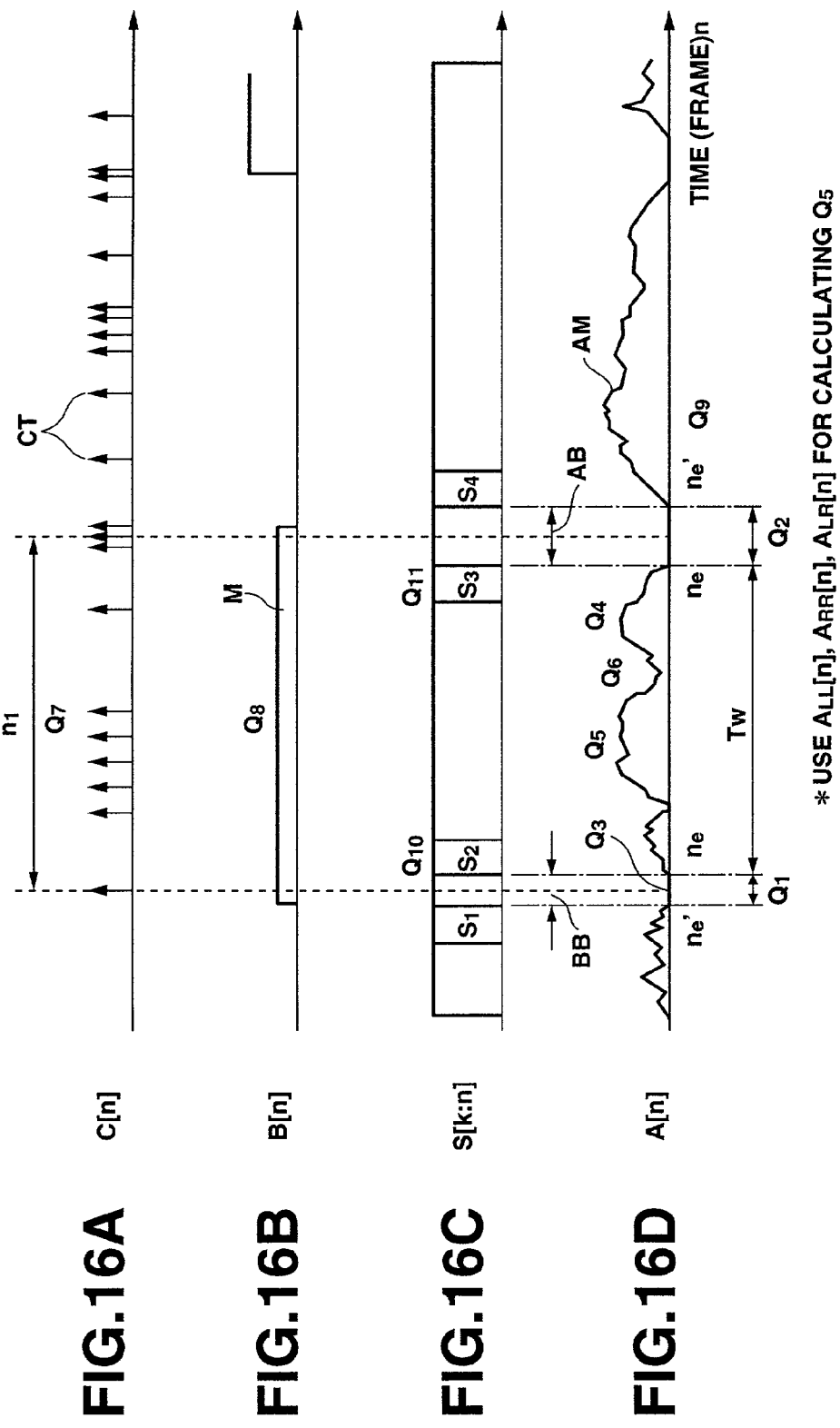

| ITEM | SYMBOL | UNIT | EXAMPLE OF INDISPENSABLE CONDITION (19a) | EXAMPLE OF SUPPLEMENTARY CONDITIONS (20a) | EXAMPLE OF DECISION (21a) |
|---|---|---|---|---|---|
| POSSIBLE PRESENCE OF SPEECH | Q12 | - | - | 1 | 1 |
| POSSIBLE PRESENCE OF MUSIC | Q13 | - | - | 1 | 1 |
| TIME ZONE POSSIBILITY | Q14 | - | - | 0.15 | 0.15 |
| PROGRAM GENRE PROBABILITY | Q15 | - | - | 0.1 | 0.1 |

FIG.24

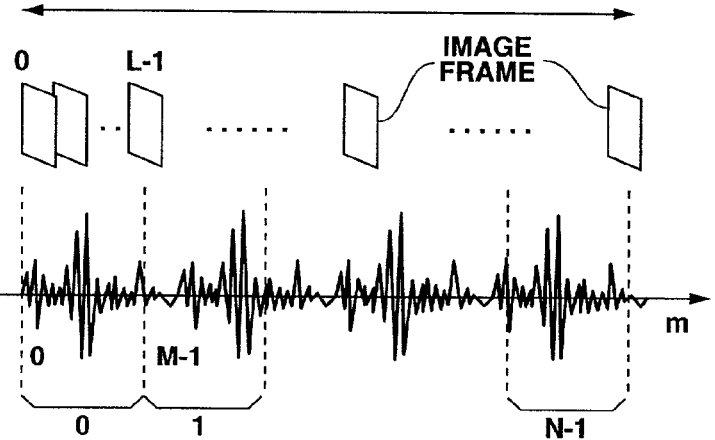
FIG.29A
FIG.29B
FIG.29C
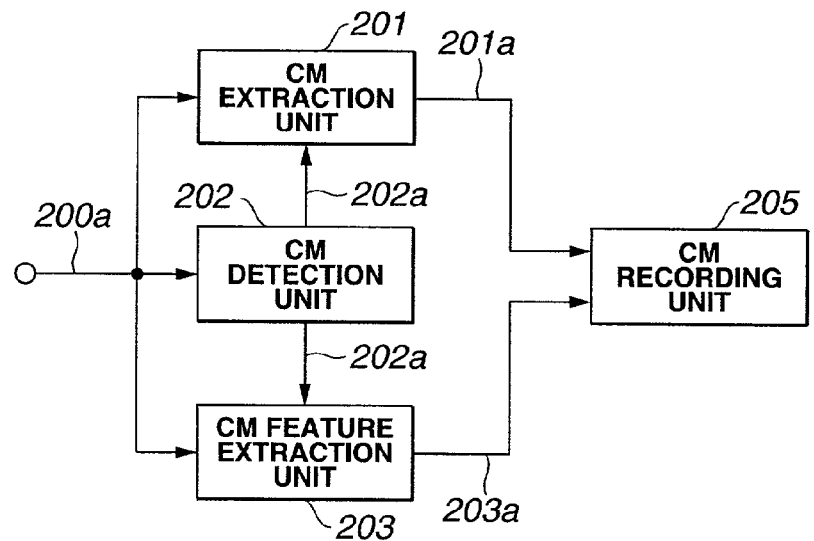
FIG.30

INFORMATION TRANSMISSION/RECEPTION SYSTEM AND METHOD AND INFORMATION PROCESSING METHOD AND APPARATUS FOR AUTOMATIC DETECTION OF DATA FOR COMMERCIAL MESSAGES

RELATED APPLICATION DATA

The present application claims priority to Japanese Application No. P2000-188495 filed Jun. 22, 2000, which application is incorporated herein by reference to the extent permitted by law.

BACKGROUND OF THE INVENTION

1. Field of the Invention

This invention relates to a system and a method for transmitting/receiving the detailed information pertinent to a commercial message, aired using television broadcast signals, by way of an example, and to a method and apparatus for processing the information.

2. Description of Related Art

Up to now, the commercial message, abbreviated herein to CM, furnished by e.g., television broadcast, has been retained to be effective as intuitive information purveying means for consumers at large.

However, with the CM, it is difficult to furnish the detailed information mainly due to temporal limitations, that is the time zone or the time length in which it is aired, or to properties of the image or the speech as information transmitting means. So, a consumer desirous to know the detailed information about CM contents, such as the detailed information pertinent to the commercial articles or services, or to purchase a commercial article or services, has to resort to such measures as telephone or mail or direct contact with distributors. In particular, as to the site of contact from which to acquire the detailed information concerning the CM contents, it is generally up to the knowledge or search on the part of the consumer, even granting that the telephone number, for example, is aired simultaneously with the CM.

On the other hand, the technique of browsing the information employing the Internet has come into widespread use. In particular, the role of home pages in WWW (World Wide Web) as advertizing means for an enterprise or an organization is increasing. Moreover, for the consumers at large, the general tendency is to have reference to the home pages in order to know the detailed information pertinent to the CM contents or in order to purchase the articles of commerce or services. However, there lacks direct means for interconnecting the CM broadcast by e.g., the televison broadcast and the home pages in the WWW on the Internet. Thus, if a consumer apprized of the articles of commerce or service by e.g., the television broadcast and desires to obtain the information of the contents of the articles of commerce or service, he or she has to check for an access site furnishing the information on his or her own and to make connection to the access site using a separate computer or the like device, such as a personal computer.

SUMMARY OF THE INVENTION

It is therefore an object of the present invention to provide an information transmitting/receiving system and method and an information processing method and apparatus which automatically detects the CM by e.g., the television broadcast and automatically acquires the access site of detailed contents pertinent to the CM from the television broadcast to make automatic connection to the access site to enable the acquisition of the detailed information.

In one aspect, the present invention provides an information transmission/reception system comprising transmission means for generating and sending out a transmission signal containing a pre-set signal, detailed information furnishing means for furnishing detailed information related to said pre-set signal, access site information furnishing means for furnishing access site information corresponding to said detailed information furnishing means, and signal processing means including a detecting section for detecting said pre-set signal from said transmission signal sent out from said transmission means, a first connecting section for connecting to said access site information furnishing means, a first acquisition section for acquiring the access site information corresponding to the pre-set signal detected by said detecting section from the access site information furnishing means connected to said first connecting section, a second connecting section for connecting to said detailed information furnishing means based on the access site information acquired by said first acquisition section, and a second acquisition section for acquiring the detailed information related to the pre-set signal detected by said detecting section from the detailed information furnishing means connected to said second connecting section.

In another aspect, the present invention provides an information processing apparatus comprising a reception section for receiving a transmission signal containing a pre-set signal, a detection section for detecting said pre-set signal from the transmission signal received by said reception section, a first connecting section for connecting to access site information furnishing means for furnishing access site information corresponding to detailed information furnishing means for furnishing the detailed information related to said pre-set signal, a first acquisition section for acquiring the access site information corresponding to the pre-set signal detected by said detecting section from said access site information furnishing means connected to said first connecting section, a second connecting section for connecting to said detailed information furnishing means based on the access site information acquired by said first acquisition section, and a second acquisition section for acquiring the detailed information related to said pre-set signal detected by said detecting section from the detailed information furnishing means connected to said second connecting section.

In still another aspect, the present invention provides an information processing apparatus comprising a database section for registering at least a pre-set signal sent out as a transmission signal, and access site information corresponding to detailed information furnishing means for furnishing detailed information related to said pre-set signal, a reception section for receiving the transmission signal containing said pre-set signal, a detection section for extracting said pre-set signal from the transmission signal received by said reception section and for detecting transmission time of said pre-set signal in said transmission signal and a frequency or a transmission channel of said transmission signal, and database referencing means for referencing said pre-set signal registered in said database section, based on said pre-set signal detected by said detecting section, and for correlating said pre-set signal registered in said database section and the transmission time and the frequency or the transmission channel of said transmission signal with said access site information.

In still another aspect, the present invention provides an information transmission/reception system comprising detailed information furnishing means for furnishing detailed information related to a pre-set signal, transmission means for generating and sending out a transmission signal containing said pre-set signal and access site information corresponding to said detailed information furnishing means, and signal processing means including a detecting section for detecting said pre-set signal and the access site information corresponding to said pre-set signal from said transmission signal sent out from said transmission means, a connecting section for connecting to said detailed information furnishing means based on said pre-set signal and the access site information detected by said detecting section and an acquisition section for acquiring the detailed information related to said pre-set signal detected by said detecting section from said detailed information furnishing means connected to said connecting section.

In still another aspect, the present invention provides An information processing apparatus comprising a reception section for receiving a transmission signal containing a pre-set signal and access site information corresponding to detailed information furnishing means for furnishing the detailed information related to said pre-set signal, a detecting section for detecting said pre-set signal and the access site information from the transmission signal received by said reception section, a connecting section for connecting to said detailed information furnishing means based on said pre-set signal and the access site information detected by said detecting section, and an acquisition section for acquiring the detailed information related to said pre-set signal detected by said detecting section from the detailed information furnishing means connected to said connecting section.

In still another aspect, the present invention provides a method for transmitting/receiving information comprising the steps of providing detailed information related to a pre-set signal, providing access site information corresponding to said detailed information, generating and sending out a transmission signal containing said pre-set signal, detecting said pre-set signal from said transmission signal sent out, acquiring the access site information corresponding to the detailed information related to said pre-set signal based on said detected pre-set signal, and acquiring the detailed information related to the detected pre-set signal based on the acquired access site information.

In still another aspect, the present invention provides an information processing method comprising the steps of receiving a transmission signal containing a pre-set signal, detecting said pre-set signal from the received transmission signal, connecting to access site information furnishing means for furnishing access site information corresponding to detailed information furnishing means for furnishing detailed information related to said pre-set signal, acquiring the access site information corresponding to the detected pre-set signal from the connected access site information furnishing means, connecting to said detailed information furnishing means based on the acquired access site information, and acquiring the detailed information related to the detected pre-set signal from the connected access site information furnishing means.

In still another aspect, the present invention provides an information processing method comprising the steps of registering at least a pre-set signal sent out as a transmission signal and access site information corresponding to detailed information furnishing means for furnishing detailed information related to said pre-set signal;

receiving the transmission signal containing said pre-set signal, extracting said pre-set signal from the received transmission signal and detecting transmission time of said pre-set signal and a frequency or a channel of said transmission signal, and referencing said registered pre-set signal based on the extracted pre-set signal and correlating the transmission time of said registered pre-set signal and the frequency or channel of said transmission signal with said access site information.

In still another aspect, the present invention provides an information transmitting/receiving method comprising the steps of providing detailed information related to a pre-set signal, generating and sending out a transmission signal containing said pre-set signal and access site information corresponding to said detailed information, detecting said pre-set signal and the access site information corresponding to said pre-set signal from said sent out transmission signal, and acquiring the detailed information related to said detected pre-set signal based on said detected pre-set signal and said access site information.

In yet another aspect, the present invention provides an information processing method comprising the steps of receiving a transmission signal containing a pre-set signal and access site information corresponding to detailed information furnishing means for furnishing detailed information related to said pre-set signal, detecting said pre-set signal and the access site information from said transmission signal received by said receiving section, connecting to said detailed information furnishing means based on the detected pre-set signal and the detected access site information detected; and acquiring the detailed information related to the detected pre-set signal from the connected detailed information furnishing means.

According to the present invention, the access site information o the detailed information pertinent to a pre-set signal contained in a transmission signal is acquired, based on a pre-set signal contained in a transmission signal, and the detailed information pertinent to the pre-set signal is acquired based on the access site information acquired. This allows to detect CMs contained in aired TV signals, to acquire an access site for detailed contents pertinent to a specified one of the CMs automatically and to connect to the access site to access the detailed information.

BRIEF DESCRIPTION OF THE DRAWINGS

FIG. 15 shows a CM candidate table in the CM detection unit of a specified embodiment.

FIGS. 16A-D illustrate a CM candidate table in an additional condition calculating unit of the CM detection unit.

FIG. 24 shows a CM candidate table (only an expanded portion) in the second embodiment of the CM detection unit.

FIG. 29 illustrates discretization of input speech signal and the image signal and the frame.

FIG. 30 is a schematic block diagram showing a subset of a CM detection unit, a CM extraction unit and a CM recording unit in the present embodiment of a CM detection/accumulation/browsing/retrieval unit.

DESCRIPTION OF THE PREFERRED EMBODIMENTS

Figure 1:
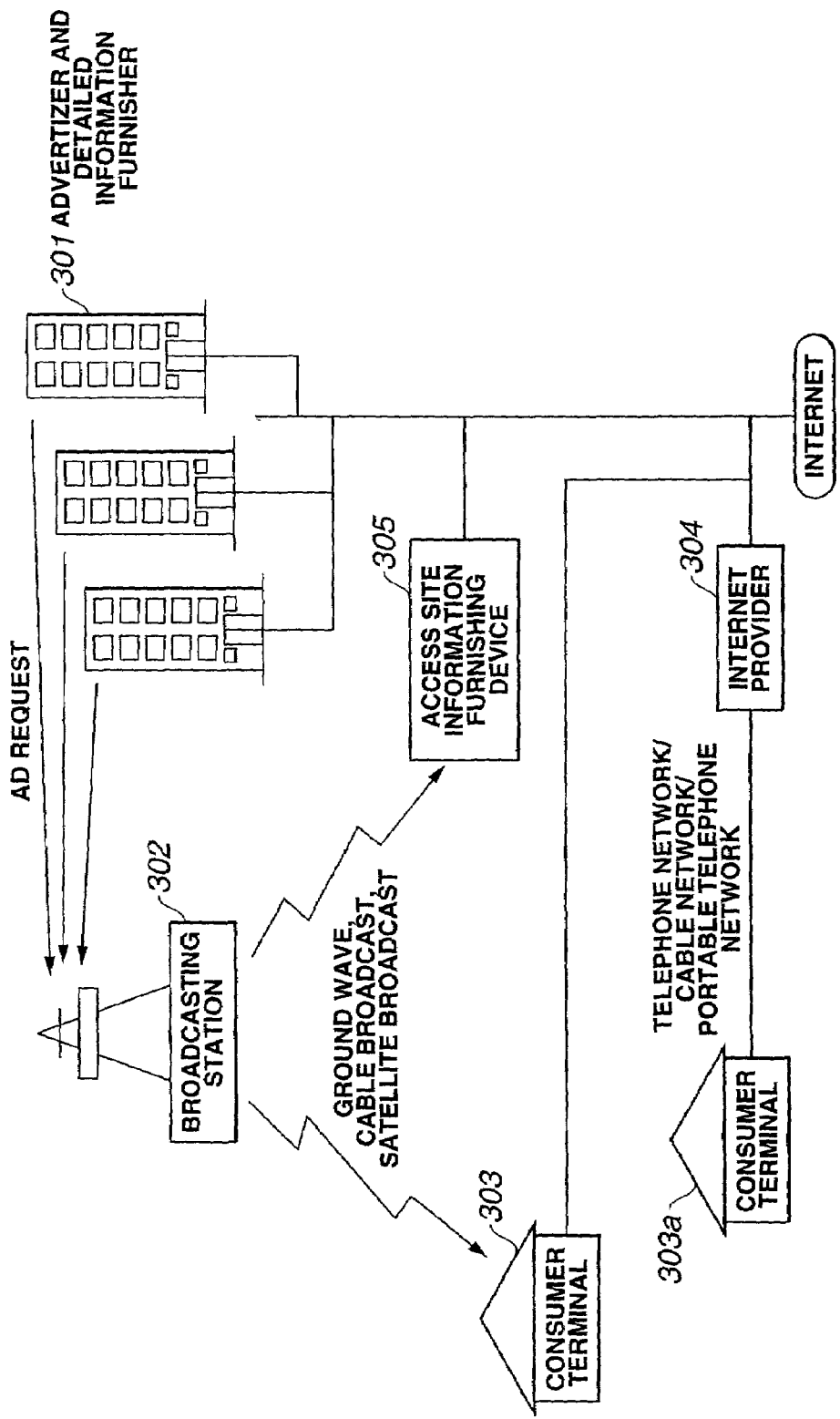
FIG. 1 illustrates schematics of a connecting state of the entire system employing the present invention.

Referring to the drawings, preferred embodiments of the present invention will be explained in detail.

Figure 2:
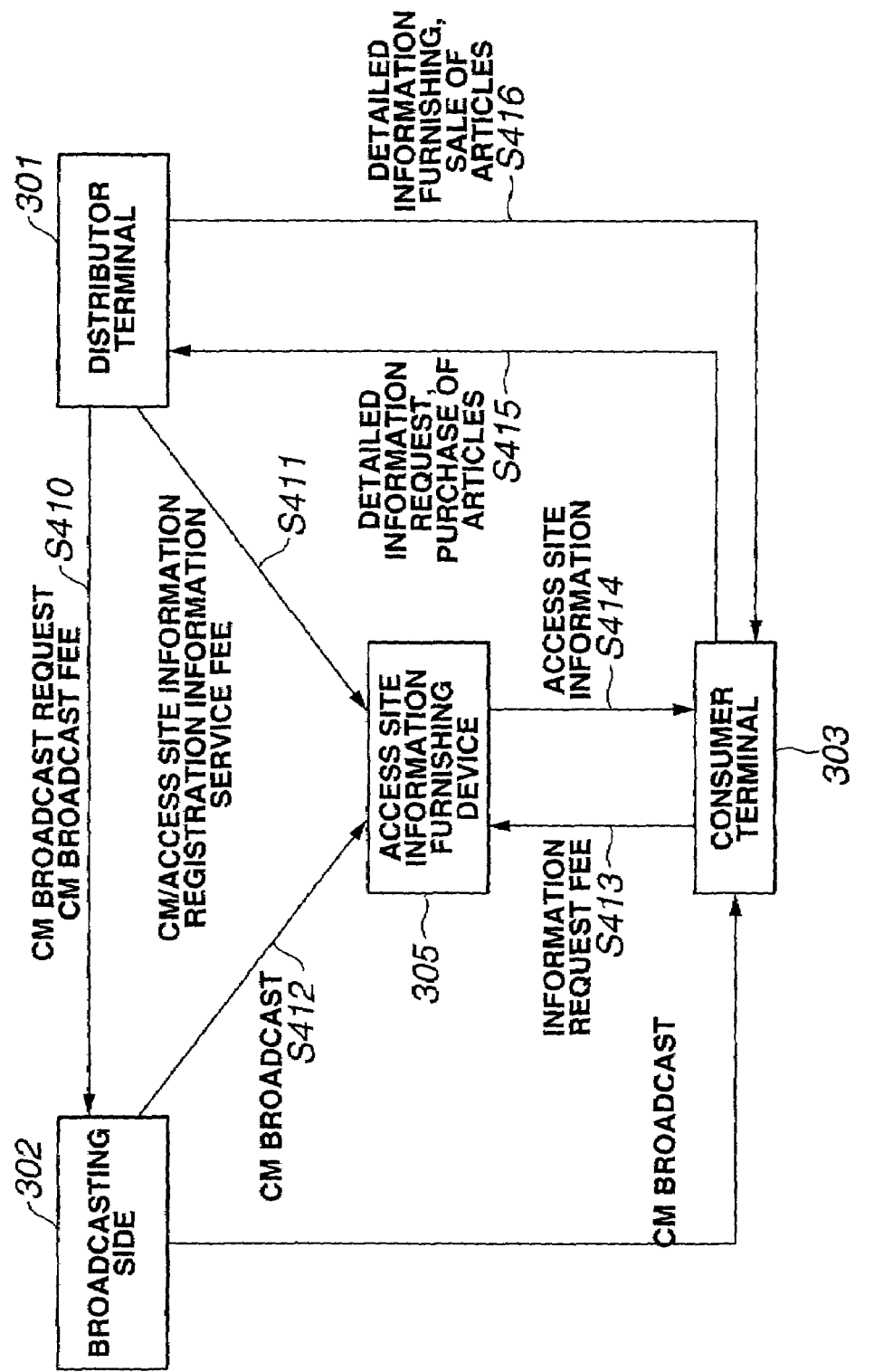
FIG. 2 illustrates the information flow in the connecting state of the system embodying the present invention.
Figure 3:
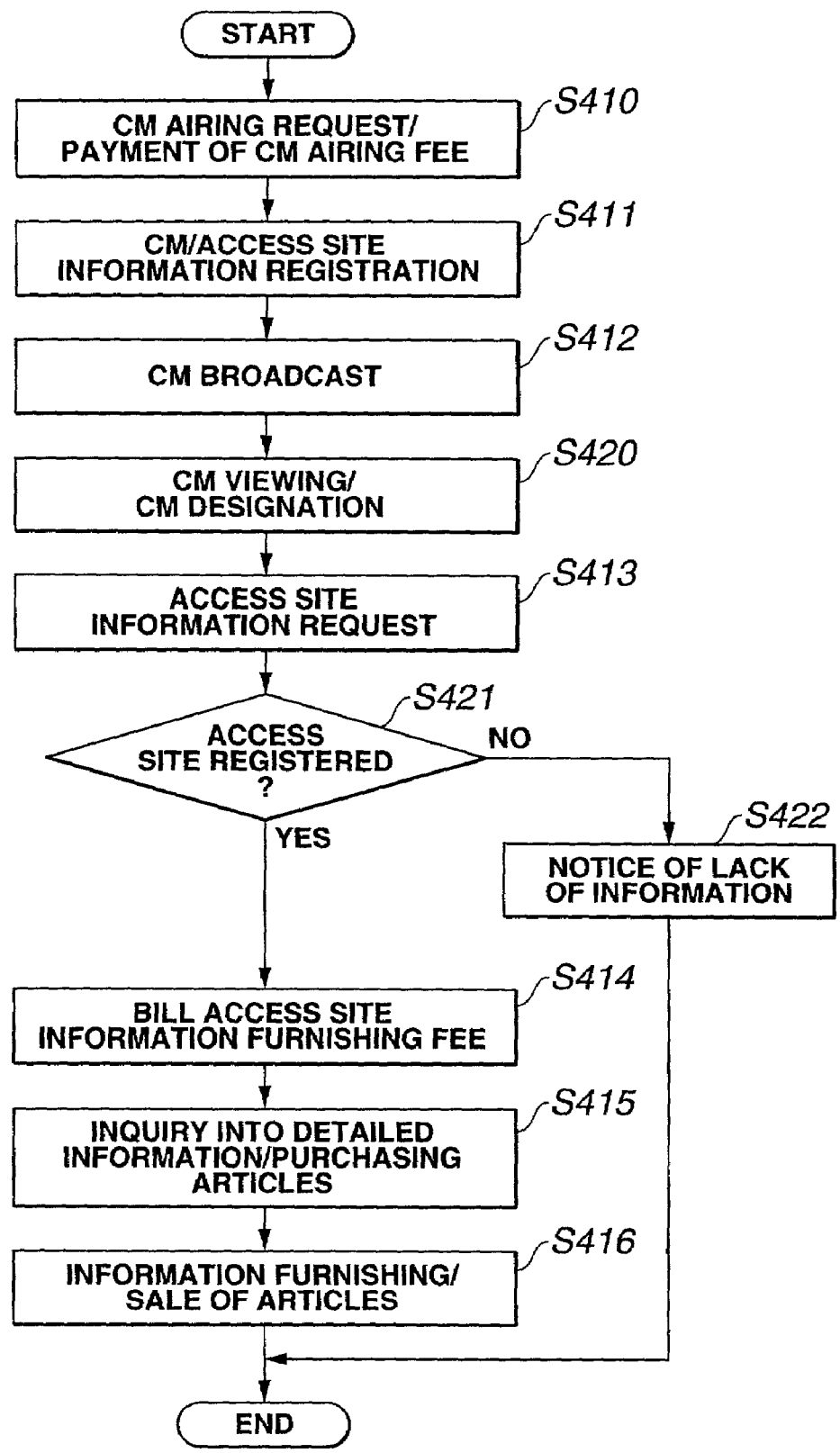
FIG. 3 is a flowchart showing the flow of operations of the entire system embodying the present invention.

FIG. 1 shows schematics of the connecting state of the entire system embodying the present invention. FIGS. 2 and 3 schematically show the information flow in the connected state of the system embodying the present invention and the flow of operations of the entire system, respectively. In these figures, the common states and operations are denoted by common indicating numerals.

The system of the present embodiment includes a distribution terminal 301 for articles of commerce, a broadcasting station 302, an access site information furnishing device 305, a consumer terminal 303 (303a) and an Internet provider 304.

It is noted that the distribution terminal 301 is a terminal managed by a distributor of articles of commerce or services. First, at step S410, the CM broadcast is entrusted to the television broadcasting station 302. Meanwhile, the CM broadcast charges are paid by the distributor of e.g., the articles of commerce to the broadcasting station 302 simultaneously with a request for CM broadcast or following CM broadcast.

Moreover, the distribution terminal 301 at step S411 furnishes the information on the access site in connection with the image or speech of the CM aired, the articles of commerce or services, to the access site information furnishing device 305, and has the information registered. The service fee is paid from the distribution terminal 301 to the access site information purveyor simultaneously with or following the registration of the information at step S411.

The access site may, for example, be a URL (uniform resource location) on the Internet, an IP (Internet protocol) address or an E-mail address, and is a destination of connection or liaison over the public network to an access place for furnishing detailed explanation or sale of the articles of commerce or services. An access equivalent to the above-described access may, of course, be had by direct accessing over the telephone network, in addition to the public network.

The broadcasting station 302 then airs the CM at step S412 by e.g., the television broadcast.

The consumer terminal 303 at step S420 receives the CM, aired at step S412, in real-time, or records the CM in a CM server, as later explained. If an interesting CM is specified by the consumer, the consumer terminal 303 at step S413 requests the information as to the CM to the access site information furnishing device 305. The information request at this time is made over e.g., the public network by notifying the time and the channel in which the CM is aired. If necessary, the connection may be made through a server managed by a provider, such as the Internet provider 304.

The access site information furnishing device 305 then at step S421 retrieves, based on the aforementioned information request, whether or not the information on the access site pertinent to the detailed information concerning the requested CM has been registered. If the access site information has not been registered (NO), the absence of the registered access site information is notified at step S422 to the consumer terminal 303. If the access site information has been registered, the access site information furnishing device 305 at step S414 notifies the access site information to the consumer terminal 303 and bills the consumer for the counter value for the access site information furnished. The retrieval of the access site information corresponding to the information request at step S413 is made automatically by the access site information furnishing device 305. Based on the access site information, acquired at step S414, the consumer terminal 303 connects to the access site at step S415 to request the detailed information pertinent to the CM or to purchase the articles of commerce.

On the other hand, the distribution terminal 301 of the articles of commerce or services, thus accessed, executes business activities for the consumer at step S416, such as furnishment of the detailed information pertinent to the CM or sale of the articles of commerce.

Figure 4:
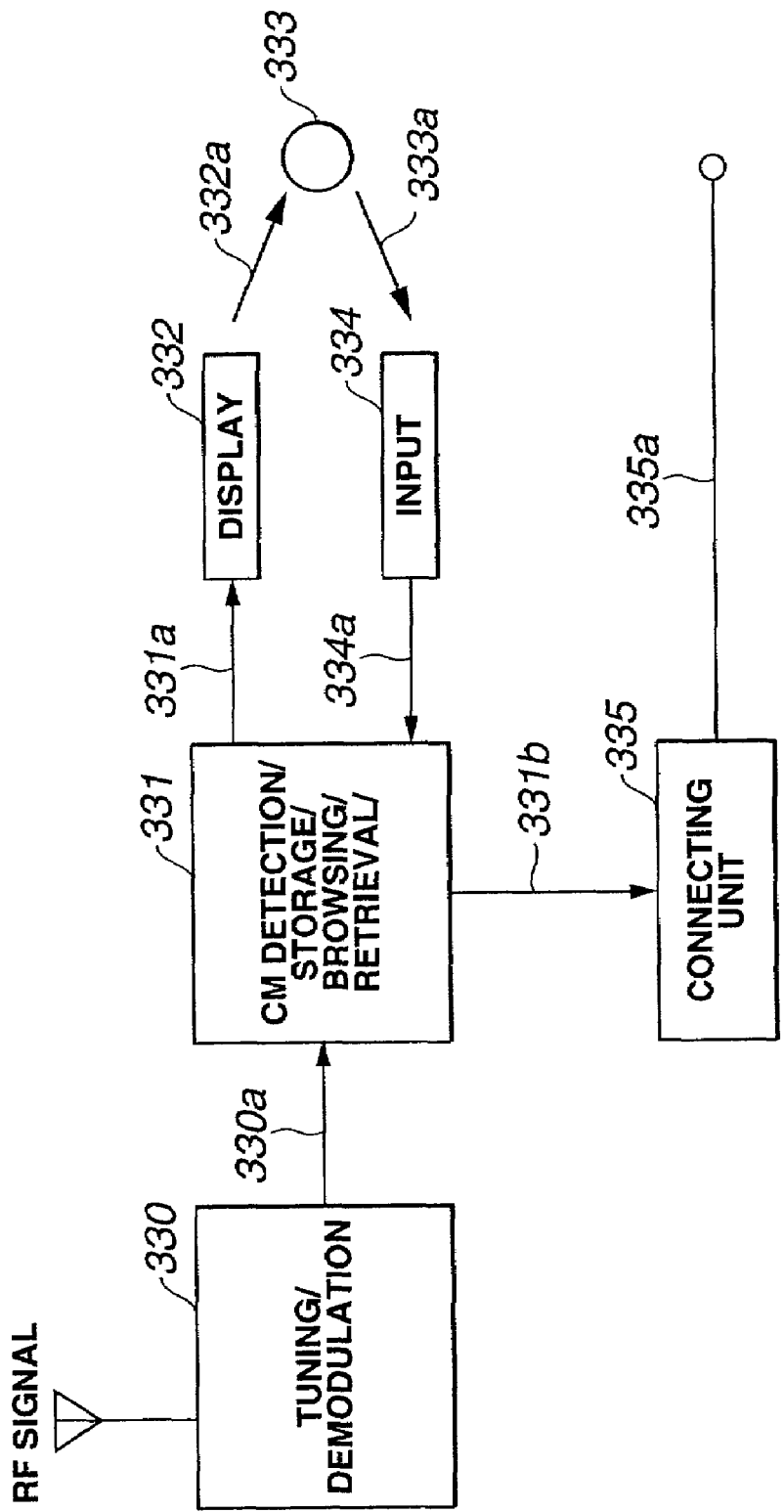
FIG. 4 is a block diagram showing the schematic construction of a CM server device used by the consumer in the system of the present invention.
Figure 5:
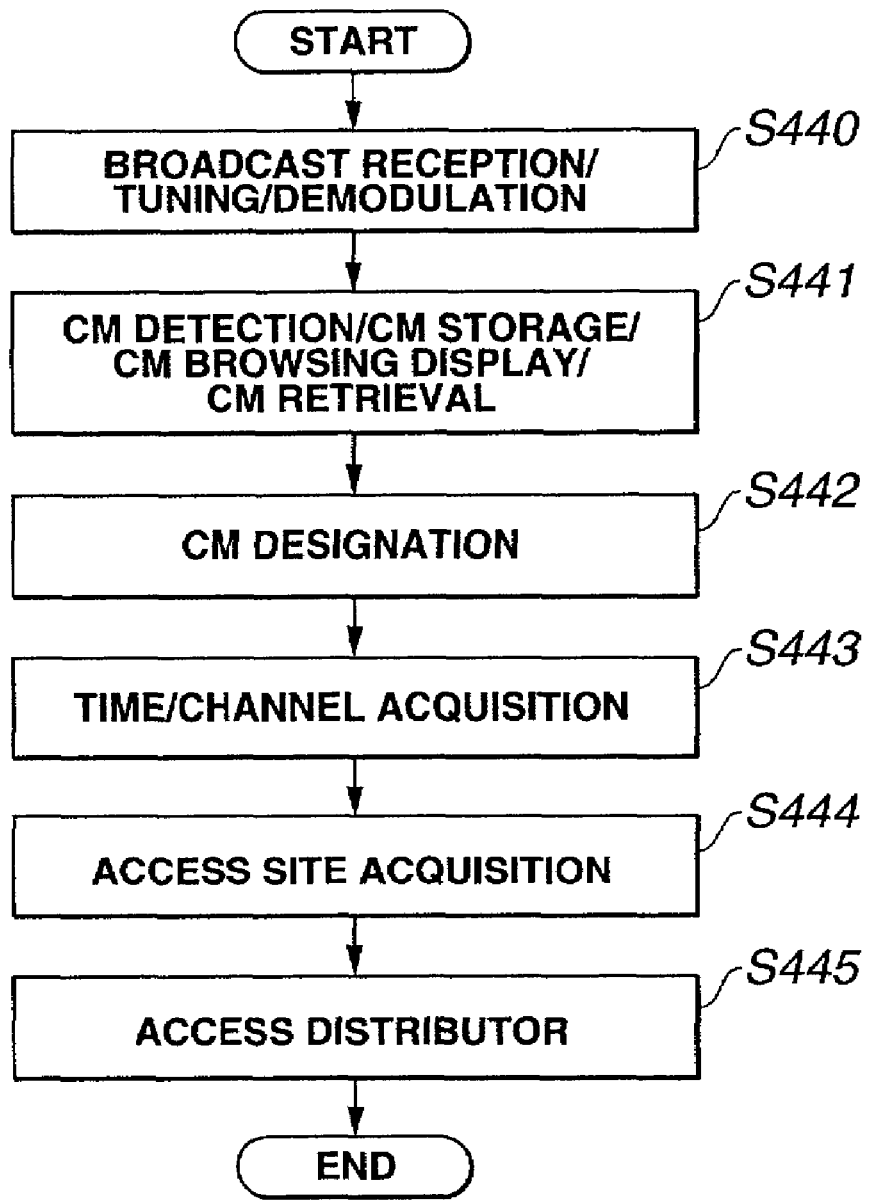
FIG. 5 is a flowchart showing the flow of operations of the CM server device.

FIGS. 4 and 5 show a schematic structure of the CM server device contained in the consumer terminal 303 and the flow of operations of the CM server device.

FIG. 4 shows a tuning/demodulating device 330 of the server device similar to those used in well-known manner in television or radio units, and which therefore is not explained here specifically. A display unit 332 is a unit used in a well-known manner in a CRT (cathode ray tube) or a liquid crystal display, whilst an input unit 334 is a user interface such as a well-known mouse or touch-panel. A connection unit 335 is a modem device or a network interfacing unit widely used in a computer, such as a personal computer, or in a portable telephone set. A CM detection/storage/browsing/retrieval unit 331 is such a device which retrieves and stores the CM portion from the aired signals and which is responsive to a request form a user (consumer) 333 to enable the stored CM to be browsed. The CM detection/storage/browsing/retrieval unit 331 will be explained in detail subsequently.

In this CM server device, RF signals, such as television or radio signals, as aired, are received over an antenna, at step S440, and are separated by the tuning/demodulating device 330 into speech a signal/video signal/control signal 330a and occasionally into program guide signals. These signals are sent to the CM detection/storage/browsing/retrieval unit 331.

The CM detection/storage/browsing/retrieval unit 331 at step S441 processes these signals, such as by CM detection, storage of the detected CM, and retrieval of the CM, as necessary. The CM image signals and/or speech signals 331a are sent to the display unit 332. The image signals in the image signals and/or speech signals 331 a are demonstrated at 332a by a display device of the display unit 332, whilst the speech signals are radiated at 332a from a loudspeaker attached to the display unit 332.

If a CM, the detailed information about which is desired by a user 333, is specified at 333a by the input unit 334, from among the CM the user browsed using the display unit 332, the CM detection/storage/browsing/retrieval unit 331 at step S443 acquires the airing time, frequency or channel of the specified CM, based on a selection command 334a from the input unit 334, and sends the information 33 lb on the airing time, frequency or channel to the connection unit 335.

The connection unit 335 connects to the access site information furnishing device 305, at step S444, through the public network or the telephone network 335a, to transmit the information 331b on the airing time, frequency or channel to acquire the information on the access site, that is the URL, E-mail address or the telephone number of the distribution terminal 301. The connection unit 335 at step S445 reconnects to the access site (distribution terminal 301) thus acquired over the public network or the telephone network 335a. This enables the CM server device to acquire the detailed information on the CM.

Figure 6:
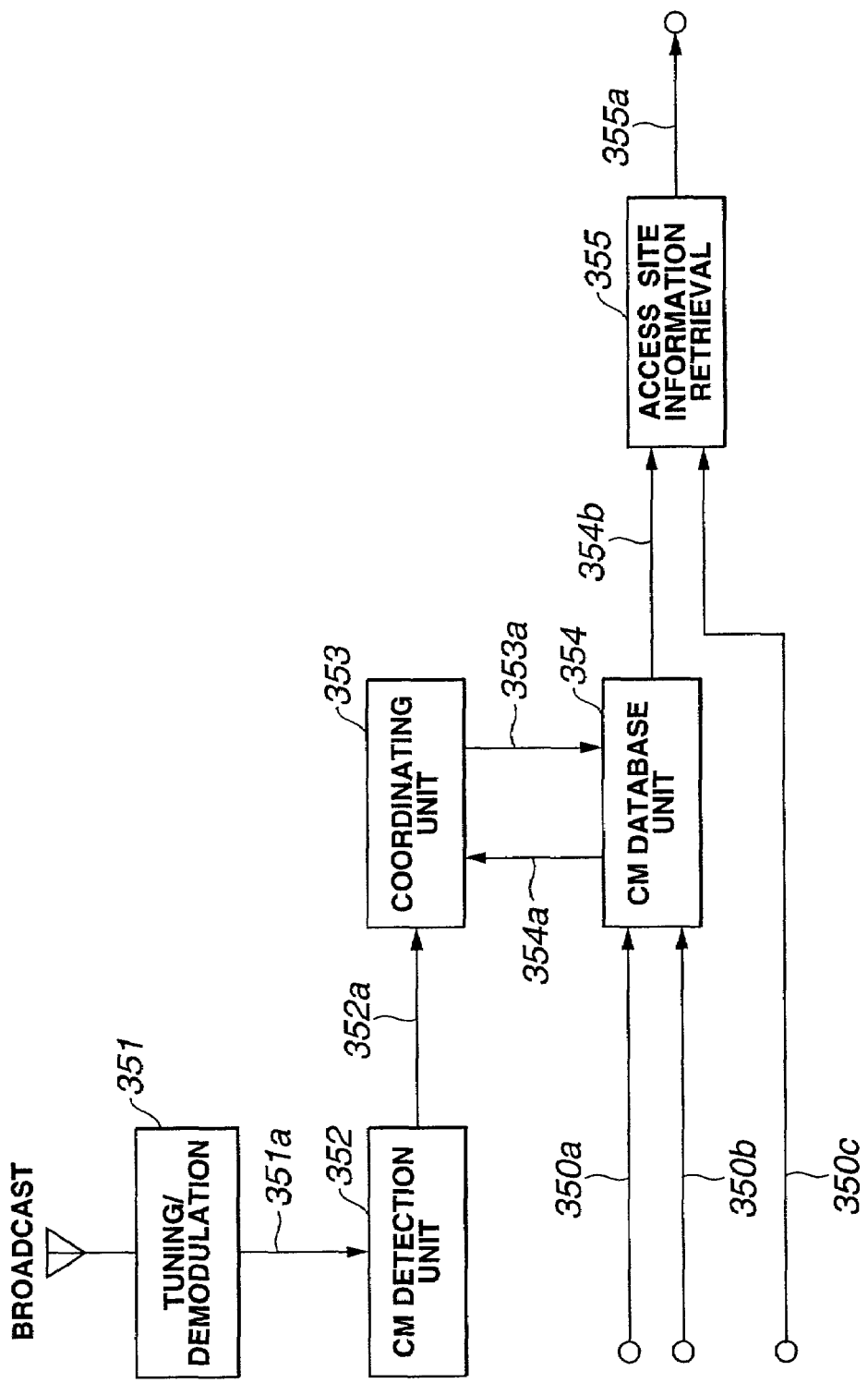
FIG. 6 is a block diagram showing the schematic structure of an access site information furnishing device in the present system.
Figure 7:
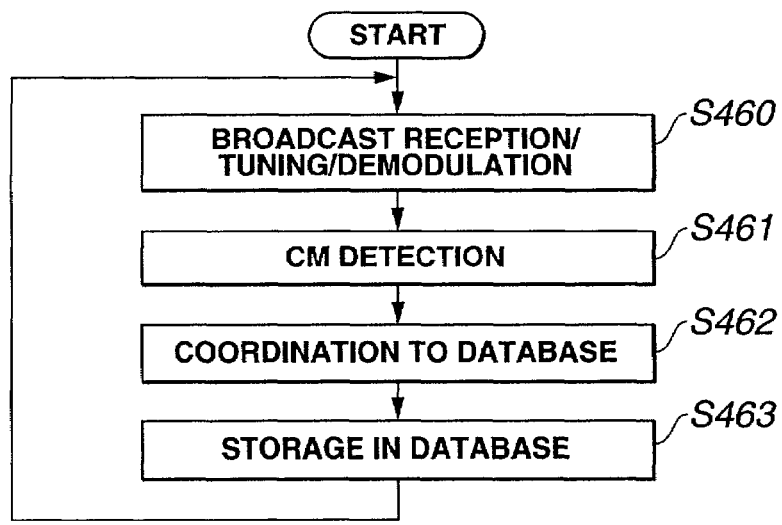
FIG. 7 is a flowchart showing the flow of the operation of generating the CM access site information in a CM access site information furnishing device.
Figure 8:
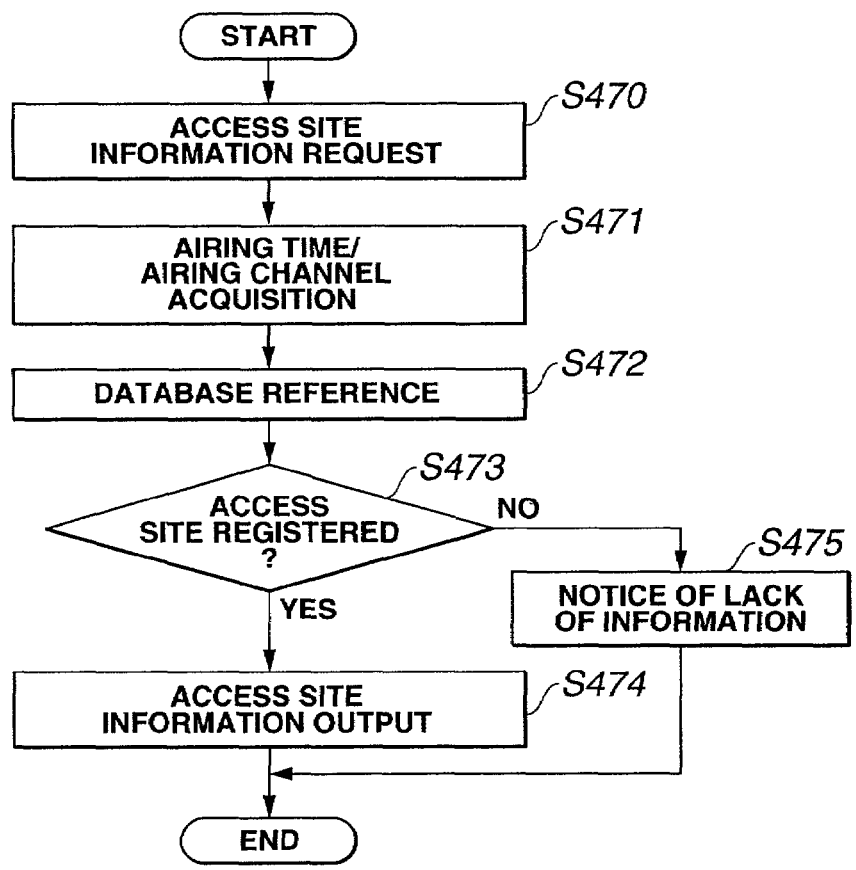
FIG. 8 is a flowchart showing the flow of the CM reference operation in the CM access site information furnishing device.

FIGS. 6, 7 and 8 show the schematic structure of the access site information furnishing device 305, the flow of operations of generating the information on the CM access site in the CM access site information furnishing device 305 and the flow of the CM referencing operation in the CM access site information furnishing device 305, respectively.

The CM information registered 350a and the CM access site information 350b, explained with reference to FIGS. 2 and 3, are acquired previously from the distribution terminal 301 or from the broadcasting station 302, so as to be afforded to and stored in a CM database unit 354. A tuning/demodulating device 351 is similar to those used in a well-known manner in the television or radio set and hence is not explained specifically.

In this access site information furnishing device 305, the RF signals are received at step S460 over the antenna and are separated by the tuning/demodulating device 351 into a speech signal/video signal/control signal 351a and occasionally into program guide signals. These signals are sent to a CM detection/storage/browsing/retrieval unit 352.

A CM detection unit 352 at step S461 separates and extracts the commercial portion from the aired signals to output the information 352a pertinent to the image, speech, airing time and airing channel to a coordinating unit 353. The CM detection unit 352 will be explained in detail subsequently.

The coordinating unit 353 at step S462 executes coincidence retrieval between the information 354a of the CM registered in the CM database of a CM database unit 354 and the information 352a of the CM detected by the CM detection unit 352 and, in case of coincidence, coordinates the CM, airing time and channel and the access site information at step S463 for re-storage in the CM database unit 354 This CM database unit 354 will be explained in detail subsequently.

A request 350c of the CM access site information, as explained with reference to FIGS. 2 and 3, is afforded from a consumer terminal 303, and is input at step S470 to an access site information retrieval unit 355. The access site information retrieval unit 355 at step S471 acquires the information on the CM airing time and channel, and refers at step S472 to the CM information and the access site information 354b from the CM database of the CM database unit 354 to verify at step S473 whether or not the access site of the CM aired at such time and on such channel has been registered. If the result is NO, that is if the CM access site information has not been registered, the CM access site information furnishing device 305 outputs the information non-presence information at step S475 and, if the result is YES, that is if the CM access site information has been registered, the CM access site information furnishing device 305 outputs the access site information 355a at step S474. This access site information 355a is sent to the consumer terminal 303 through a public network circuit, not shown.

In the above-described embodiment, the broadcasting station is not the same as the access information furnishing device. However, the broadcasting station may also be the same as the access information furnishing device, as now explained.

Figure 9:
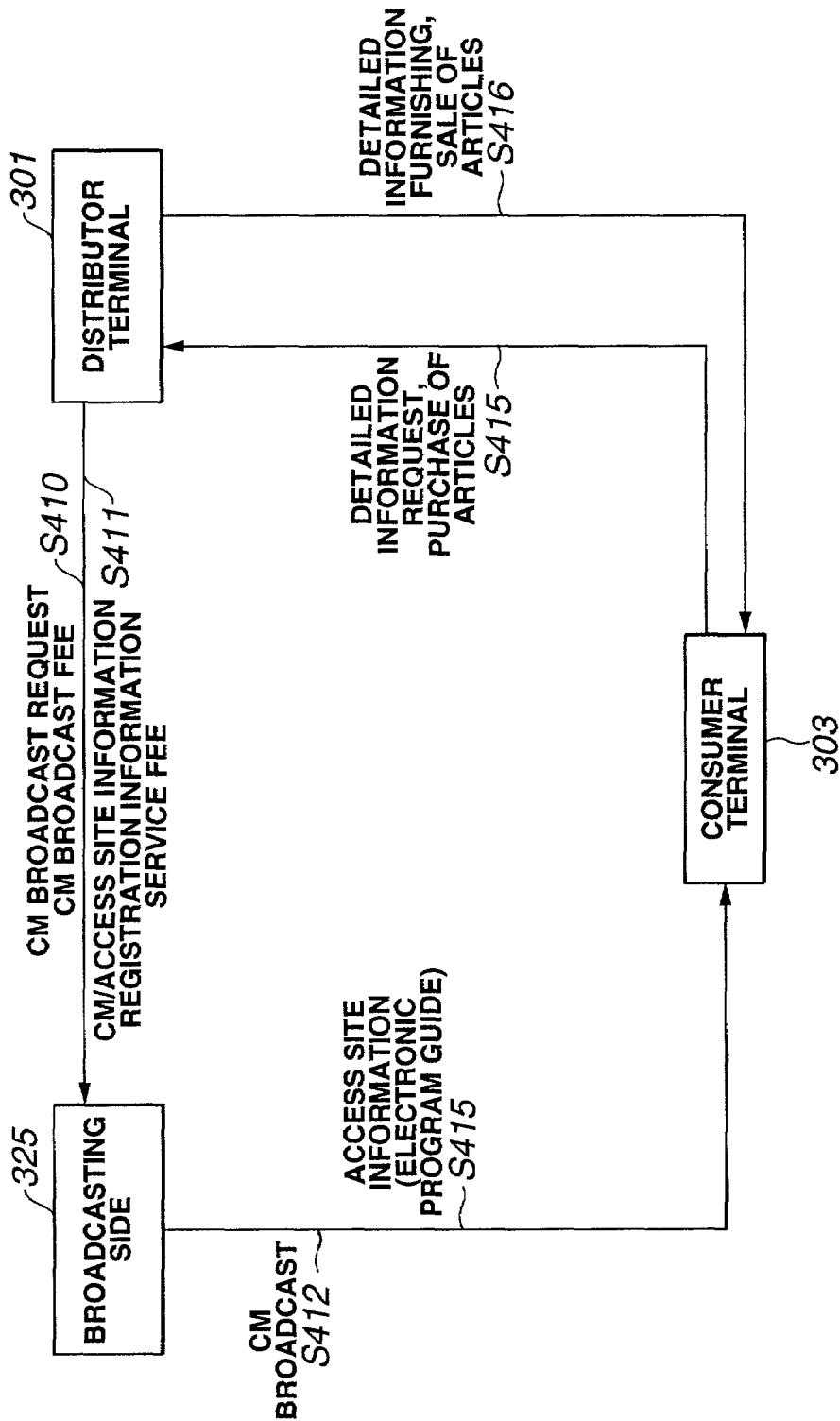
FIG. 9 illustrates the information flow in case the broadcasting station is the same as the access information furnishing device and the electronic program guide (EPG) is being aired.

FIG. 9 schematically shows the information flow when the broadcasting station is the same as the access information furnishing device and the electronic program guide (EPG) is being aired. Meanwhile, in FIG. 9, the states or the operations common to those shown in FIGS. 2 and 3 are indicated by common reference numerals.

In the present embodiment, the distribution terminal 301 for e.g., articles of commerce registers the CM access site information in a broadcast/access site information furnishing device 325 at step S411 simultaneously as the CM broadcast request (step S410). The broadcast/access site information furnishing device 325 also broadcasts the access site information over the EPG broadcast simultaneously as the CM broadcast. In the present embodiment, since the consumer terminal 303 is able to acquire the access site information simultaneously with the broadcasting, the operations at steps S413, S414 and S422 of FIGS. 2 and 3 are unnecessary, so that the consumer at step S415 can directly inquire after the information or purchase the articles of commerce from the specified CM.

In the foregoing, distributors of articles of commerce are taken only for the sake of illustration. It is however apparent that a similar system may be used to realize similar access by a similar system to purveyors of services at large, without being limited to those of articles of commerce, in particular the purveyors or organizations furnishing voluntary services or public services.

In the above-described embodiment of the present invention, it is possible to furnish the URL, E-mail addresses or telephone numbers automatically to consumers desirous to acquire the detailed information pertinent to the contents of a CM aired or to purchase the articles of commerce. This facilitates the accessing to the detailed information or requests for purchasing an article of commerce.

Moreover, with the present embodiment, such a CM server device is realized in which the consumer terminal is able to separate; detect, save and browse a CM automatically from the CMs as aired, request the access site information and to acquire the detailed information.

In addition, with the present embodiment, the access site information furnishing device is able to separate and detect a CM automatically from the aired CMs, compare and identify the detected CM with a CM registered at the outset and to coordinate the airing time and channel with the access site information.

Thus, with the present embodiment, there may be realized an integrated automatic system from the CM viewing until accessing to the distributor of articles of commerce and purchasing thereof.

Figure 40:
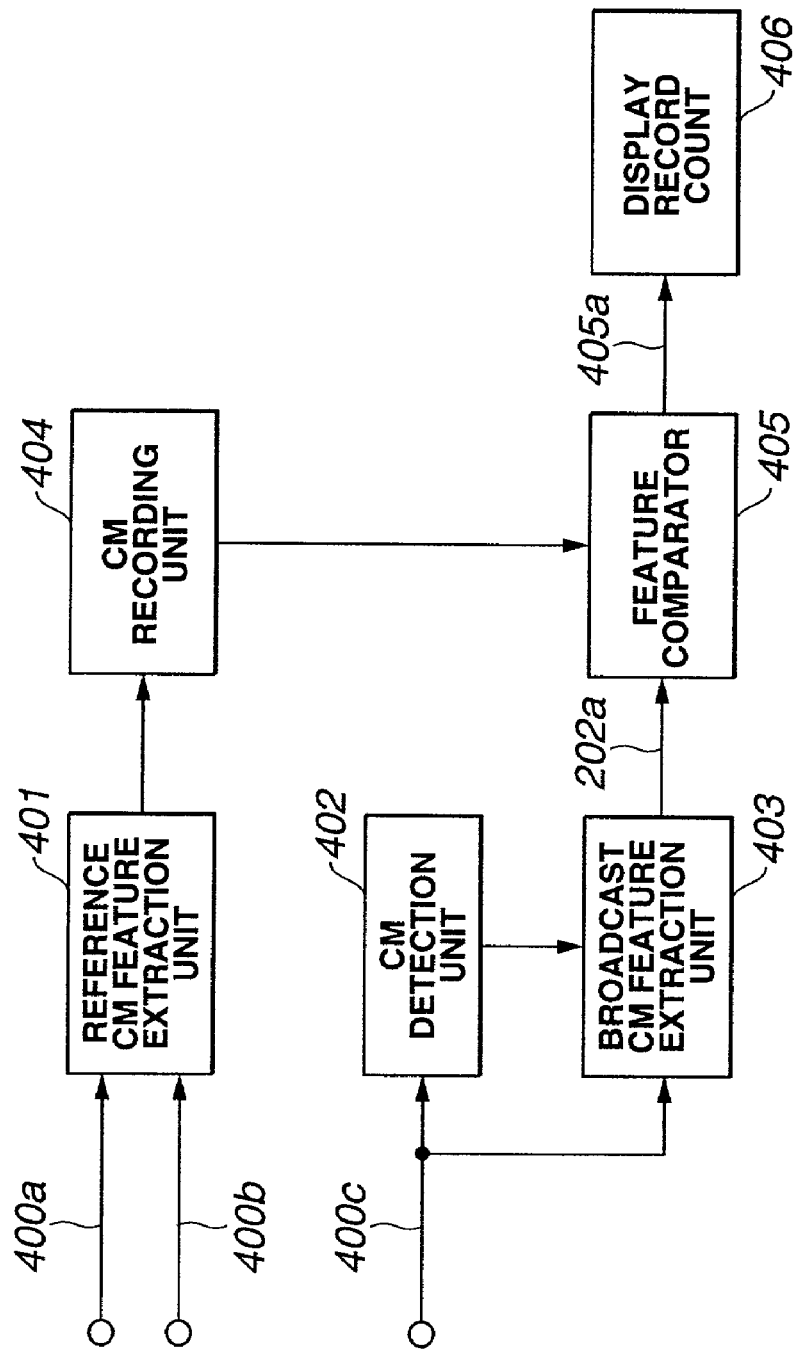
FIG. 40 is a block diagram showing the schematic structure of a CM database unit of the present system.

The CM detecting portion of the CM detection/storage/browsing/retrieval unit 331 of FIG. 4 detecting the CM from the aired signal to detect the time or the duration of the CM, the CM detection unit 352 of FIG. 6 and a CM detection unit 402 of FIG. 40, referred to below, are now explained in detail. These detection means are referred to herein simply as CM detecting section.

In the CM detection section, the principle of detecting the CM portion from e.g., the television (TV) broadcast signals is first explained.

In general, a CM, aired by TV, is prepared in accordance with the standard specified by a broadcasting station, so that its time duration (airing time of a given CM) is limited to a few sorts. For example, almost all CMs aired in Japan are prepared to 15, 30 or 60 seconds, except only special examples.

During CM airing, a CM prepared independently of the main portion of the program and other CMs is inserted into the TV broadcast stream, so that necessarily the audio level is lowered, that is the sound volume is lowered, whilst the image signals are changed over, before and after each CM. The audio level being lowered is not necessarily synonymous as muting (muting herein means only negligible noise). The reason is that there are occasions where the complete muting is not reached due e g., to switching timing between the CM and the main program.

The three properties of the CM, that is prescribed time durations (only small sorts of time durations), small sound volume and image switching, represent the conditions to be met by almost all CMs. In the present specification, the conditions derived from these three features are referred to as indispensable conditions;

Thus, if the signal portion corresponding to the indispensable conditions are detected from the TV aired signals, CM candidates (signals portions presumed to be a CM) can be detected deterministically in a manner substantially free from mistaken discarding. However, since there are many portions in the main program which may fortuitously satisfy the indispensable conditions, there is risk of a main program portion being mis-detected as being a CM candidate.

On the other hand, there are features which a majority of CMs meet because of the properties of the CM or which exhibit a predetermined tendency, even granting that these features accommodate many exceptions in distinction from the above-mentioned indispensable conditions. These features may be enumerated as follows:
1) Before and after a CM, that is directly before a CM begins and directly before the CM is finished and the main program portion is started or re-started), the audio level tends to be lower than that during the main program portion;
2) the substantially muted time period between the CM and the main program portion and that between a given CM and another CM, is on the order of hundreds of milliseconds in a majority of cases;
3) the sounding portion contained in the TV broadcast is shorter in a majority of cases by not less than 100 milliseconds than the prescribed time duration of the CM (15 seconds, 30 seconds or 60 seconds), while being shorter by not less than one second than the CM time duration only on rare occasions;
4) the correlation value between the left (L) and right (R) channels of stereo audio signals is significantly smaller than 1 in a majority of cases;
5) the sound volume tends to be larger during the CM period than during the main program portion;
6) the CM airing mode is the stereo mode in a majority of cases;
7) during the CM period, plural CMs are aired in succession in a majority of cases;
8) during the CM period, the image cut switching frequency is high in a majority of cases;
9) conversely, even during the CM period, the cut switching frequency may be significantly low, such as in case of a CM by a still image;
10) the sound quality may be changed significantly at a boundary between the main program and the CM and between two CMs;
11) the CM contains both the speech and the music simultaneously in a majority of cases;
12) in view of program editing, the probability of a CM being aired is high near hour-time points;
13) similarly, a CM tends to be aired at half-hour time point.
14) depending on the program genre, there is a time zone in which a CM is likely to be aired, such as during the half-time of a soccer game being relayed.

In the present specification, the conditions derived form these features are termed the supplementary conditions. The supplementary conditions are derived from the fact that a CM is prepared and presented in the TV broadcast signals on the basis of a standard, a CD is aimed at raising the advertizing effect in a shorter time, and that a CM is prepared under the constraint of the program arrangement. Therefore, these supplementary conditions, which are not so positive as to be handled deterministically, represent effective conditions in evaluating the possibility or likelihood of a portion of the program being a CM.

Moreover, TV broadcast features physical impossibility of plural images and speeches being aired simultaneously on one and the same channel. For example, if desired to detect a signal portion thought to be a CM from the TV airing signal (CM candidate), there exist plural domains of images and speech satisfying the above supplementary conditions in an overlapping fashion and if, as the result of certain processing, a CM candidate is detected in the domain overlapping period, at least one of the overlapping domains of the images and speech cannot be the correct CM domain. In the present specification, the condition derived from these features in the TV broadcasting is termed the logical condition.

According to the present invention, the CM portion is to be detected to high accuracy from the TV broadcast portion by exploiting the above-described indispensable conditions, logical condition and the supplementary conditions reasonably and effectively.

Specifically, a CM candidate (signal portion thought to be a CM) is deterministically extracted from the TV broadcast signal, a CM candidate is selected based on the statistic evaluation of the CM-likeness (possibility of a signal portion being a CM) based on the supplementary conditions and the CM candidate overlap relation is cancelled based on the logical condition to realize CM detection to high accuracy.

Figure 10:
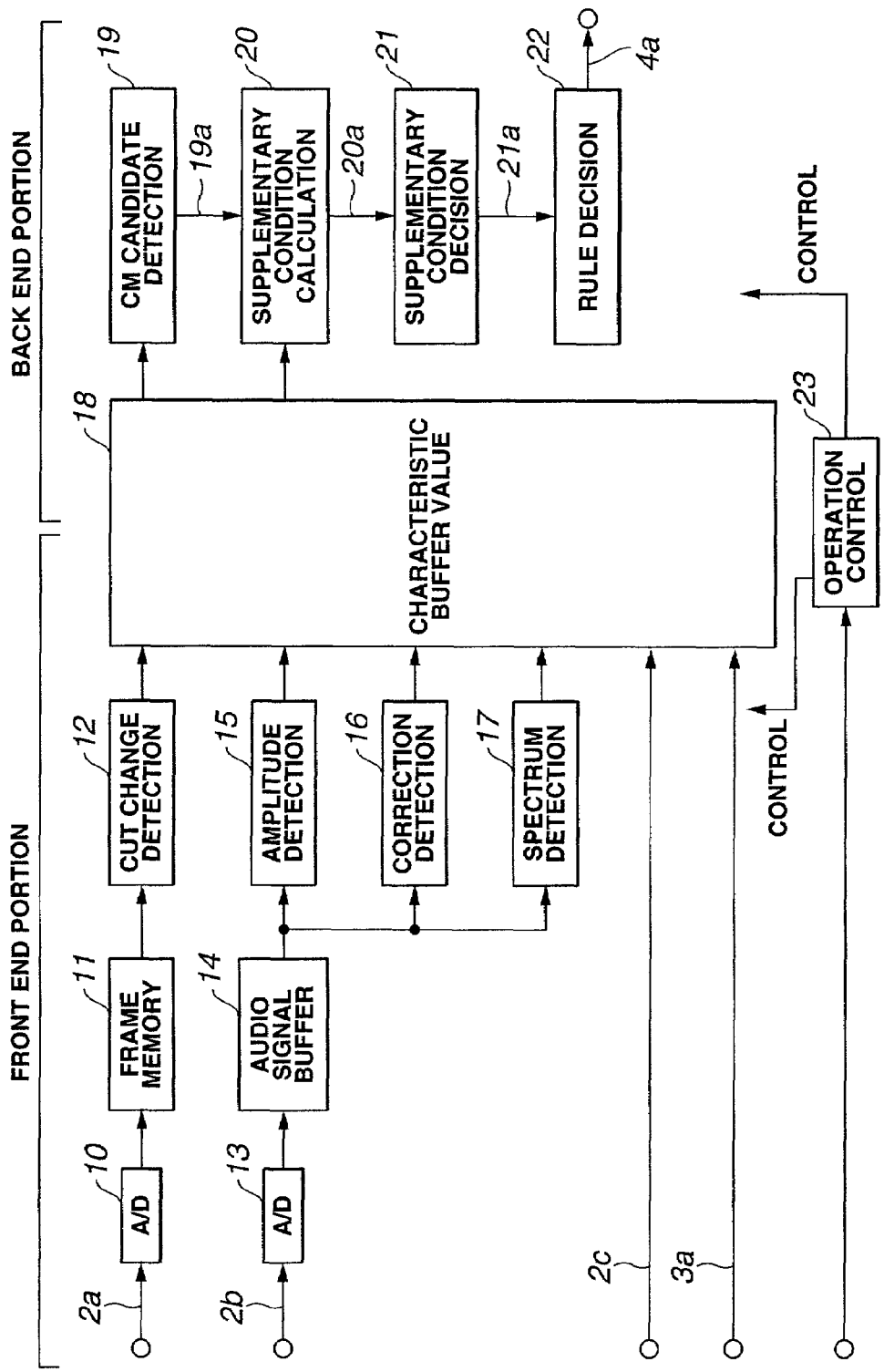
FIG. 10 is a block diagram showing the detailed structure of a first embodiment of a CM detection unit used in the present system.

FIG. 10 shows a detailed structure of a first specified embodiment of the CM detection section which is made up of a front end section and a back end section. An operation controller 23 verifies, based on the channel information 1b indicating the airing channel, whether or not the airing channel is such a one on which no CM obviously is aired. Responsive to the result of decision, the operation controller 23 exercises control so as to permit the CM detection operation to occur in none of respective components of FIG. 10.

First, the front end section of FIG. 10 is explained.

In this figure, the front end section is fed with image signals 2a, making up the speech signal/video signal/control signals 351 a (and program guide signals, if such are aired), audio signals 2b and airing mode signals 2c, among control signals, as well as time signals 3a, generated by a timepiece, not shown.

The image signals 2a are digitized in an A/D converter 10 and stored in a frame memory 11. Meanwhile, the frame memory 11 is able to store at least two frames of picture signals therein. The picture signals, read out from the frame memory 11 on the frame basis, are sent to a cut change detection unit 12.

Based on the frame-based picture signals, furnished from the frame memory 11, the cut change detection unit 12 detects a frame in which an image is changed abruptly (referred to below as a changing image frame) and a frame in which luminance is uniform (referred to below as a uniform luminance frame).

That is, the cut change detection unit 12 finds a square sum of luminance differences, from pixel to pixel, between two temporally adjacent frame images stored in the frame memory 11 and, when the square sum exceeds a pre-set threshold value, detects the temporally later one of the two adjacent frames as being a changing image frame where the image is changing rapidly. On the other hand, the cut change detection unit 12 finds the variance of luminance of each frame image stored in the frame memory 11 and detects the frame as being a uniform luminance frame when the luminance variance value is not larger than a pre-set threshold value. Meanwhile, if the frame interval, which is approximately 30 ms in the NTSC system, is not coincident with the frame period explained subsequently in explaining the speech signal processing, the frame interval is re-discretized into coincidence with the frame period.

Such detection of the changing image frame and the uniform luminance frame by the cut change detection unit 12 is now explained in detail.

If the transverse size and the longitudinal size of the discretized picture signals are denoted X and Y, longitudinal and transverse pixel numbers are x and y, the nth image is $I_n(x,y)$ and an image of the (n−1)st frame temporally ahead of the nth frame by one frame is $I_{n-1}(x,y)$, the square sum $D[n]$ of the pixel-based luminance difference -between the nth and the (n−1)st frame is obtained by the equation (1):

$$D[n] = \sum_{x=0}^{X-1} \sum_{y=0}^{Y-1} (I_n(x, y) - I_{n-1}(x, y))^2 \qquad (1)$$

whereas the luminance variance value $V[n]$ of the nth frame is obtained by the following equation (2):

$$V[n] = \frac{1}{XY} \sum_{x=0}^{X-1} \sum_{y=0}^{Y-1} I_n^2(x, y) - \left( \frac{1}{XY} \sum_{x=0}^{X-1} \sum_{y=0}^{Y-1} I_n(x, y) \right)^2. \qquad (2)$$

A detection output $C[n]$ of the cut change detection unit 12 at this time is represented by the following equation (3):

$$C[n] = \begin{cases} 1 (D[n] \geq D_{thsd} \text{ or } V[n] \leq V_{thsd}) \\ 0 (D[n] < D_{thsd} \text{ and } V[n] > V_{thsd}) \end{cases} \qquad (3)$$

where $D_{thsd}$ is a pre-set threshold value for the square sum in detecting the changing image frame and $V_{thsd}$ is a pre-set threshold value for the variance value of the luminance in detecting the uniform luminance frame.

A detection output $C[n]$ of the cut change detection unit 12 is sent as a feature value for video signals to a feature value buffer 18.

In finding the luminance difference between the above two frame images, there are required a memory capable of storing picture signals for two frames and a processing volume corresponding to that for the two frames of the image signals. So, the image of a frame may be split into a proper number of small-sized blocks, in place of processing the entire frame image simultaneously, to find the luminance difference from one small-sized block to another. Alternatively, luminance histograms may be found from one frame image to another, in place of finding the luminance difference from one pixel to another between the frame images, to find the inter-frame difference of the luminance histograms. Still alternatively, the average luminance may be found from one frame image to another to find the inter-frame difference of the average luminance to reduce the memory capacity or the processing volume. If conversely there is sufficient allowance in the memory capacity or the processing volume, the luminance difference or the color histogram difference may be found from one color component, such as red (R), green (G) or blue (B) components in a color image to raise the detection accuracy further.

The audio signal 2b is digitized by an A/D converter 13 and stored in an audio signal buffer 14. Meanwhile, the audio signal buffer 14 capable of storing stereo audio signals of two channels, namely a left (L) channel and a right (R) channel, corresponding to at least a pre-set time duration T1, such as 30 msec, referred to below as one frame length. The audio signals read out from the audio signal buffer 14 are routed to an amplitude detector 15, a correlation detector 16 and to a spectrum detector 17.

The amplitude detector 15 detects a short-term root mean square amplitude every pre-set time interval $T_2$, such as a time interval of 15 msec, termed herein one-frame period. That is, if the stereo audio signals of two channels, that is left and right channels, are stored in the audio signal buffer 14, the amplitude detector 15 detects a short-term root mean square amplitude, every pre-set time interval $T_2$ (15 msec corresponding to one frame period) from the left and right channel stereo audio signals $S_L[m]$ and $S_R[m]$ read out from the audio signal buffer 14. Meanwhile, m (m=0, ..., M−1) denotes the sample number in the buffer indicating the discretized time, with the maximum number M corresponding to one frame period $T_1$.

Specifically, the amplitude detector 15 calculates the root mean square amplitude A[n] of the two channels, that is left and right channels, in the nth frame, by the following equation (4):

$$A[n] = \frac{1}{4M} \sum_{m=0}^{M-1} (S_L[m + nT_2] + S_R[m + nT_2])^2. \tag{4}$$

The root mean square amplitude A[n], as a detection output of the amplitude detector 15, is sent as one of the feature values for the speech signals to the feature value buffer 18.

Using the audio signals stored in the audio signal buffer 14, the correlation detector 16 detects the correlation coefficient prior to standardization of the frame-based audio signal, while simultaneously detecting the short-term energy for standardization which will be effected in a subsequent process step. That is, if the stereo audio signals of the two channels, that is left and right channels, are stored in the audio signal buffer 14, the correlation detector 16 detects the pre-standardization correlation coefficient of the frame-based audio signals of the two channels, that is left and right channels, from the left and right channel stereo audio signals $S_L[m]$ and $S_R[m]$, read out from the audio signal buffer 14, while simultaneously detecting the short-term energy for standardization which will be effected in a subsequent stage.

More specifically, the correlation detector 16 calculates the correlation coefficient $A_{LR}[n]$ of the left and right channels of the audio signals in the nth frame in accordance with the equation (5):

$$A_{LR}[n] = \sum_{m=0}^{M-1} S_L[m + nT_2] S_R[m + nT_2] \tag{5}$$

while calculating the audio signal energy $A_{LL}[n]$ of the left channel in accordance with the following equation (6):

$$A_{LL}[n] = \sum_{m=0}^{M-1} S_L^2[m + nT_2] \tag{6}$$

and calculating the audio signal energy $A_{RR}[N]$ of the right channel in accordance with the following equation (7):

$$A_{RR}[n] = \sum_{m=0}^{M-1} S_R^2[m + nT_2]. \tag{7}$$

The correlation coefficient ALR[n], as a detection output of the correlation detector 16, and the audio signal energies $A_{LL}[n]$ and $A_{RR}[n]$ are routed to the feature value buffer 18 as being among the feature values pertinent to the audio signals.

Using the audio signals, stored in the audio signal buffer 14, the spectrum detector 17 calculates the short-term spectrum. That is, if the stereo speech signals of the left and right channels are stored in the audio signal buffer 14, the spectrum detector 17 calculates the short-term spectrum from the left and right channel stereo audio signals $S_L[m]$ and $S_R[m]$ read out from the audio signal buffer 14.

More specifically, the spectrum detector 17 finds the discrete spectrum F[k;n] of the speech signals of the left and right channels in the nth frame. If k=0, ..., K−1 are the numbers representing the discretized frequency the discrete spectrum F[k;n] may be represented by the following equation (8):

$$F[k; n] = \left| \sum_{m=0}^{M-1} (S_L[m] + S_R[m]) e^{-2\pi jmk/M} \right|^2. \tag{8}$$

The calculations of this equation (8) may be realized using, for example, the fast Fourier transform (FFT) or linear predictive coding (LPC).

The short-term discrete spectrum F[k;n], as a calculated output of the spectrum detector 17, is sent as being one of the feature values of the audio signals to the feature value buffer 18.

The airing mode signal 2c is then rendered into a signal of discrete values in meeting with the above-described frame for audio signal processing.

Specifically, the airing mode signal 2c in the nth frame is rendered into a value B[n] represented by the equation (9):

$$B[n] = \begin{cases} 0 (\text{monoral mode}) \\ 1 (\text{stereo mode}) \\ 2 (\text{audiomutiplex mode}). \end{cases} \tag{9}$$

The numerical value B[n], which is the discretized airing mode signal 2c, is routed to the feature value buffer 18 as being one of the feature values of the TV broadcast signal.

Similarly, the time signal 3a is rendered into a discretized numerical value T[n], in meeting with the frame of the audio signal processing, and is routed as being one of the feature values to the feature value buffer 18.

The feature value buffer 18 accumulates the feature value G[n], shown by the equation (10):

$$G[n] \equiv (C[n], A[n], A_{LR}[n], A_{LL}[n], A_{RR}[n], F[k;n], B[n], T[n]) \tag{10}$$

over a pre-set time length T3. The feature value G[n] is made up of a detection output C[n] from the cut change detection unit 12, a root mean square sum A[n] from the amplitude detector 15, a correlation coefficient $A_{LR}[n]$ from the correlation detector 16, audio signal energies $A_{LL}[n]$, $A_{RR}[n]$, short-term discrete spectrum F[k;n] from the spectrum detector 17, discrete values B[n] from the airing mode signal 2c, and the discrete value T[n] of the time signal 3a. Meanwhile, the time duration $T_3$ is the time capable of memorizing at least one CM portion and may, for example, be 80 seconds.

The components from the A/D converter 10 to the feature value buffer 18 make up the front end section of the CM detection unit shown in FIG. 10. The processing flow in the front end section is hereinafter explained using the flowcharts of FIGS. 11 and 12. Meanwhile, the steps S30 to S32 in FIG. 11 show the processing flow for the image signals 2a, whilst the steps S33 to S40 in FIG. 12 show the processing flow for the time signal 3a.

Figure 11:
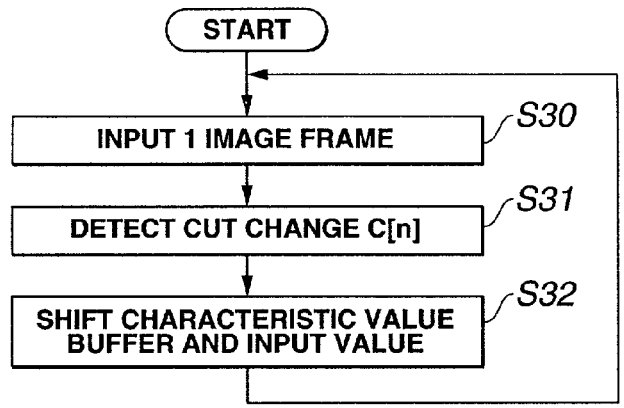
FIG. 11 is a flowchart showing the flow of the image signal processing in a front end of the CM detection unit.
Figure 12:
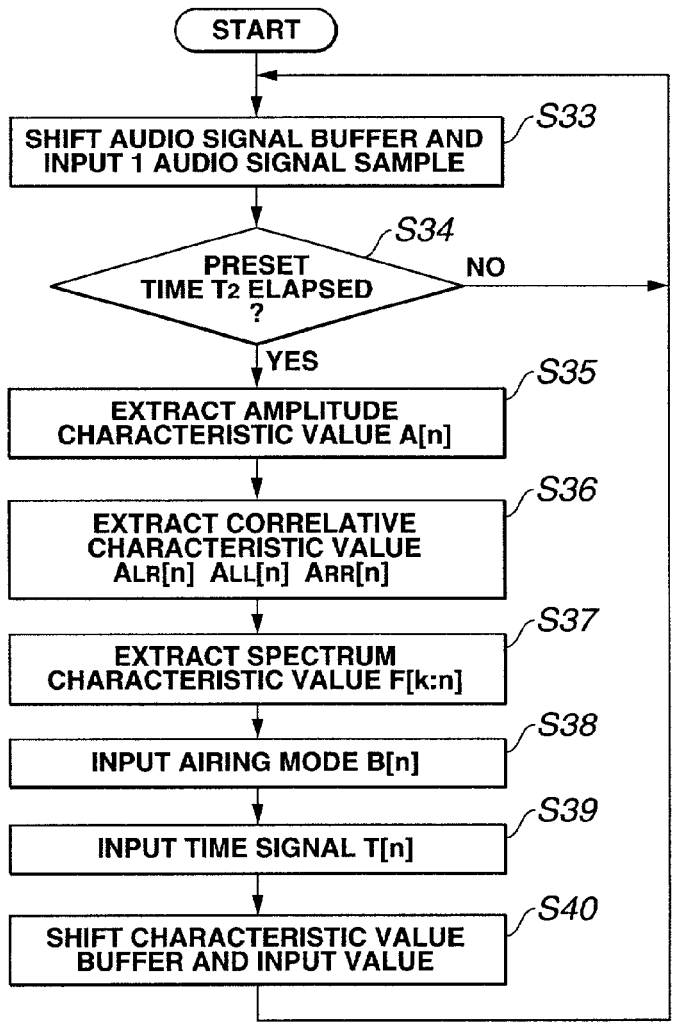
FIG. 12 is a flowchart showing the flow of the speech signal processing in a front end of the CM detection unit.

Referring to FIG. 11, showing the processing flow for the image signals 2a, the front end section stores the image signals 2a for at least one frame, digitized by the A/D converter 10, in the frame memory 11. The frame memory 11 is adapted for handling one frame of the image signals 2a as one sample. When the one frame of the image signals 2a is input, the image signals 2a already stored in the frame memory 11 are shifted by one frame so that the one frame of the image signals 2a input at the earliest time is extruded and output.

The front end section reads out the image signals 2a from the frame memory 11, by way of the processing at step S31, to route the read-out image signals 2a to the cut change detection unit 12 to find the detection output C[n] as described above.

The front end section then stores the detection output C[n] in the feature value buffer 18 as the processing at step S32.

In FIG. 12, showing the processing flow as to the audio signal 2b, the audio signal buffer 14 of the front end section is fed with the audio signals 2b, digitized by the A/D converter 13, as the processing at steps S33 and S34, while storing the audio signals 2b of at least one frame period $T_2$. The audio signal buffer 14 is designed to handle the audio signals 2b of at least one frame period $T_2$ as one sample and, when the audio signals 2b of at least one frame period $T_2$ are input, the audio signals 2b already stored in the audio signal buffer 14 are shifted by one frame period $T_2$ so that the audio signals 2b of at least one frame period $T_2$ input at the remotest past time are extruded and output.

When the audio signals 2b of at least one frame period $T_2$ are stored in the audio signal buffer 14, the front end section reads out the audio signals 2b stored in the audio signal buffer 14 as processing at step S35 to send the signal to the amplitude detector 15 to find the root mean square amplitude A[n] as described above.

Simultaneously, the front end section sends the audio signals 2b stored in the audio signal buffer 14 to the correlation detector 16, as the processing at step S36, to find the correlation coefficient $A_{LR}[n]$ and the audio signal energies $A_{LL}[n]$ and $A_{RR}[n]$.

Also simultaneously, the front end section sends the audio signals 2b stored in the audio signal buffer 14 to the spectrum detector 17, as the processing at step S37, to find the short-term discrete spectrum F[k;n].

The front end section also finds the discretized value B[n], as described above, from the airing mode signal 2c, as the processing at step S38, while finding the numerical value T[n] from the time signal 3a, as described above.

The front end section stores the feature value G[n], made up of the detection output C[n] from the cut change detection unit 12, the root mean square amplitude A[n] from the amplitude detector 15, the correlation coefficient $A_{LR}[n]$ from the correlation detector 16, audio signal energies $A_{LL}[n]$ and $A_{RR}[n]$, short-term discrete spectrum F[k;n] from the spectrum detector 17, discretized numerical value B[n] from the airing mode signal 2c and the feature value G[n] of the time signal 3a, in the feature value buffer 18.

Returning to FIG. 10, the back end section is explained. In the following explanation, the number n represents the frame numbers of the feature values stored in the feature value buffer 18 on the frame basis. The feature value of the newest frame is G[0]. The value of n of the feature value increases as the frame of the feature value becomes older. If the feature of a new frame is input, the entire data is shifted by one, that is the frame number is shifted progressively by one.

In FIG. 10, the feature value stored in the feature value buffer 18 is sent on the frame basis to a CM candidate detector 19.

The CM candidate detector 19 calculates the candidates of the CM domain on the frame basis, based on the aforementioned indispensable conditions. The indispensable conditions require that a frame be such a one in which the audio signals of the CM are of a low sound volume level, that is the audio signal level is not larger than a pre-set threshold (referred to below as sound volume condition), in which there is a CM image changeover, that is in which image signals undergo precipitous changes or of a uniform luminance referred to below as image condition) and that the time duration is a prescribed one of a small number of sorts of time durations, that is that the interval between two frames satisfying the sound volume condition and the image condition coincides with the pre-set CM duration, referred to below as the time condition. These requirements may expressed, using t the aforementioned feature values, as the conditions prescribed by the equations (11) to (13):

$$A[0]<A_{thsd} \tag{11}$$

$$C[0]=1 \tag{12}$$

$$A[n_1]<A_{thsd}, C[n_1]=1 \text{ or } A[n_2]<A_{thsd}, C[n_2]=1 \text{ or } A[n_3]$$
$$<A_{thsd}, C[n_3]=1 \tag{13}$$

where $A_{thsd}$ is a threshold value of a pre-set square amplitude, $n_1$, $n_2$ and $n_3$ are time lengths prescribed as CM lengths, herein 15, 30 and 60 seconds, as an example, calculated in terms of a frame period as a unit. Meanwhile, since there is an error in actual CM airing time, certain allowances are provided in the values of $n_1$, $n_2$ and $n_3$.

Figure 13:
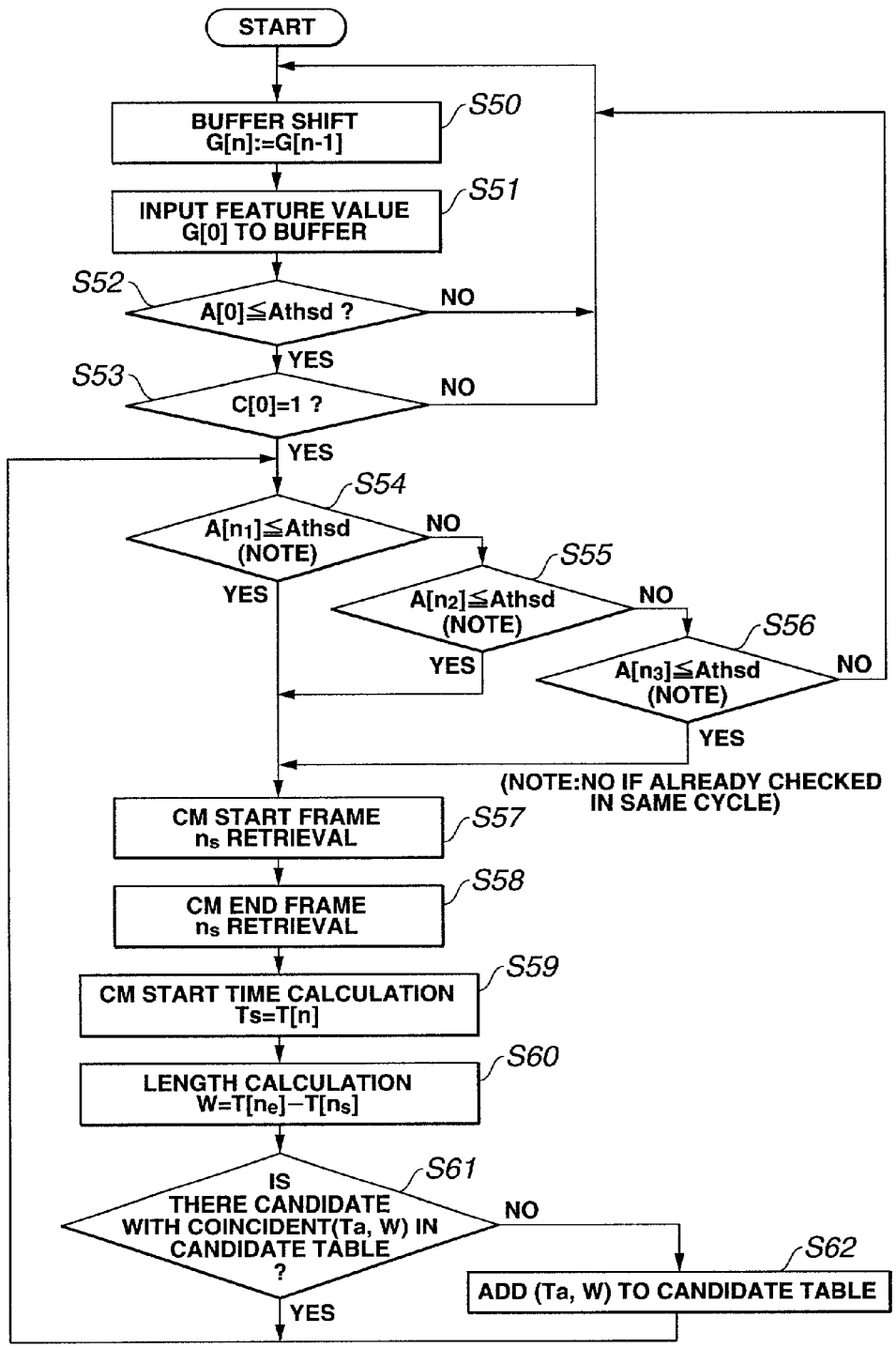
FIG. 13 is a flowchart showing the flow in a CM candidate table detection unit in the CM detection unit.

Referring to FIG. 13, the flow of operations of the CM candidate detector 19 is explained.

In FIG. 13, the operation of a frame-based inputting, shifting and outputting is executed, byway of a buffer shifting processing and feature value inputting processing at step S50; in similar manner to the processing for the frame memory as explained at step S32 in FIG. 13 and for the audio signal buffer as explained at step S40 in FIG. 12. That is, the feature value buffer 18 is designed to handle the one-frame feature value as one sample and, when the one-frame feature value is input, the feature value already stored in the feature value buffer 18 is shifted by one frame so that one-frame feature value input at the remotest past time are extruded and output.

When, by the processing st the steps S50 and S51, the one-frame (one-sample) feature value is input, evaluation is made as to whether or not the one-frame (one-sample) feature value meets the sound volume condition, image condition and the time condition as the indispensable conditions. That is, at step S52, the CM candidate detector 19 compares the root mean square amplitude A[0] of the first frame to the pre-set threshold value $A_{thsd}$ of the square amplitude and, as the processing at step S53, it is checked whether or not the detection output C[0] is 1, to check upon whether or not the frame meets the sound volume condition, image condition and the time condition as the indispensable conditions. If it is verified that, as the result of the decision processing at steps S52 and S53, the root mean square amplitude A[0] is not up to the threshold value $A_{thsd}$ of the square amplitude and meets the aforementioned indispensable conditions, the CM candidate detector 19 verifies this frame as not being a CM candidate and proceeds to the processing of step S57 and so forth, whereas, if it is verified that the root mean square amplitude A[0] has exceeded the threshold value $A_{thsd}$ of the square amplitude and fails to meet the aforementioned indispensable conditions, the CM candidate detector 19 verifies this frame as not being a CM candidate and reverts to the processing of step S50.

When, as the result of the decision at steps S52, S53, the root mean square value A[0] is found to be not up to the pre-set threshold value $A_{thsd}$ of the square amplitude and meets the aforementioned indispensable conditions; the CM candidate detector 19 retrieves the CM start frame $n_s$ as the processing at step S57, followed by the CM end frame $n_e$ as the processing at step S58. The CM candidate detector 19 then calculates the CM start time $T_s$ as the processing at step S59 followed by CM length W as step S60.

After performing the retrieval and calculations at step S57 to S60, the CM candidate detector 19 references the CM candidate table, as later explained, at step S61. If a candidate coincident as to the CM start time $T_s$ and the CM length W is already present in the CM candidate table, the processing reverts directly to steps S54 to S56 and, if otherwise, the candidate is added as a new CM candidate to the CM candidate table, after which the processing reverts to steps S54 to S56.

After the above processing is executed for all of the time lengths at steps S54 to S56, the processing reverts to step S50 to repeat the same processing for the next input.

Meanwhile, the CM start frame $n_s$ is the number of the first frame the root mean square value A[n] of which exceeds the threshold value $A_{thsd}$ of the square amplitude in the direction of the latest frame as from the frame among the frames $n_1$, $n_2$ and $n_3$ having the coincident time conditions. The CM end frame $n_e$ is the number of the last frame the root mean square value A[n] of which is not up to the threshold value $A_{thsd}$ of the square amplitude in the temporally retrogressive direction as from the 0th frame. The CM start frame $n_s$ is found by $T_s=T[n_s]$, using the CM start frame $n_s$. Similarly, the CM length $T_w$ may be found by $T_w=T[n_e]-T[n_s]$.

Figure 14:
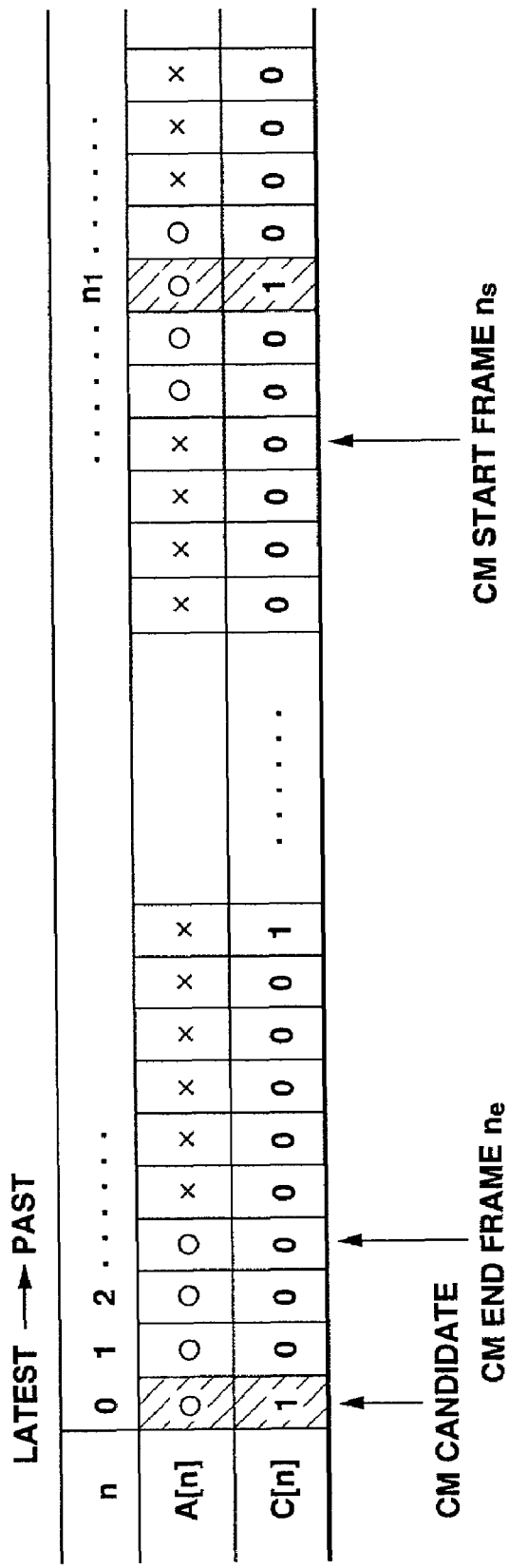
FIG. 14 illustrates typical calculations of indispensable conditions.

FIG. 14 shows illustrative calculations of the aforementioned indispensable conditions. In a term A[n] shown in FIG. 14, [o] indicates a frame having a root mean square amplitude less than the threshold value $A_{thsd}$ of the square amplitude and [x] indicates a frame having a root mean square amplitude not less than the threshold value $A_{thsd}$ of the square amplitude. In the present embodiment, the frame in which A[n]=x on the left of $n_1$ and the frame in which the last A[n] continuing towards right from 0 is o, with A[0], C[0], A[$n_1$] and C[$n_1$] meeting the condition, are ns and ne, respectively.

By the above processing, the CM candidate detector 19 detects a CM candidate each time a feature value for one frame (sample) is input and, if a CM candidate is detected, the CM candidate detector 19 enters it in the CM candidate table.

FIG. 15 shows an illustrative structure of the CM candidate table. In FIG. 15, the items of the CM candidate table are start time $T_s$, length $T_w$, feature values $Q_1$ to $Q_{11}$ as calculated in the supplementary condition calculation unit 20 as later explained and the results of score decision Z. In the stage of the CM candidate table 19a by the CM candidate detector 19, only the start time $T_s$ and length $T_w$ are stated. That is, the CM candidate table 19a is used for stating start time $T_s$ and length $T_w$ obtained by the CM candidate detector 19, feature values $Q_1$ to $Q_{11}$ as calculated in the supplementary condition calculation unit 20, scores R calculated in supplementary condition decision unit 21 and the results of score decision Z, to manage these feature values. The CM candidate table is maintained until a decision is given as to whether or not the entry is a CM and, if the decision is given that the entry is the CM, a CM detection output 4a is issued from a rule decision unit 22. If otherwise, the entry is discarded.

The CM candidate table 19a, in which only the start time $T_s$ and length $T_w$ have been stated by the CM candidate detector 19, is sent to the supplementary condition calculation unit 20.

The supplementary condition calculation unit 20 extracts the feature values $Q_1$ to $Q_{11}$, as it references the feature value buffer 18, from the candidate domain entered in the CM candidate table 19a, and additionally states these feature values in the CM candidate table 19a, to output the feature values as a CM candidate table 20a to a supplementary condition decision unit 21.

FIG. 16 shows exemplary calculations for the feature values $Q_1$ to $Q_{11}$ in the supplementary condition calculation unit 20.

In FIGS. 16A to 16D, the abscissa denotes the frame numbers equivalent to the discrete time and FIGS. 16A, 16B, 16C and 16D denote a cut change detection output C[n], discretized numerical values B[n] of the airing mode signal 2c, short-term discrete spectrum F[k;n] of the audio signals and the root mean square value A[n] of the audio signals, with the interval $n_1$ being a CM candidate. In FIG. 16A, a location CT means a position at which the cut change detection output C[n] is 1, that is a location where the cut change has been detected. In FIG. 16B, a domain M indicates that the domain is in some airing mode or other. In FIG. 16C, $S_1$, $S_2$, $S_3$ and $S_4$ indicate that there exists some spectral component or other. In FIG. 16D, AM denotes changes in the square amplitude. In the drawing, $Q_1$ to $Q_{11}$ denote a place where the feature values $Q_1$ to $Q_{11}$ are calculated.

The feature values $Q_1$ to $Q_{11}$, calculated in the supplementary condition calculation unit 20, are hereinafter individually explained.

The feature value $Q_1$ is a fore-break length. The fore-break length is the small sound volume domain directly before the CM candidate domain, termed a fore-break domain, that is a time duration during which A[n] continues to be not larger than the pre-set threshold $A_{thsd}$. Specifically, a domain length BB delimited by chain-dotted lines in FIG. 16 represents the fore-break length $Q_1$.

The feature value $Q_2$ is a rear-break length. The rear-break length is the small sound volume domain directly at back of the CM candidate domain, termed a rear-break domain, that is a time duration during which A[n] continues to be not larger than the pre-set threshold $A_{thsd}$. Specifically, a domain length BB delimited by chain-dotted lines in FIG. 16 represents the rear-break length $Q_2$.

The feature value $Q_3$ is a fore-break minimum amplitude. The fore-break minimum amplitude $Q_3$ is the minimum value of A[n] in the fore-break domain.

The feature value $Q_4$ is a rear-break minimum amplitude. The rear-break minimum amplitude $Q_4$ is the minimum value of A[n] in the rear-break domain.

The feature value $Q_4$ is a left-right correlative value. The left-right correlative value is the correlative value of the audio signals $S_L[m]$ and $S_R[m]$ of two channels, that is left and right channels, of the audio signals of the CM candidate domain. This correlative value can be calculated by the following equation (14):

$$Q_5 = \frac{\sum_{n=n_s}^{n_e-1} A_{LR}[n]}{\sum_{n=n_s}^{n_e-1} A_{LL} \sum_{n=n_s}^{n_e-1} A_{RR}[n]} \quad (14)$$

by exploiting $A_{LR}[n]$, $A_{LL}[n]$ and $A_{RR}[n]$ of the equations (5) to (7).

In the calculations of this equation (14), the original waveform is partially summed a plural number of times by frame overlap. However, this exerts no significant influence on the system. If the memory capacity and the processing speed are sufficient to hold the original waveform unchanged, the reciprocal correlation of the original waveform can be substituted for the above calculations.

The feature value $Q_6$ is an average amplitude value which is a root mean square value of the amplitude of the audio signal of the CM candidate domain calculated in accordance with the following equation (15):

$$Q_6 = \sqrt{\frac{1}{n_e - n_e} \sum_{n=n_s}^{n_e-1} A[n]}. \quad (15)$$

In the calculations of the equation (15), as in the case of the aforementioned left-right correlation calculations, the original waveform is summed partially a plural number of times. This, however, does not affect the system seriously. If the memory capacity and the processing speed are sufficient to hold the original waveform unchanged, the rms calculations of the original waveform can be substituted for the above calculations.

The feature value $Q_7$ is the number of cuts. The number of cuts $Q_7$ is the calculations of counting the number of times of cut changes (the number of Cts) present in the CM candidate domain. That is, the operation is the processing of counting the number of times of $C[n]=1$ in the domain $[n_s, n_e]$.

The feature value $Q_8$ is the airing mode. This airing mode is the most dominant airing mode in the CM candidate domain. This is the calculation processing for selecting the most frequently occurring airing mode $Q_8$ in the values $B[n]$ in $[n_s, n_e)$.

The feature value $Q_9$ is the number of neighboring candidates. The number of neighboring candidates $Q_9$ indicates whether or not, for a given CM candidate, the sounding domain before and at back of the CM candidate is also a CM candidate. The. feature value $Q_9$ is 2, 1 or 0 if both sound domains are CM candidates, only one is a CM candidate or none of the sound domains is a CM candidate. This calculation processing is executed by retrieving the CM candidate table. The rear side candidate is verified depending on whether or not the sum of the start time $T_s$, length $T_w$ and the rear break length $Q_2$ ($T_s+T_w+Q_2$) coincides with the start time $T'_s$ of another CM candidate. Similarly, the fore side candidate is verified depending on whether or not the difference between the start tune $T_s$ and the fore break length $Q_1$ ($T_s-Q_1$) coincides with the sum of the start time $T'_s$ and the length $T'_w$ of another CM candidate.

The feature values $Q_{10}$ and $Q_{11}$ are the spectral difference energy. The spectral difference energy $Q_{10}$ and $Q_{11}$ is used for quantifying changes in the sound quality in the boundary between the main program portion and CM and between two CMs. This energy is defined as the root mean square sum of the difference of the mean spectrum on both sides of the boundary and is calculated in accordance with the equations (16) to (21):

$$S_1[k] = \frac{1}{N} \sum_{n=0}^{N-1} F[k; n'_e - n] \quad (16)$$

$$S_2 = [k] = \frac{1}{N} \sum_{n=0}^{N-1} F[k; n_s + n] \quad (17)$$

$$S_3[k] = \frac{1}{N} \sum_{n=0}^{N-1} F[k; n_e - n] \quad (18)$$

$$S_4[k] = \frac{1}{N} \sum_{n=0}^{N-1} F[k; n'_s + n] \quad (19)$$

$$Q_{10} = \frac{1}{S_{norm}^2} \sum_k (S_2[k] - S_1[k])^2 \quad (20)$$

$$Q_{11} = \frac{1}{S_{norm}^2} \sum_k (S_4[k] - S_2[k])^2. \quad (21)$$

In the above equation, N is the number of frames in the spectrum, $n'_e$ is the end frame number of the sound domain directly before a CM candidate domain (see FIG. 16), $n'_s$ is the start frame number of the sound domain directly after the CM candidate domain, $S_1[k]$ is the mean spectrum directly before the end of the CM candidate domain, $S_2[k]$ is the mean spectrum directly after the start of the CM candidate domain, $S_3[k]$ is the mean spectrum directly before the end of the CM candidate domain, $S_4[k]$ is the mean spectrum of the sound domain directly after the start of the CM candidate domain and $S_{norm}$ is the proper standardization coefficient.

The supplementary condition calculation unit 20 additionally describes the feature values $Q_1$ to $Q_{11}$ in the CM candidate table 19a, and outputs the result as a CM candidate table 20a, which is sent to the supplementary condition decision unit 21.

The supplementary condition decision unit 21, fed with the CM candidate table 20a, converts the feature value of the CM candidate by a threshold value function into non-linear parameters and executes weighted addition to calculate a score R for the CM candidate. If R is more than a pre-set threshold value, the supplementary condition decision unit 21 decides that the CM candidate is a highly probable CM candidate. The supplementary condition decision unit 21 additionally describes the score R and the results of the score decision Z in the CM candidate table 20a to output the result as a CM candidate table 21a.

Figure 17:
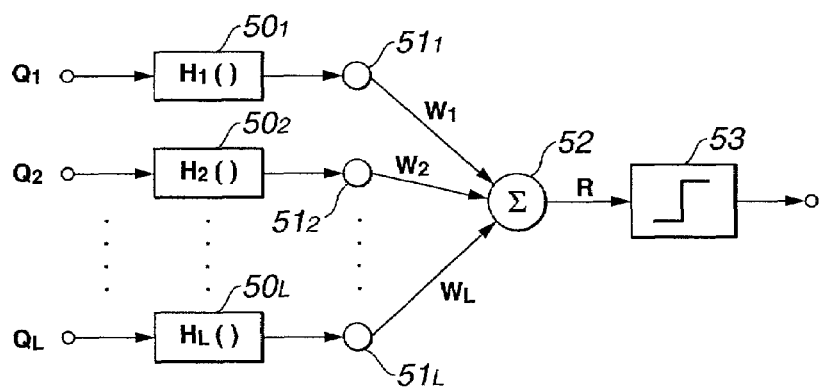
FIG. 17 shows the structure of an additional condition calculating unit.

FIG. 17 shows a schematic structure of the supplementary condition decision unit 21.

In FIG. 17, the feature values $Q_1$ to $Q_{11}$ of the CM candidate table 21a are sent to the associated function calculating units $50_1$ to $50_L$ and subjected to conversion calculations by associated parameter conversion functions $H_1(\ )$ to $H_L(\ )$. The resulting feature values are multiplied with weights $W_1$ to $W_L$ by associated weighting units $51_1$ to $51_L$. The feature values, thus weighted by the weighting units $51_1$ to $51_L$, are sent to the sum addition unit 52 where they are summed together to calculate a score R. The score R output from the sum addition unit 52 is compared to a pre-set threshold value in a score decision unit 53. If the score R output from the sum addition unit 52 is not less than a pre-set threshold value, the result of decision to the effect that the CM candidate is a highly promising candidate. The CM candidate decided by the score decision unit 53 as being less than the pre-set threshold is erased from the table.

More specifically, the score calculation in the supplementary condition decision unit 21 is executed in accordance with the equation (22):

$$R = \sum_{l=1}^{L} W_l H_l(Q_l) \tag{22}$$

where $H_1()$ is a parameter conversion function predetermined for each feature value, $W_1$ is a pre-set weight and L is the number of features (=11). Meanwhile, 1 is an optional number from 1 to 11.

Figure 18A:
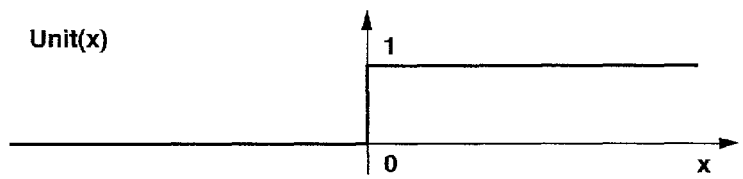
FIGS. 18A-C illustrate a unit step function, a rectangular function and a sigmoid function.
Figure 18B:
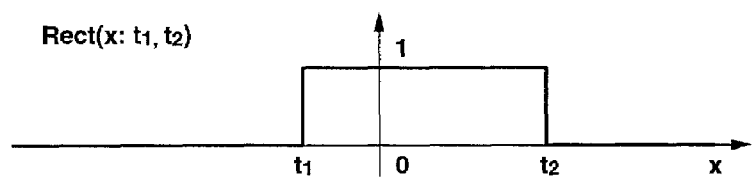

It is noted that the parameter conversion functions $H_1()$ to $H_L()$ in the function calculating units $50_1$ to $50_L$ may most simply be rectangular functions. For example, the rectangular function Rect $(x;t_1 \cdot t_2)$ as shown for example in FIG. 18b is used, lower and upper limit values of the standard value previously set for each feature value are set to $t_{11}$, $t_{21}$ which are 1 and 0 if, for example, $Q_1$ is or is not within the range of the standard value, respectively, in accordance with the following equation (23):

$$H_1(Q_1) = \text{Rect}(Q_1; t_1, t_2) \tag{23}$$

If transition from 0 to 1 or from 1 to 0 is to be smooth in the vicinity of the aforementioned boundary, a sigmoid function Sigm $(x;t_1 \cdot t_2)$ as shown for example in the following equation (24):

$$H_l(Q_l) = \tag{24}$$
$$Sigm(Q_l; t_{1l}, t_{2l}) = \frac{1}{1 + \exp\{-(x - t_{1l})/\sigma_{1l}\}} \cdot \frac{1}{1 + \exp\{(x - t_{2l})/\sigma_{2l}\}}$$

where 1 is an optional number from 1 to 11.

Figure 18C:
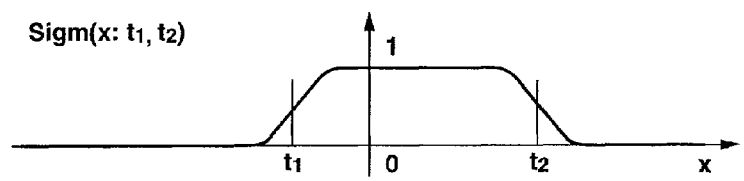

FIG. 18C show its schematics. Meanwhile, $\sigma_{1l}$, $\sigma_{2l}$ are constants representing the degree of transition and are determined at the outset based e.g., on the distribution of the feature values.

Although the weight $W_1$ by the weighting units $51_1$ to $51_L$ may be artificially set at the outset based on statistic properties of the feature values, the weight value may be determined automatically by learning in accordance with the teaching of Nakagawa et al., "Pattern Information Processing", Maruzen, 1999, on the neural network for known leaning samples.

The score decision by the above score decision is given by threshold value processing of the score R as shown by the following equation (25):

$$Z = \text{Unit}(R - t_r) \tag{25}$$

where Unit(x) is a unit step function which is 1 and 0 for x>0 and x<0, respectively, and tr is a threshold value which is pre-set or automatically determined by learning.

The rule decision unit 22 is fed with CM candidate table 21a obtained by score decision in the supplementary condition decision unit 21 to output the CM start time and length as the ultimate CM detection output 4a by pre-set rule decision which will be explained subsequently. That is, the rule decision unit 22 decides by rule processing which one of plural concurrent CM candidates is most probable as the CM. This state is referred to below as the competing relationship.

Figure 19:
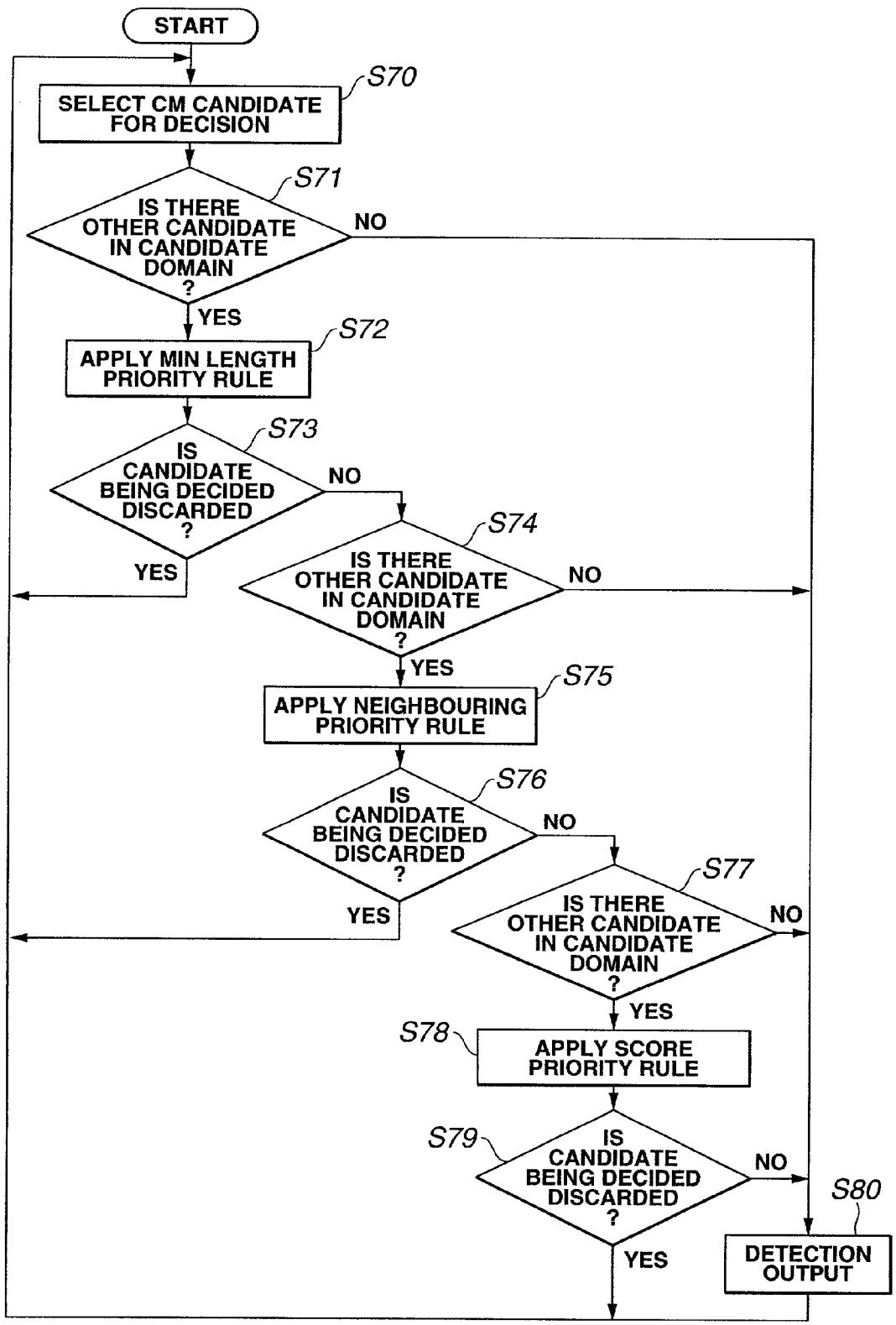
FIG. 19 is a flowchart showing the flow of the operation of a rule decision unit.

The operation of the rule decision unit 22 is now explained using the flowchart of FIG. 19.

First, the rule decision unit 22 selects at step S70 a CM candidate for decision from the CM candidate table. The CM candidate, so selected, is the oldest candidate in the CM candidate table, and is selected beginning from the candidate for which the pre-set time $T_4$ has elapsed. The time $T_4$ is the time length within which several CMs are safely comprehended and may, for example, be 150 sec.

The rule decision unit 22 at step S71 retrieves the CM candidate table as to whether or not another CM candidate exists in the domain of the selected CM candidate (the time domain from $T_s$ to $T_s+T_w$). If it is determined that there is no such CM candidate (NO), this CM candidate is output as the CM detection output and erased from the CM candidate table.

If it is found at step S71 that there is such CM candidate (YES), these CM candidates are deemed to be in the competing relationship and the minimum length priority rule is first applied at step S72. This minimum length priority rule states that, if a given time domain is comprised of a plurality of CM candidates of different time lengths, either alone or in a set or sets, such a CM candidate or a set of the CM candidates having a shorter time length is to be selected. That is, the rule states that, if a sole 30-sec CM possibility and a combination of two CM possibilities exist in a sole 30 sec time domain, the 15-sec CM is selected, while the 30 sec CM is discarded.

Figure 20:
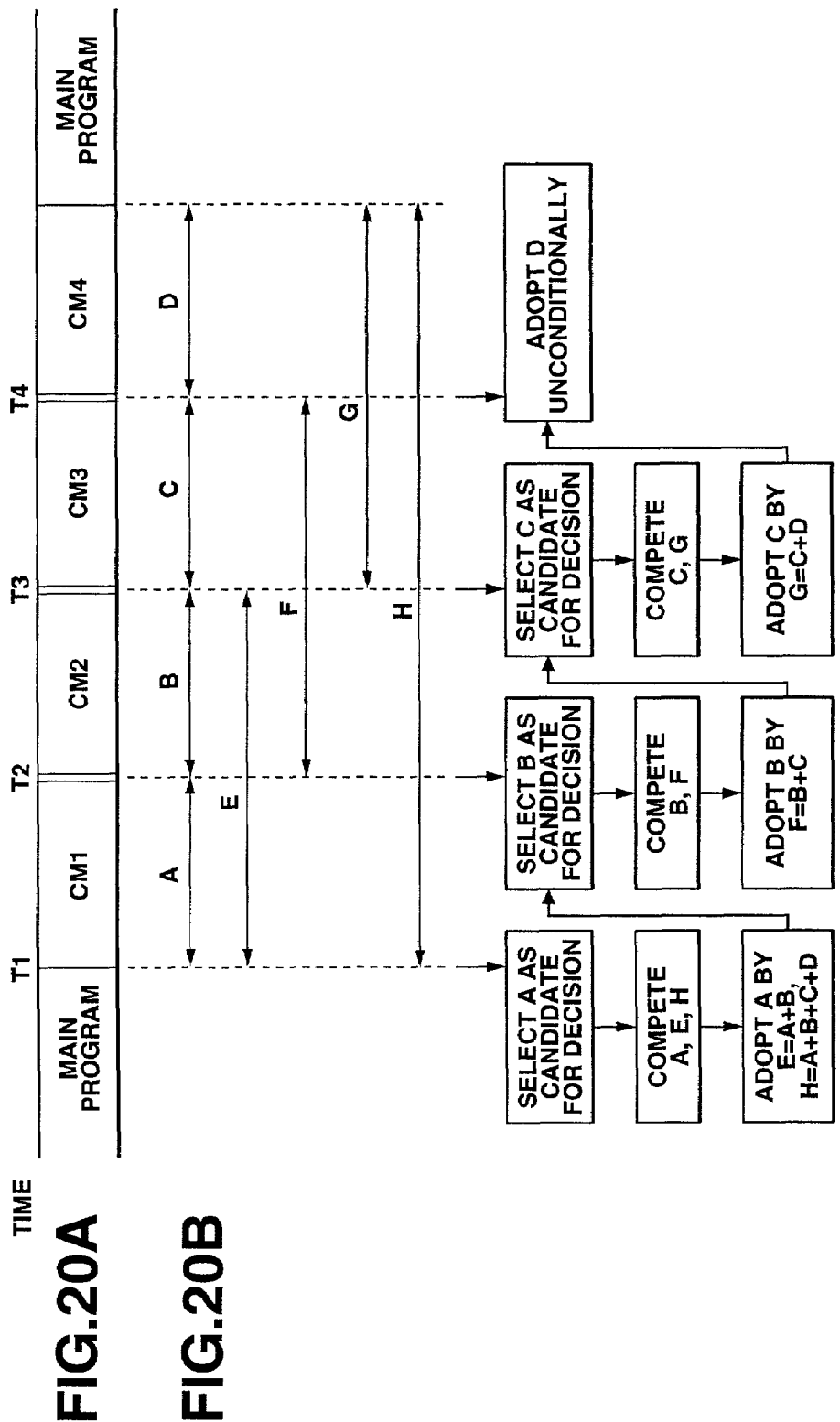
FIGS. 20A-F illustrate the minimum length priority rule.

Referring to FIG. 20, an exemplary case of this minimum length priority rule is explained.

In this exemplary case, eight candidates indicated A to H in FIG. 20B exist in the CM candidate table for a domain for which in actuality four CM1 to CM4, indicated in FIG. 20A, are aired in succession.

If the CM candidate A is being checked, as shown in FIG. 20C, the candidates competing with this candidate A are E and H. However, since the domain E may be stated by A and B, while the domain H may be stated as A, B, C and D, these are discarded, so that A is accepted. If then B is being checked, as shown in FIG. 20D, F is the competing counterpart. At this time, E and H are already discarded by the decision of A. The domain F may be stated by B and C and hence is discarded, while B is accepted. Similarly, if C is being checked, as shown in FIG. 20E, G is the competing counterpart. The domain G may be stated by B and C and hence is discarded, so that C is accepted. Finally, should D be checked, as shown in FIG. 20F, there exists no competing counterpart, so that, after all, there is no necessity of applying this decision rule, such that D is directly accepted.

From the foregoing, A to D are selected as the CM candidates. The competing relationship for which this decision rule cannot be applied is left unchanged in the CM candidate table to terminate the processing.

Returning to FIG. 19, the processing in the rule decision unit 22 after rule decision at step S72 transfers to step S73 where the rule decision unit 22 verifies whether or not, as the result of applying the minimum length priority rule, the CM being checked has been discarded. If it is verified at this step S73 that the CM being checked has been discarded (YES), the rule decision unit 22 erases the candidate from the CM candidate table to revert to step S70. If it is verified at this step S73 that the CM being checked has not been discarded (NO), the rule decision unit 22 at step S74 again retrieves the table to check whether or not there exists another CM candidate in the CM candidate domain being checked.

If it is verified at this step S74 that there is no other CM candidate (NO), the rule decision unit 22 at step S74 again retrieves the table to check whether or not there is any other CM candidate in the CM candidate domain being checked.

At step S75, the rule decision unit 22 applies the neighbor priority rule. This neighbor priority rule states that, if there persists the competing relationship among plural CM candidates, the CM candidates existing directly ahead or at back of the respective competing CM candidates are retrieved and the CM candidate having such neighbor candidate is to be preferred.

Figure 21:
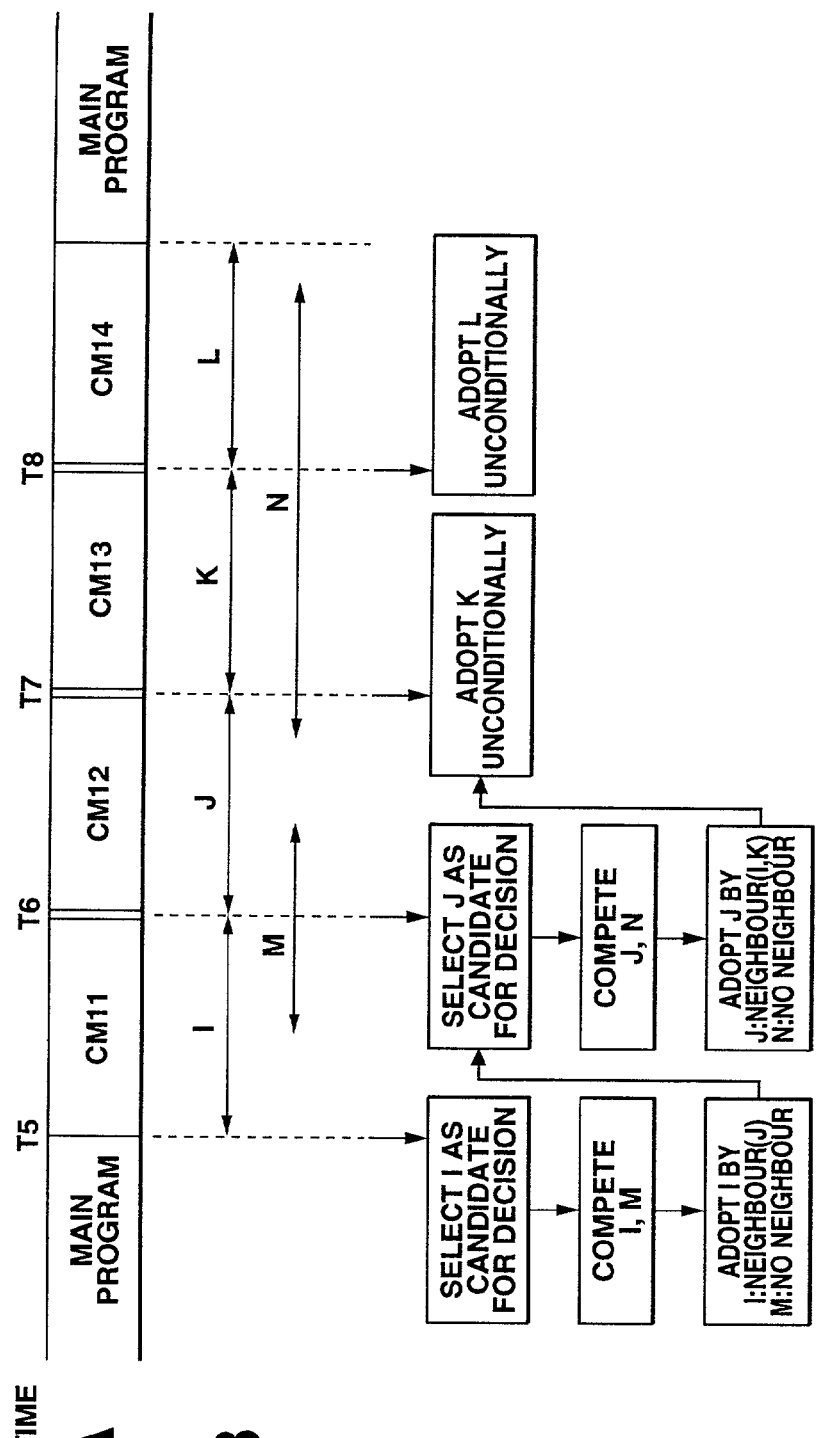
FIGS. 21A-F illustrate the adjacency priority rule.

Referring to FIG. 21, the neighbor priority rule is explained.

In the present case, there is shown such an instance that there exist six candidates, indicated 1 to N in FIG. 21B, for a domain in which four CMs, that is CM11 to CM14, are being aired in succession, as shown in FIG. 21A. In this case, the candidates M and N have become candidates because there fortuitously occurred cut change or small sound volume domain in the CM. However, these domains contain CM as contents, even if these are incorrect domains. Thus, there are cases where these are not discarded even by score decision of the supplementary conditions applied for verifying the CM-likeness.

In the present instance, the oldest I becomes the candidate for decision, as shown in FIG. 21C. Although M competes with I, M has no neighboring candidate, even though I has the neighbor candidate. So, M is discarded to accept I. If J has become the candidate for check, J has a competing candidate N, as shown in FIG. 21D. However, N has no neighboring candidate, while J has neighbor candidates I and K, so that J is accepted, while N is discarded. Then, since the remaining candidates K, L are depleted of competing candidates, as shown in FIGS. 21E and 21F, this rule is not applied, but K and L are directly accepted.

It is seen from above that from the domain shown as an example, I, J, K and L are selected as CM candidates.

If there is no neighbor candidate in any of the competing candidates, and also if there are respective neighbor candidate for the plural candidates, these are not discarded but are left in the CM candidate table.

Returning to FIG. 19, the rule decision unit 22 after processing at step S75 proceeds to step S76, where the rule decision unit 22 checks whether or not, as the result of the application of the neighbor priority rule, the CM being checked has been discarded. If it is verified at this step S76 that the CM being checked has been discarded (YES), the rule decision unit 22 discards the candidate from the CM candidate table to revert to processing at step S70. If, at step S76, the CM being checked is not discarded (NO), the rule decision unit 22 retrieves the CM candidate table to check as to whether or not another CM candidate exists in the domain of the CM candidate being checked.

If it is verified at this step S77 that no other CM candidate exists (NO), the rule decision unit 22 outputs CM candidate being checked from the CM detection output to erase the output CM candidate from the CM candidate table. If conversely the rule decision unit 22 has decided at step S78 that an other CM candidate exists (YES), the rule decision unit 22 at step S78 applies the score priority rule, which states that, if the competing relationship is not resolved by the above respective rules, such a candidate having a high value of the decision score R obtained by the supplementary condition decision unit 21 is preferred. This score priority rule is repeatedly applied until the competing relationship is resolved.

Figure 22:
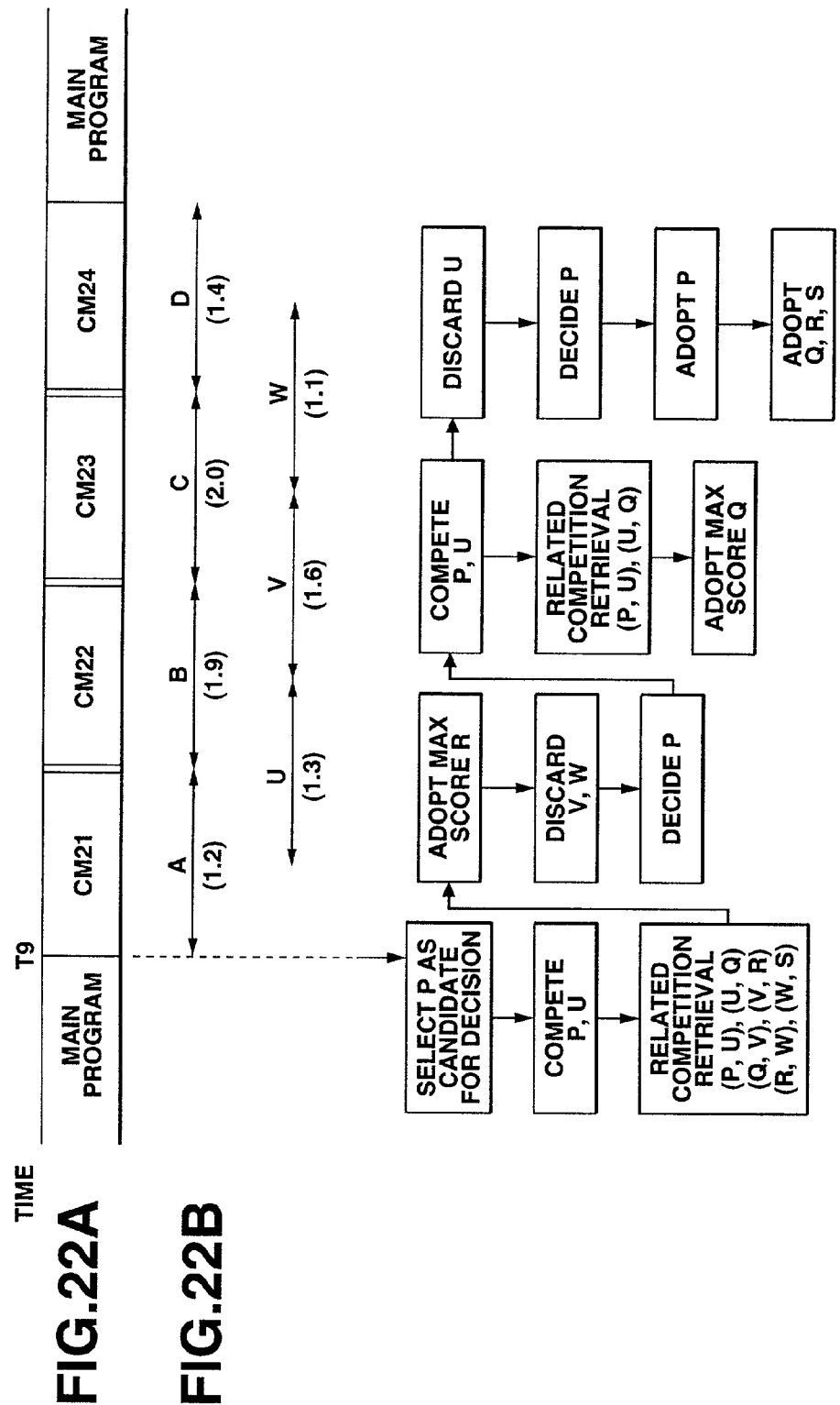
FIGS. 22A-F illustrate the score priority rule.

Referring to FIG. 22, the score priority rule is explained.

In FIG. 22A, there is shown an instance in which, for a domain in which in effect four CMs, namely CM21 to CM24 are aired in succession, there are seven candidates P to W shown in FIG. 22B.

In the present instance, the oldest P is a candidate to be checked, as shown in FIG. 22C. However, the competing relationship is not resolved by the minimum length priority rule, nor by the neighbor priority rule.

So, in this case, all of the competing relationships relevant to these competing candidates, are retrieved from the CM candidate table. That is, since the six competing relationships of P-U, U-Q, Q-V, V-R, R-W and W-S, pertinent to the seven candidates, are relevant, the score priority rule accepts the candidate with the highest score from these relevant candidates. Since the decision score R (2.0) is the highest score, this score is selected, so that the candidates in the competing relationship with R are discarded, as shown in FIG. 22D.

However, this does not resolve the competing relationship P-U, as shown in FIG. 22E. So, the totality of the competing relationships pertinent to the above are again retrieved from the CM candidate table. Since V has been discarded, there are left only two competing relationships of P-U and U-Q, involving three candidates.

Of these candidates, the candidate Q (1.9) having the highest score is accepted, while the candidate U in the competing relationship with Q is discarded, as shown in FIG. 22F.

The above resolves the competing relationship involving P so that P is accepted. On the other hand, U, V and W are all discarded to accept Q, R and S.

If the totality of the relevant competing relationships are not retrieved, and the score priority rule is applied with respect only to the competing relationship in question, herein P and U, U is first accepted, while P is discarded. Subsequently, this U, once accepted, is discarded due to the competing relationship between U and Q. So, in the rule decision unit 22, the relevant competing relationship is retrieved so that the candidate P will not be discarded by fortuitous processing sequence.

By the above-described score priority rule, the competing relationship relevant to the selected candidates is necessarily resolved.

Returning to FIG. 19, the rule decision unit 22 after processing at step S78 proceeds to step S79. At this step S79, the rule decision unit 22 verifies whether or not, as the result of the application of the score priority rule, the candidate being checked has been discarded. If it is verified at this step S79 that the candidate being checked has been discarded (YES), the rule decision unit 22 discards the candidate from the CM candidate table to revert to step S70. If the candidate has not been discarded at step S79, the rule decision unit 22 outputs the start time and its length as a CM detection output at step S80 and reverts to step S70 after erasure from the erases the CM candidate table.

In the above-described CM detection section of the first embodiment of the present invention, CM candidates are deterministically extracted from the program based on the indispensable conditions to be satisfied by almost all CMs, the candidates are selected by statistic evaluation of the feature values based on the supplementary conditions as the indices for CM-likeness and the candidate overlap is resolved by the logical condition to realize highly accurate CM detection. Although the case of reception of the current analog TV broadcast is taken as an example, it is apparent that. a similar CM detecting sections may be used for digital TV broadcast. If the present embodiment is applied to e.g. radio broadcast, it is possible to realize a similar function by omitting a portion responsible for image signals may be omitted from the CM detecting section.

A second embodiment of the CM detecting section according to the present invention is hereinafter explained.

Figure 23:
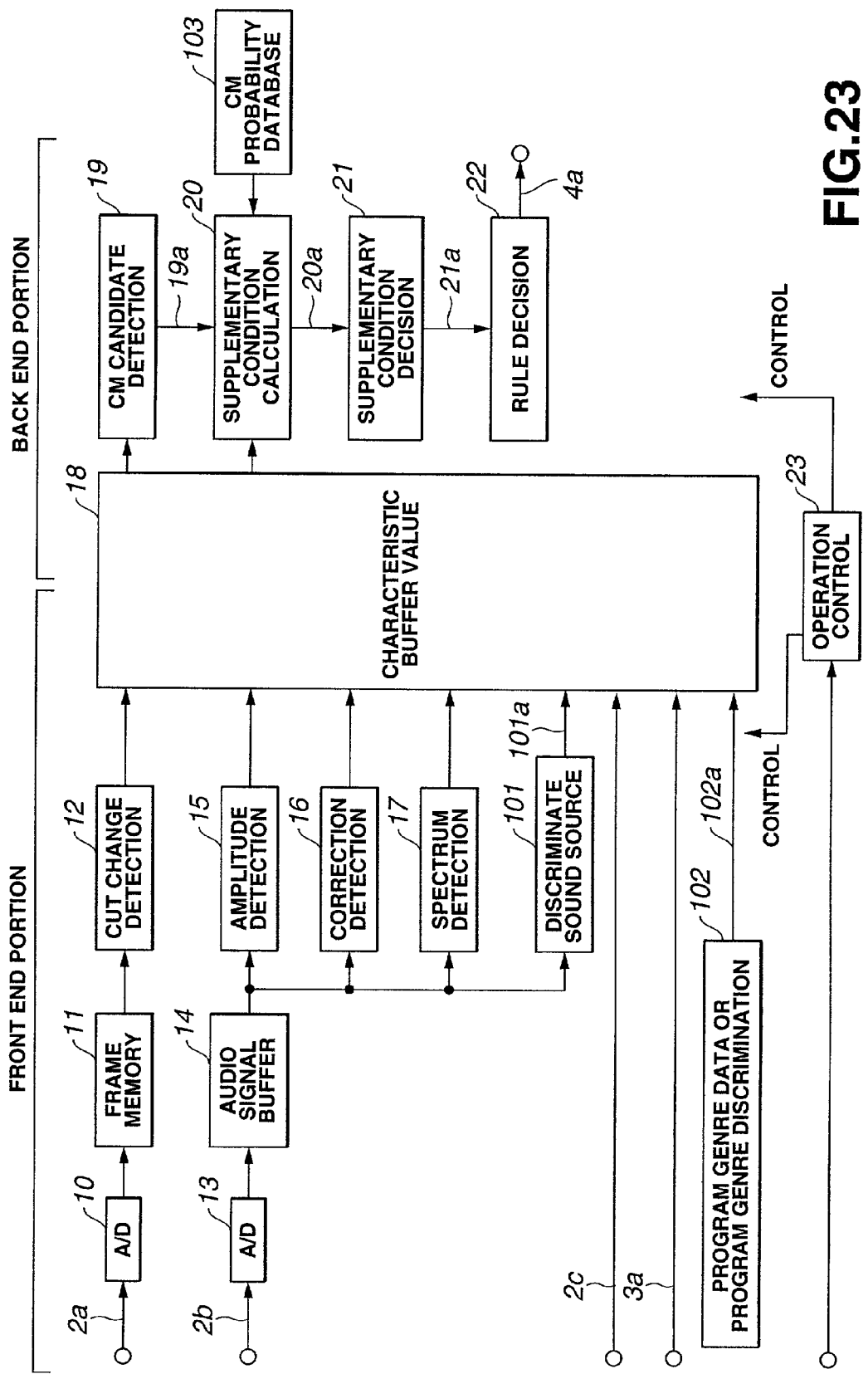
FIG. 23 illustrates details of a CM detection unit of a second embodiment.

FIG. 23 shows a detailed structure of the second embodiment of the CM detecting section according to the present invention.

For avoiding complexity of and simplifying the device structure, the present second embodiment of the CM detecting section loads only the basic portions of the aforementioned supplementary conditions without introducing the conditions 11 to 14 from the aforementioned supplementary conditions 1 to 14.

Similarly to the embodiment of FIG. 10, the present second embodiment of the CM detection unit is made up of a front end section and a back end section. In FIG. 23, the portions performing the same operation as that of the corresponding portions shown in FIG. 10 are denoted with the same reference numerals and are not explained specifically.

In the arrangement of FIG. 23, only newly added components (101 to 103) and newly extended function in the-supplementary condition calculation unit 20 are now explained.

A sound source discriminating unit 101, provided in the front end section, is fed with a digitized and framed audio signals 2b to output a sound source name for the relevant frame of the audio signals 2b. The sound source name may, for example, be speech, music, speech and music and so forth. Among the techniques for realizing the sound source discrimination of the input audio signals, which may be exploited, those disclosed in Kawachi et al., "Automatic Classification of Broadcast Sound Based on V. distortion", Shingaku Gihou, DSP97-95/SP97-50, 43/48(1998), in -Minami et al., "Image -Indexing Employing Sound Information and its Application", Shingakuron, Vol. J181-D-11, No. 3, 529/537 (1998) and by Abe, the specification and drawings of Japanese Laying-Open Publication 2001-024980.

Each sound source name, discriminated by the sound source discriminating unit 101, is properly digitized, from frame to frame, such as, for example, speech=1 and music=2, and input to the feature value buffer 18 as feature values U[n].

A program genre data or program genre discriminating unit 102, provided in the front end section, outputs the genre name of the program currently processed. The program genre may, for example, be news, drama, baseball or soccer. The program genre data may be input from e.g., a TV program table. Recently, it may also be acquired automatically over the Internet. Such a device may be used which discriminates the program genre from the audio and video signals without resorting to the audio or video signals. Meanwhile, the technique disclosed by Abe in the Japanese Laying-Open Publication 2001-024980 may be used as the technique for discriminating the program genre from the audio and video signals.

Each program genre name, discriminated by the program genre or program genre data discriminating unit 102, is properly digitized, from frame to frame, such as, for example, news=1 and drama=2, and input to the feature value buffer 18 as feature values W[n].

The other components of the front end section are the same as those of the embodiment of FIG. 10.

In the present second embodiment, in which the sound source discriminating unit 101 and the program genre or program genre data discriminating unit 102 are provided in the front end section and the respective feature values U[n] and W[n] obtained thereby are stored in the feature value buffer 18, the feature values G[n], shown by the equation (10), may be extended in the feature value buffer 18 as shown by the following equation (26):

$$G[n] = (C[n], A[n], A_{LR}[n], A_{LL}[n], A_{RR}[n], F[k;n], B[n], T[n], U[n]; W[n]) \quad (26).$$

The CM candidate detector 19 of the back end section is entirely the same as that shown in FIG. 10. However, in the present embodiment, CM candidate tables 19a to 21b are extended as follows: That is, in the present CM candidate tables 19a to 21b, feature values $Q_{12}$ to $Q_{15}$ are extended, in addition to the feature values $Q_1$ to $Q_{11}$, as shown in FIG. 24. Meanwhile, in FIG. 24, the feature values $Q_1$ to $Q_{11}$ are not shown for simplicity.

In a CM probability database 103 of the back end section, the CM airing probability conforming to the time zone and the CM airing probability conforming to the program genre and the time elapsed are stored as data. From the CM probability database 103, these probabilities are read out in accordance with the current time so as to be input to the supplementary condition calculation unit 20. Meanwhile, these probability data may be formulated by taking statistics based on the actual broadcast.

The supplementary condition calculation unit 20 of the present second embodiment is extended to perform the calculations of the following feature values $Q_{12}$ to $Q_{15}$ in addition to the feature values $Q_1$ to $Q_{11}$.

The feature value $Q_{12}$ is found by detecting whether or not there is the audio domain in the CM candidate domain. The feature value $Q_{12}$, representing the possible presence of the speech, is detected in accordance with the following equation (27):

$$Q_{12} = \begin{cases} 1 (\text{if } {}^3U[n] = (\text{speech}) \text{ or } {}^3U[n] \\ \qquad = (\text{speech} + \text{music}) \text{ for } n_s \leq n < n_e) \\ 0 (\text{otherwise}). \end{cases} \quad (27)$$

The feature values $Q_{13}$ is found by detecting whether or not there was the music domain in the CM candidate domain as in the case of the possible presence of speech. The feature value $Q_{13}$ representing the possible presence of the music is detected in accordance with the equation (28):

$$Q_{13} = \begin{cases} 1 (\text{if } {}^3U[n] = (\text{speech}) \text{ or } {}^3U[n] \\ \qquad = (\text{speech} + \text{music}) \text{ for } n_s \leq n < n_e) \\ 0 (\text{otherwise}). \end{cases} \quad (28)$$

The feature value $Q_{14}$ is the CM occurrence probability conforming to the current time. The supplementary condition calculation unit 20 directly substitutes the CM airing probability, furnished from the CM probability database 103, into the feature value $Q_{14}$.

The feature value $Q_{15}$ is the CM occurrence probability conforming to the program genre and time elapsed from the program start. The supplementary condition calculation unit 20 directly substitutes the CM airing probability, furnished from the CM probability database 103, into the feature value $Q_{15}$.

The components downstream of the supplementary condition decision unit 21 simply expand the feature values $Q_{12}$ to $Q_{15}$ as variables and are the same as those of the CM detection unit shown in FIG. 10. Therefore, these components are not explained specifically.

In the present CM detection section, CM detection can be performed, by the above extension, depending on the sound source of the aired signals. Moreover, the CM detection section can detect the CM depending on the current time and in meeting with the program genre.

Figure 25:
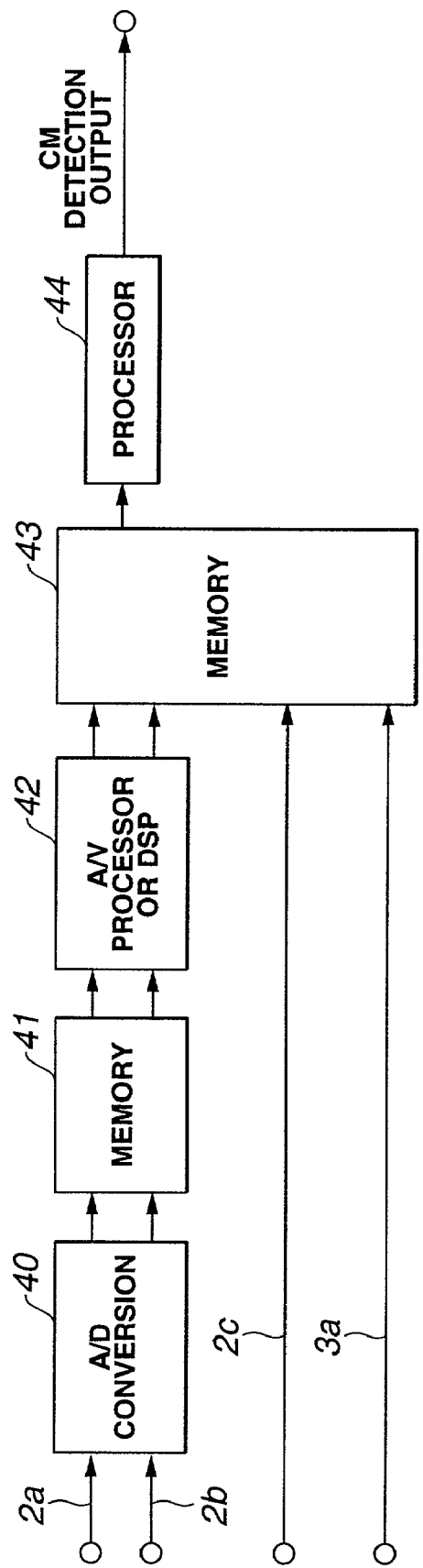
FIG. 25 shows the hardware as an embodiment of mounting the CM detection unit.

FIG. 25 shows an exemplary hardware structure in case of loading the CM detection section shown in FIGS. 10 and 23.

In FIG. 25, an A/D converter 40 has the function of the A/D converters 10, 13 of FIGS. 10 and 23, whilst the memory 41 has the function of the frame memory 11 and the audio signal buffer 14.

An A/V processor or DSP (digital signal processor) 42 has the functions of the cut change detection unit 112, amplitude detector 15, correlation detector 16, spectrum detector 17 and the sound source discriminating unit 101, whilst the memory 43 has the feature of the feature value buffer 18.

The processor 44 has the functions of the CM candidate detector 19, supplementary condition calculation unit 20, supplementary condition decision unit 21, rule decision unit 22 and the CM probability database 103.

The function of the operation controller 23 can be owned by the A/V processor or DSP (digital signal processor) 42 or by the processor 44.

The above-described CM detection section of the present embodiment is able to detect CM portion from the. TV aired signals accurately.

The CM detection/storage/browsing/retrieval unit 331 shown in FIG. 4 is now explained in detail.

Figure 26:
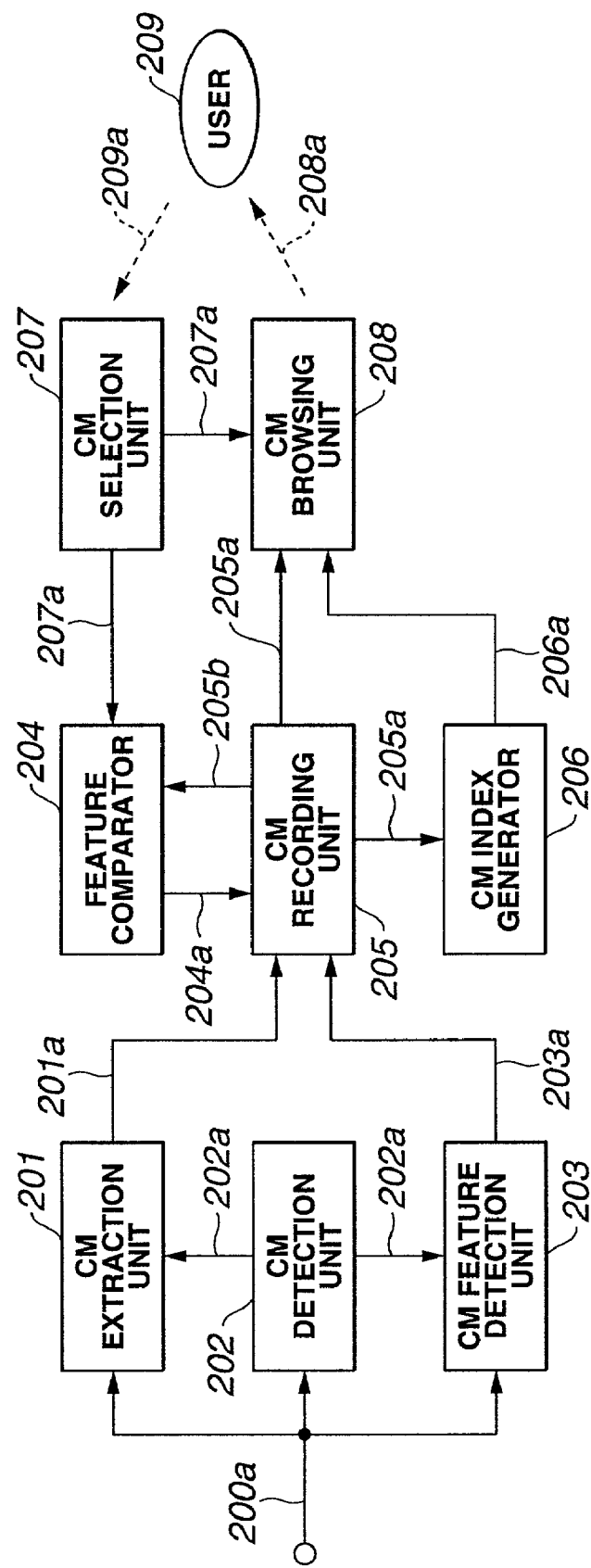
FIG. 26 is a block diagram showing the schematic structure of the present embodiment of a CM detection/accumulation/browsing/retrieval unit.

FIG. 26 shows the schematics of the preferred embodiment of the CM detection/storage/browsing/retrieval unit 331.

The CM detection/storage/browsing/retrieval unit 331, shown in FIG. 26, is fed with a signal 200a(equivalent to the signal 330a of FIG. 4). This input signal 200a may not only be a signal received from the ground wave signal, satellite broadcast, cable broadcast and over telephone network, but may also be the same signal once recorded on a separate recording apparatus, not shown, and subsequently reproduced. The image and speech signals make up the main portion of the aired signal containing the main program and the CM portion. The control signal includes the information on the airing mode, airing time, airing frequency or channel, while the program guide signal includes data pertinent to the video and audio signals received by the digital broadcast or over a telephone network. In the following explanation, it is presumed that these are signals of a sole broadcast program. However, signals of plural channels can be input simultaneously.

In the CM detection/storage/browsing/retrieval unit 331, shown in FIG. 26, a CM detection unit 202 is the same as the aforementioned CM detection section and detects at least the start time of the CM domain, termed the CM start time, and the length of the CM domain (CM length) from the input signal 200a consisting of the video signal/audio signal/control signal/program guide signal the to output a CM detection signal 202a including the CM start time and the CM length. The CM detection signal 202a, detected by the CM detection unit 202, is sent to a CM extraction unit 201 and to a CM feature extraction unit 203.

Based on the CM detection signal 202a, supplied from the CM detection unit 202, the CM extraction unit 201 extracts the signal 201a corresponding to the CM domain from the input signal 202a. That is, the CM extraction unit 201 extracts from the input signal 200a the signal portion corresponding to the CM domain from the CM start time until time specified by the CM length, contained in the CM detection signal 202a from the CM detection unit 202. This signal portion is sometimes referred to below as a CM partial signal 201 a. The CM extraction unit 201 outputs the CM partial signal 201a composed of the video signal/audio signal/control signal/program guide signal corresponding to the CM domain. This CM partial signal 201a is sent to a CM recording unit 205. Meanwhile, since the CM detection signal 202a from the CM detection unit 202 is delayed from the input signal 201 in an amount corresponding to the detection processing. So, the delay is to be absorbed using a transient storage device, installed internally or externally, such as a magnetic recording device.

A CM recording unit 205 is a unit for recording and/or reproducing signals using one or a combination of a magnetic tape, a magnetic disc, a magneto-optical disc, a recordable optical disc or a semiconductor memory. When fed from the CM extraction unit 201 with the CM partial signal 201 a (video signal/audio signal/control signal/program guide signal corresponding to the CM domain), the CM recording unit 205 records the CM partial signal 201a.

Figure 27:
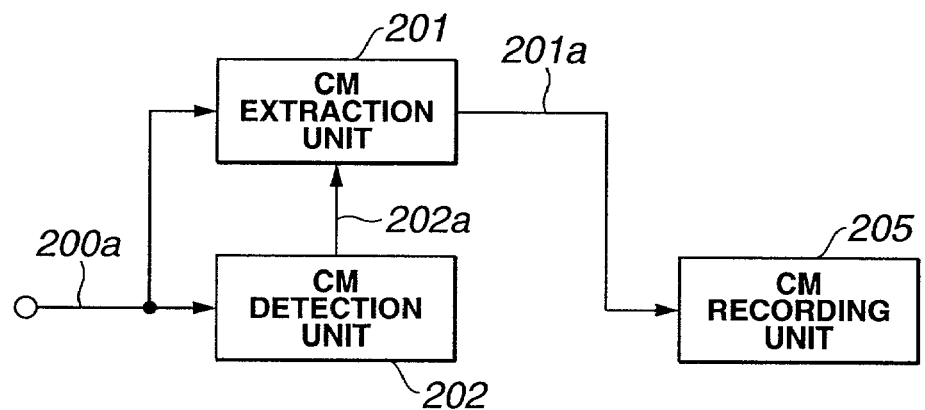
FIG. 27 is a schematic block diagram showing a subset of a CM detection unit, a CM extraction unit and a CM recording unit in the present embodiment of a CM detection/accumulation/browsing/retrieval unit.
Figure 28:
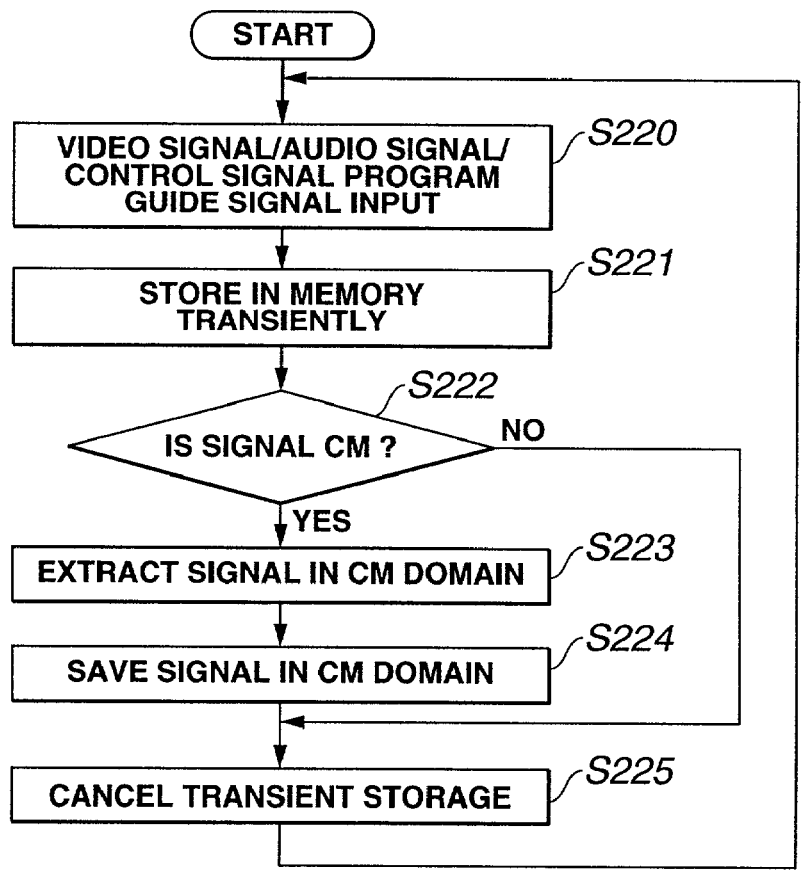
FIG. 28 is a flowchart showing the flow of operations in the subset of FIG. 27.

FIG. 27 shows a subset comprised of the CM extraction unit 201, CM detection unit 202 and the CM recording unit 205 and FIG. 28 shows a flowchart the flow of operations of the components extracted in FIG. 27.

In FIG. 28, when the video signal/audio signal/control signal/program guide signal, as the input signal 200a, is sequentially input at step S220 to the subset of FIG. 27, the input signal 200a is stored at step S221 in the internally or externally mounted temporary storage device in the CM extraction unit 201.

In the subset of FIG. 27, the start time and the length of the CM domain are detected by the CM detection unit 202. At step S222, it is detected whether or not the signal (input signal 100a) is in the CM domain. If the signal is in the CM domain-processing transfers to step S223 and, if otherwise, processing transfers to step S225.

At step S223, the video signal/audio signal/control signal/ program guide signal 201a corresponding to the CM domain is extracted from the input signal 200a by the CM extraction unit 201. At step S224, the extracted signal is saved in the CM recording unit 205.

At step S225, the subset of FIG. 27 discards the signal, transiently stored in the CM extraction unit 201, and reverts to step S220 to repeat the above-described processing.

Reverting to FIG. 26, the CM feature extraction unit 203 extracts the CM feature from the input signal 200a based on the CM detection signal 202a supplied from the CM detection unit 202. That is, the CM feature extraction unit 203 extracts the features of a signal portion in the CM detection signal 202a from the CM detection unit 202 corresponding to the CM domain from the CM start time to the time specified by the CM length, that is extracts the feature value representing the feature as the CM, and outputs the feature value 203a to the CM recording unit 205. The CM detection signal 202a from the CM detection unit 202 undergoes the delay, corresponding to the detection processing time with respect to the input signal 200a supplied from the CM detection unit 202. So, the CM feature extraction unit 203 absorbs the delay using a transient storage device comprised of the infernally or externally mounted magnetic recording device. The transient storage device of the CM extraction unit 201 can be used simultaneously as the transient storage device comprised of the internally or externally mounted magnetic recording device. .

As the feature values characterizing the CM, part or all of physical values, such as amplitude feature values, extracted from the audio and video signals, now explained, that is the spectrum feature value, linear prediction coefficients, luminance histograms and color histograms, average luminance, luminance difference value, number of times of cut-changes or tine of cut-changes, may be used. These feature values are of the same pattern in the same CM and of different patterns in different CMs so that these feature values may be said to characterize the CM.

In the following explanation, it is assumed that the input audio and video signals are discretized, the input audio signals are represented by S[m] indicated in FIG. 29B, discretized time is represented by m=0, 1, . . . , M−1 and the discrete time corresponding to the frame processed is represented by M. It is also assumed that the input video signals are represented by I[x, y; l] shown in FIG. 29A, respective image frames of an input image are represented by l=0, 1, . . . , L−1, the number of image frames corresponding to the frame processed is represented by L, the pixel number in the transverse direction is denoted by x=0, . . . , X−1, the image size in the transverse direction is represented by X, the pixel number in the longitudinal direction is represented by y=0, . . . , Y−1 and the image size in the longitudinal direction is represented by Y. The frame processed is the processing unit of a pre-set time length and is e.g., 250 msec. The number of frames corresponding to the CM domain length is represented by N, as shown in FIG. 29C.

The respective feature values are hereinafter explained.

First, the amplitude feature value A of the frame processed A[n] is the mean square amplitude value of the audio signal in the frame n and is obtained as shown by the equation (29):

$$A[n] = \frac{1}{M}\sum_{m=0}^{M-1} S^2[m+nM]. \quad (29)$$

A vector for the entire frames of this CM domain is represented by A=(A[0], A[1], . . . , A[N−1]).

The spectrum feature value F[k;n] of the frame processed n is the mean spectrum in the frame n, and is obtained as shown in the equation (30):

$$F[k; n] = \left|\sum_{m=0}^{M-1} S[m]e^{-2\pi jmk/M}\right|^2 \quad (30)$$

where k=0, . . . , K is the number representing the discretized frequency and K is the maximum frequency under consideration. This calculation processing is mounted using e.g., FFT or linear prediction analysis. In the frequency discretizing step, k in the equation (30) may be discretized by re-discretizing k in the equation (30). The frequency may be discretized at an interval of 1 kHz (linear processing) or at an interval of one octave (non-linear processing). A vector obtained for the entire frames of the CM domain of the discretized frequency is represented by F=(F[0; 0], F[1;0], . . . , F[K−1; N−1]).

The linear prediction coefficient P [k; n] is calculated by LPC algorithm as described Markel et al., "Linear Prediction of Speech", Springer-Verag, 1978, etc. K=0, . . . , K−1 are numbers representing the linear prediction coefficients and K is a prediction order. A vector prepared for the entire frames of respective CM domains of the linear prediction coefficient is represented as P=(P[0;0], P[1;0], . . . , P[K−1;N−1]).

The luminance histograms $H_1[q; n]$ of the frame processed n are luminance histograms of image signals in the frame n, where q=0, . . . , Q−1 are index numbers representing the mesh for luminance and Q is the number of meshes of the histograms.

The color histograms $H_C[q; n]$ of the frame processed n are histograms of the signal intensity histograms in the frame n, where q=0, . . . , Q−1 are index numbers representing the meshes of the color and the signal intensity and Q is the number of meshes of the histograms.

The vectors prepared for the entire frames of the respective CM domains of the color histograms are represented as $H_1$=($H_1[0; 0]$, $H_1[1; 0]$, . . . , $H_1[Q−1; N−1]$) and HC=($H_C[0; 0]$, $H_C[1; 0]$, . . . , $H_C[Q−1; N−1]$).

The mean luminance B[n] of the frame processed is the mean luminance of image signals in the frame n and may be found by the following equation (31):

$$B[n] = \frac{1}{XYL}\sum_{l=0}^{L-1}\sum_{x=0}^{X-1}\sum_{y=0}^{Y-1} I[x, y; l]. \quad (31)$$

The vector obtained for the totality of frames in the CM domain is represented by B=(B[0], B[1], . . . , B[N−1]).

The luminance difference energy D[n] of the frame processed n is the pixel-to-pixel difference energy of adjacent image frames and may, for example, be found from the equation (32):

$$D[n] = \frac{1}{XY(L-1)}\sum_{l=1}^{L-1}\sum_{x=0}^{X-1}\sum_{y=0}^{Y-1} (I[x, y; l] - I[x, y; l-1])^2, \quad (32)$$

The vector prepared for the totality of frames in the CM domain are represented by D=(D[0], D[1], . . . , D[N−1]). For these calculations, the block-to-block difference, such as different of average luminance of the entire displayed image or 8×8 or 16×16 pixels in the horizontal and vertical directions, may be used.

The number of cut changes in the frame processed n C[n] is the number of frames in which the pixel different energy between neighboring image frames in the frame processed n exceeds a pre-set threshold, and may be found by the following equation (33):

$$C[n] = \operatorname*{Count}_{l=1}^{L-1}\left(\sum_{x=0}^{X-1}\sum_{y=0}^{Y-1}(I[x, y; l] - I[x, y; l-1])^2 \geq D_{thsd}\right). \quad (33)$$

Where $\operatorname{Count}^b_a$ is a function representing the number of times the evaluation equation f is met in the domain from a to b and $D_{thsd}$ is a pre-set threshold pertinent to the luminance difference energy. The vector obtained for the totality of frames processed in the CM domain is represented by C=(C[0], C[1], . . . , C[N−1]).

The time point of cut change may be found as the frame-number n for which C[n]>0, while the number of times of cut change for the entire CM domain may be found as the sum total of C[n].

The CM feature extraction unit 203 extracts part or all of the feature values, explained previously, from one CM domain to another. That is, the feature values characterizing the CM domain may be represented by the vector V represented by the following equation (34):

$$V=(A,F,P,H_1,H_C,B,D,C) \quad (34)$$

while the feature values v may also be represented by the following equation (35):

$$V=(V[0],V[1],\ldots,V[N-1]) \quad (35)$$

where V[n] is the vector prepared for the respective feature values as indicated by the following equation (36):

$$V=(A[n],F[k;n],P[k;n],H_1[n],H_C[n],B[n],D[n],C[n]) \quad (36).$$

The above feature values, extracted by the CM feature extraction unit 203, are stored in the CM recording unit 205, along with the partial CM signals 201a (video signal/audio signal/control signal/program guide signal) equivalent to the CM domain, which are extracted by the above-described CM extraction unit 201.

Figure 31:
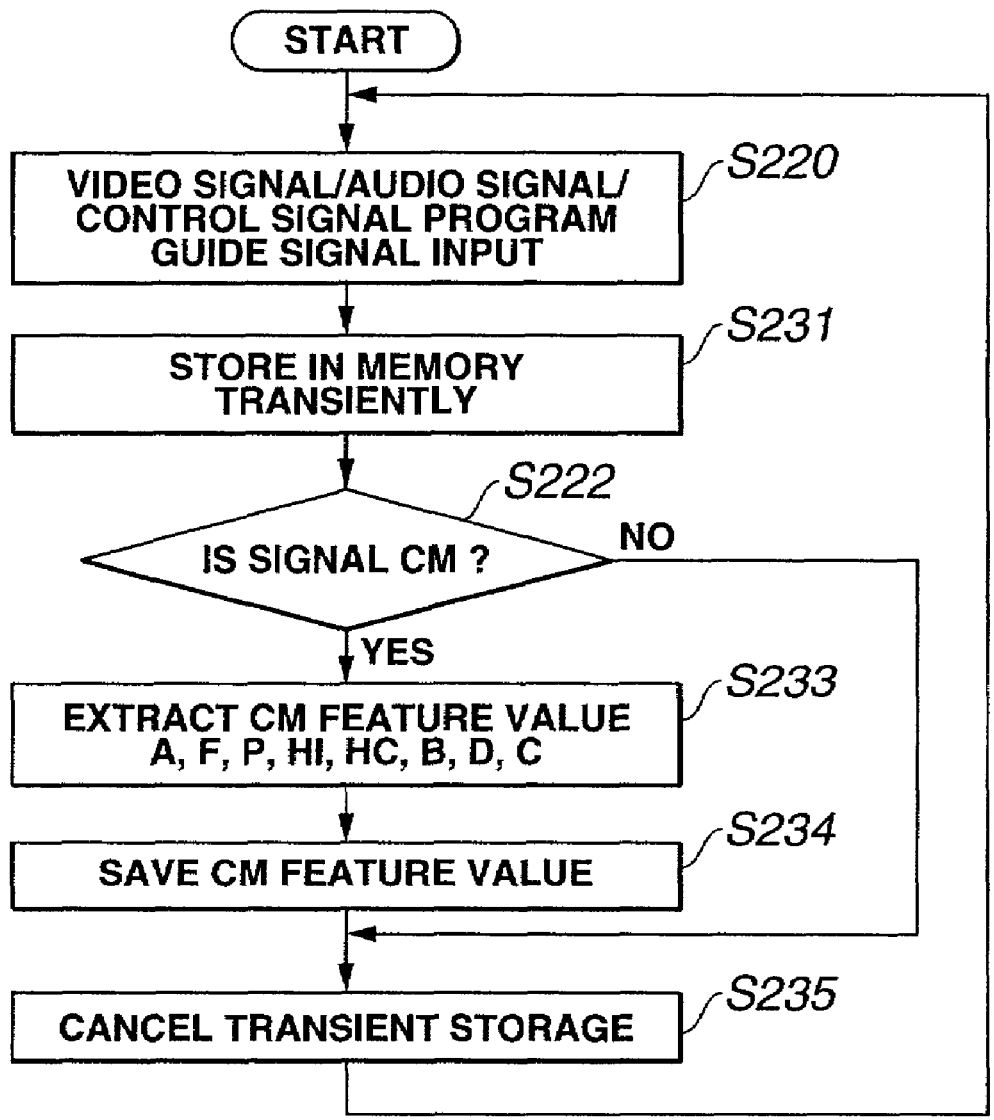
FIG. 31 is a flowchart showing the flow of operations in the subset of FIG. 30.

FIG. 30 shows a subset comprised only of the CM extraction unit 201, CM detection unit 202, CM feature extraction unit 203 and the CM recording unit 205. FIG. 31 shows a flowchart showing the flow of operations of the subset extracted in FIG. 30. Meanwhile, the portion of the flowchart of FIG. 31 overlapping with FIG. 28 are indicated by the same reference numerals as those of FIG. 28, so that only the portions pertinent to the CM feature extraction unit 203 are explained.

Referring to FIG. 31, the subset of FIG. 30 proceeds to processing at step S233 after the processing at step S220. When the input signal 200a, that is the video signal/audio signal/control signal/program guide signal, is sequentially input, the input signal 200a is saved in the internally or externally mounted transient storage device of the CM feature extraction unit 203.

If simultaneously the start time and the length of the CM domain are detected by the CM detection unit 202, and the domain is verified at step S222 to be the CM domain, the subset transfers to the processing at step S223. If otherwise, the subset transfers to the processing at step S235.

If the subset of FIG. 30 transfers to processing at step S232, the CM feature extraction unit 203 extracts the CM feature values from the video signal/audio signal/control signal/program guide signal corresponding to the CM domain, and saves the extracted feature values at step S234 by the CM recording unit 205.

If subsequently the subset transfers to processing at step S235, it discards the signal transiently stored in the CM feature extraction unit 203 and reverts to step S220 to repeat the above-described processing.

Reverting to FIG. 26, the partial CM signal equivalent to the CM domain recorded in the CM recording unit 205 as described above (video signal/audio signal/control signal/program guide signal) 201a and the feature value 203a of the CM domain are read out from the CM recording unit 205 and thence supplied to a CM index generating unit 206 and to a CM browsing unit 208 corresponding to the display unit 332 of FIG. 4.

The CM index generating unit 206 generates the index information for the CM, based on the CM partial signal 201a and the feature value 203a, to route the information, referred to below as the CM index information 206a, to the CM browsing unit 208.

As the CM index information 206a, the information indicating the start point image, cut point image, start part speech and the end part speech, for example, are used.

The CM index information 206a is hereinafter explained.

The start point image, which is the image at the start pont of the CM domain, is used as one of the index information.

The cut point image, which is an image of each cut point of the CM domain, is used as one of the index information. Meanwhile, the cut point is a processing frame for which the feature value C[n] is not less than 0, and hence the image at this time point is used. Since there are usually plural cut points in one CM, a sole picture is selected in accordance with a pre-set reference, such as first or last cut point.

The cut point image, which is images at respective cut points interconnected chronologically to form an image, is used as one of the index information. Since there are usually plural cut points in one CM, the images of the respective cut points are interconnected to form a new image of a short duration.

The start part speech, which is the speech continuing for a pre-set time interval between CM domains, at the beginning portion between the CM domains, for example, the speech continuing for two seconds, is used as one of the index information. In particular, the characteristic speech as a short CM preamble may sometimes exist in the beginning speech part, so that the beginning part speech may be used efficiently as the CM index.

The end part speech, which is the speech continuing for a pre-set time, for example, two seconds, at the end portion f the CM domain, is used as one of the index information. In particular, there exist in many cases names of articles of commerce or such images or speech used commonly by the companies or organizations, so that the end part speech may be used efficiently as the CM index.

The CM browsing unit 208, fed with the CM partial signal 201 a from the CM recording unit 205 and the feature values 203a of the CM domain (these being collectively termed the recording part replay signals 205a) and with the CM index information 206a from the CM index generating unit 206, is made up of a display processor 801 and a display unit 802.

The display unit 802 is made up e.g., of a display device, such as a cathode ray tube (CRT) or a liquid crystal monitor, and presents an image and the speech to a user.

The display processor 801 of the CM browsing unit 208 is also fed with the user selection information 207a generated by a CM selection unit 207 responsive to a selection command 209a by a user 209 (same as the user 333 of FIG. 4). That is, if the user browses at 208a the CM index information, image or the icon demonstrated on the display unit 802, and issues a selection command 209a to the CM index information, image or the icon demonstrated on the display unit 802 through a pointing device, such as a mouse, a remote commander or a touch panel, the CM selection unit 207 generates user selection information 207a corresponding to the input unit 334 responsive to the selection command 209a, which then is sent to the display processor 801 of the CM browsing unit 208.

The display processor 801 is responsive to the CM index information 206a, recording part replay signals 205a (in particular the video/audio signal portion) and the user selection information 207b from the CM selection unit 207 to effect display to be presented to the user. This is implemented by e.g., the processor and the software.

Figure 32:
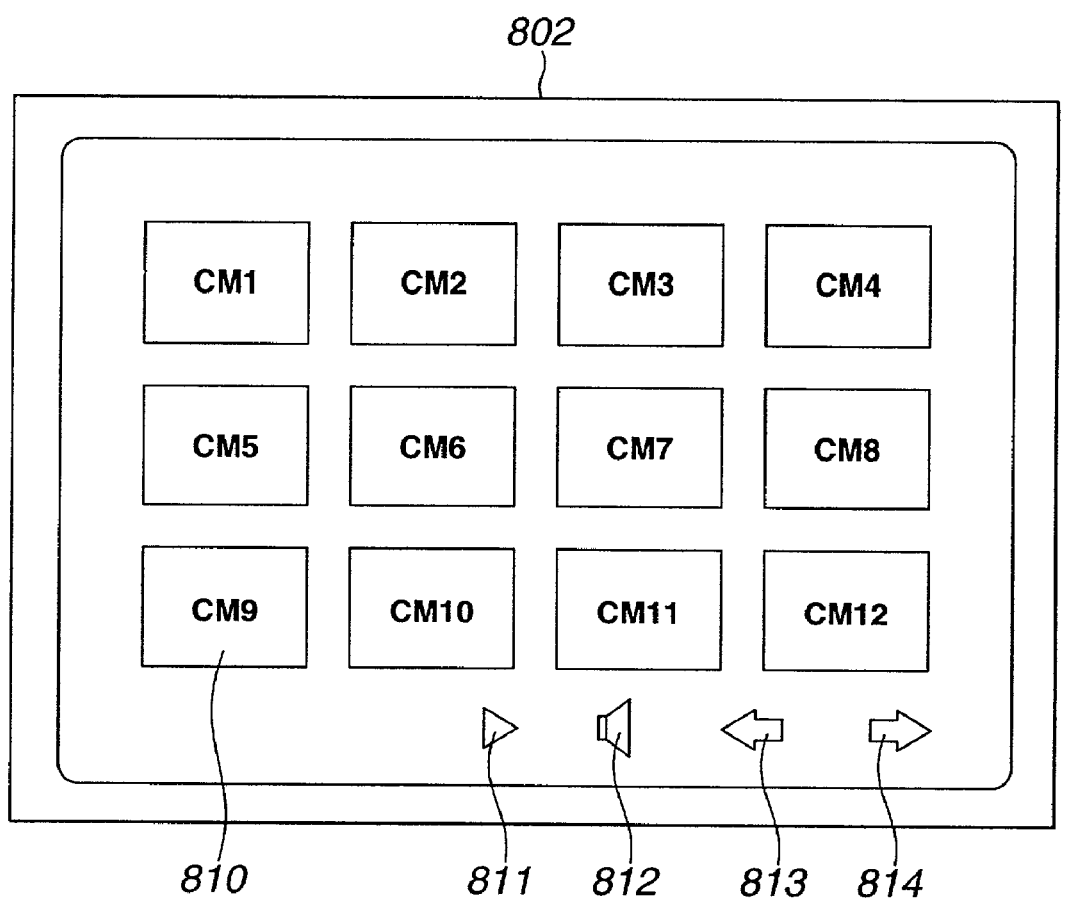
FIG. 32 shows an illustrative display image on a display unit.

Referring to FIG. 32 showing an exemplary display image on the display unit 802, the operation of the display processor 801 is hereinafter explained.

The display processor 801 arrays the CM index information or the image 810 pertinent to plural CMs derived from the CM index information 206a in one image for demonstration on the display unit 802. As the CM index information or the image 810, a start point image or a cut point image of each CM is displayed. If there are a large number of CMs, that is if there is if there is a large number of the CM index information or the images 810, display is made on plural pages. On the other hand, the display processor 801 arrays icons 811 to 814 for inputting the user command in the CM selection unit 207 in one image, along with the CM index information or the image 801, for demonstration on the display unit 802. In the illustrative display of FIG. 32, 12 CM index information or images 810, a CM replay icon 811, an audio replay icon 812, previous page icon 813 and a next page icon 814 are displayed in one image.

If, as the display as shown in FIG. 32 is made, the user selection information 207a is received from the CM selection unit 207, the display processor 801 changes the demonstration based on the user selection information 207a. That is, if the user 209 selects one or more of the plural CM index information or images 810 through e.g., the CM selection unit 207, the display processor 801 demonstrates the CM index information or the image 810 corresponding to the display selection in e.g., a highlighted fashion.

If, as the display as shown in FIG. 32 is made, the user 209 commands the selection of one of the icons through e.g., the CM selection unit 207, the display processor 801 executes the processing in meeting with the selected icon. That is, if if e.g., the CM replay icon 811 is specified by the user selection information 207a, the display processor 801 reproduces the image and the speech of the CM already selected from among the aforementioned CM index images or the images 810. On the other hand, if the next page icon 814 is specified by the user selection information 207a, the CM index image or the images 810 of the next page (another CM index image or the images 810 not browsed) are displayed on the display screen.

Figure 33:
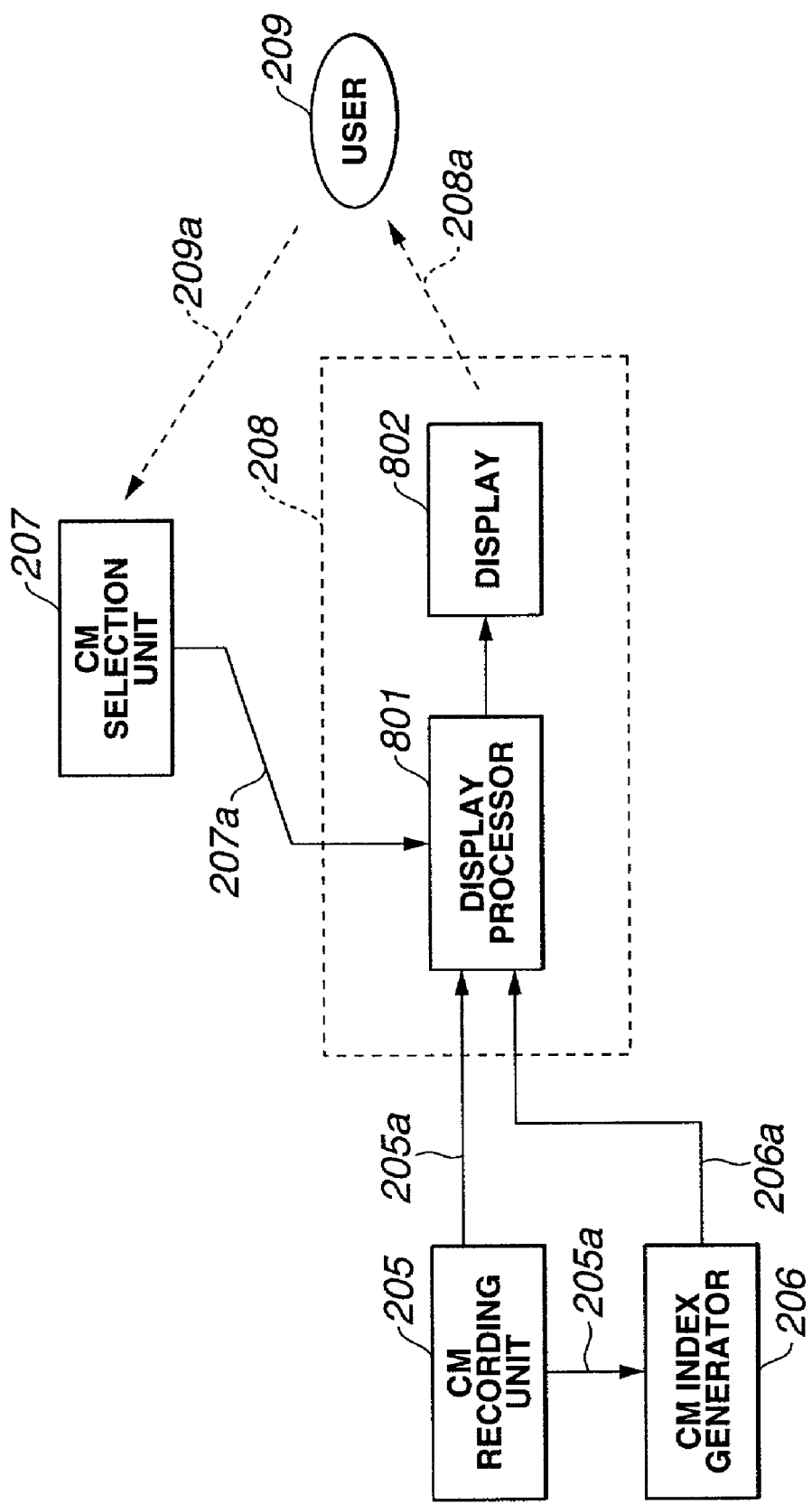
FIG. 33 is a schematic block diagram of a CM recording unit, a CM retrieval generating unit, a CM browsing unit and a CM selection unit in the present embodiment of the CM detection/accumulation/browsing/retrieval unit.
Figure 34:
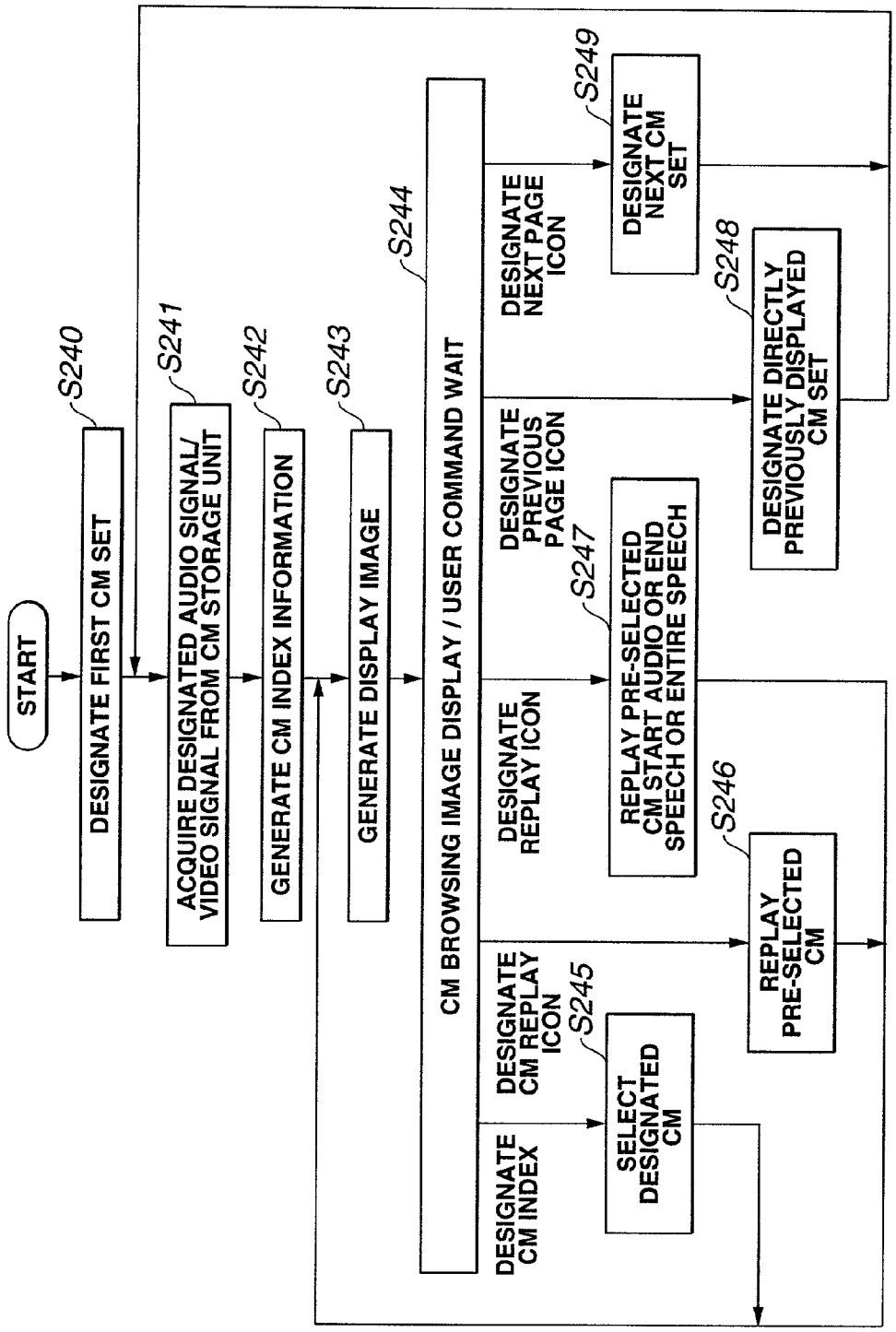
FIG. 34 is a flowchart showing the flow of operation in the subset of FIG. 33.

FIG. 33 shows a subset comprised of the CM recording unit 205, CM index generating unit 206, CM browsing unit 208 and the CM selection unit 207, extracted from the structure shown in FIG. 26, whilst FIG. 34 shows the flow of operations occurring in particular in the CM browsing unit 208 of the subset shown in FIG. 33, as a flowchart.

In FIG. 34, the CM browsing unit 208 first specifies the set of the CMs of the first page of the CMs, as step S240. Then, at step S241, the image/speech signals corresponding to the specified CM set are acquired at step S214 and, subsequently, the CM index information 206a is generated by the CM index generating unit 206. Then,: at step S243, the display processor 801 of the CM browsing unit 208 generates a display image for making the display as shown in FIG. 32, based on the CM index information 206a, to display the image on the display unit 802. At the next step S244, a standby state is set until a command input by the user 209 is made (until the user selection information 207a is input) at step S244.

If the user selection information 207a generated by the CM selection unit 207 responsive to the command input by the user 209 specifies the CM indexing, the display processor 801 at step S245 selects the CM index image or image 810 specified by the user selection information 207a. At step S243, the display processor 801 regenerates the display image of the selected CM index image or the image 810, shown highlighted, for demonstration on the display unit 802 and, at step S244, the display processor 801 is in a standby state to await a command input by the user 209.

If the user selection information 207a specifies the CM -replay icon 811, the display processor 801 at step S246 reproduces the image and speech signals of the CM corresponding to the CM index information or image 810 already specified by the user selection information 207a. At step S243, the display processor 801 re-generates the display image corresponding to the reproduced image signals for demonstration on the display unit 802 and, at step S244, is at a standby state to await a command input from the user 209.

If the user selection information 207a specifies the audio replay icon 812, the display processor 801 causes the start speech, end speech or the total speech signal of the CM associated with the CM index image or the image 810 already specified by the user selection information 207a to be reproduced from the CM recording unit 205. At step S243, the display processor 801 causes the speech corresponding to the reproduced speech signals to be output from the loudspeaker and, at step S244, is at a standby state to await the command input from the user 209.

If the user selection information 207a specifies the previous page icon 813, the display processor 801 causes the audio and video signals of the CM corresponding to the CM index information or the image 810 of the display image, displayed directly previously, to be reproduced from the CM recording unit 205. At step S243, the display processor 801 causes the display image corresponding to the reproduced image signals to be demonstrated on the display unit 802. At step S244, the display processor 801 is at a standby state to await a command input from the user 209.

If the user selection information 207a specifies the next page icon 814, the display processor 801 causes the audio and video signals of the CM corresponding to the CM index information or the image 810 of the display image, displayed next, to be reproduced from the CM recording unit 205. At step S243, the display processor 801 causes the display image corresponding to the reproduced image signals to be demonstrated on the display unit 802. At step S244, the display processor 801 is at a standby state to await a command input from the user 209. 75.

The above-described sequence of operations is repeated subsequently.

Reverting to FIG. 26, a feature vector V of the respective CMs recorded in the CM recording unit 205 is routed to a feature comparator 204 as a signal 205b.

The feature comparator 204 reads out each feature vector V of each CM, recorded on the CM recording unit 205, with a readout control signal 204a. The feature comparator 204 verifies whether or not the respective CMs are identical, using a feature vector $V_i$ read out from the CM recording unit 205, i being an index (variable) for distinguishing the CMs. The manner of comparison between the feature vector $V_i$ and the feature vector $V_j$ in the feature comparator 204 is as follows:

First, evaluation functions J(i, j) are calculated by the following equation (37):

$$J(i, j) = |V_i - V_j|^2 = \sum_{n=0}^{N-1} |V_i[n] - V_j[n]|^2. \quad (37)$$

Then, J(i, j) is compared to a pre-set threshold $J_{thsd}$. The CMs are verified to be the same or different if the J(i, j) is not larger than or larger than $J_{thsd}$, respectively. Such comparison is effected for the totality of the CMs recorded in the CM recording unit 205. This removes signals pertinent to the same CM among the signals recorded in the CM recording unit 205.

Figure 35:
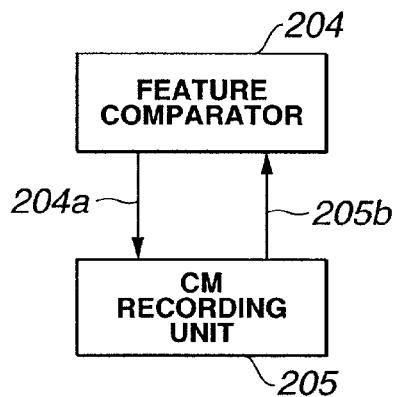
FIG. 35 is a schematic block diagram of a subset of the CM recording unit and a feature comparator unit in the CM detection/accumulation/browsing/retrieval unit.
Figure 36:
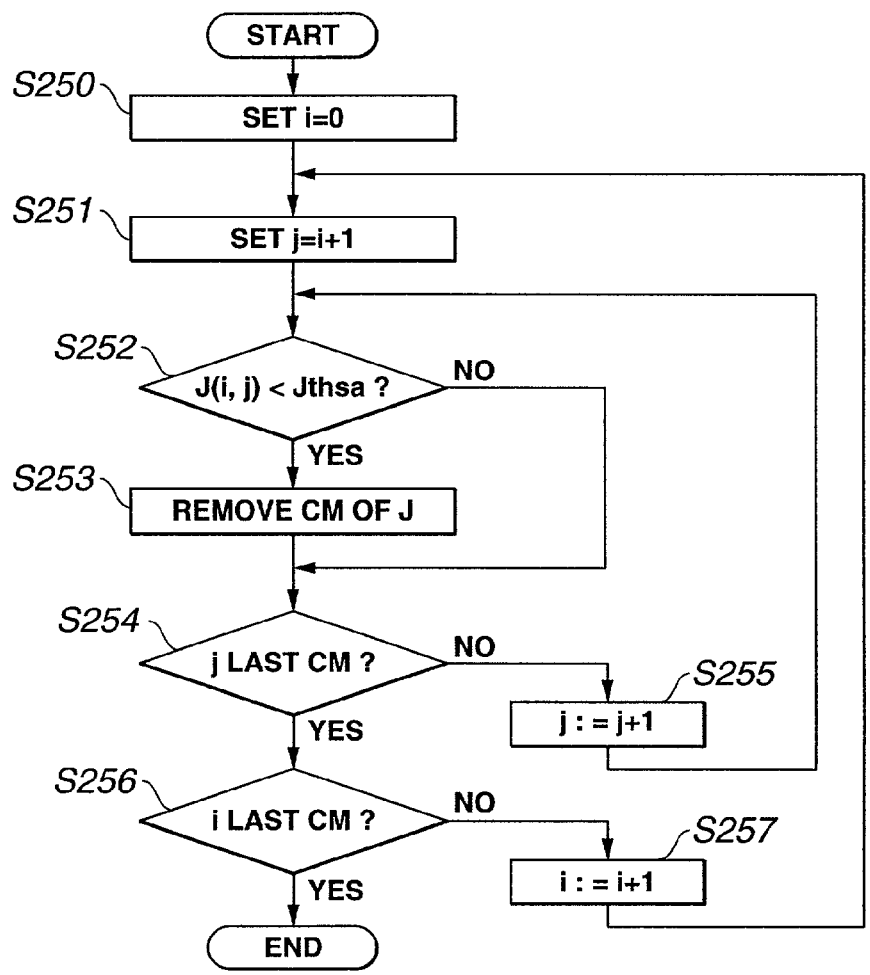
FIG. 36 is a flowchart showing the flow of operations in the subset of FIG. 35.

FIG. 35 shows a subset comprised of the CM recording unit 205 and the feature comparator 204. FIG. 36 shows the flow of operations especially of the feature comparator 204 of the subset of FIG. 35 in the form of a flowchart.

Referring to FIG. 36, the feature comparator 204 at step S250 sets the index variable i to 0 and, at step S251, sets the index variable j to i+1.

The feature comparator 204 at step S252 calculates an evaluation function J(i,j) from the feature vector $V_i$ and $V_j$ to compare the evaluation function to the pre-set threshold $J_{thsd}$. If, as the result of comparison, the evaluation function is smaller than the threshold value (YES), the CMs are verified to be the same CM, so that, at step S253, the CM represented by the feature vector $V_j$ is removed from CM recording unit 205. If, as the result of comparison, the evaluation function is not smaller than the threshold value (NO), the CMs are verified to be different CMs and processing transfers to the next step S254.

At step S254, the feature comparator 204 checks whether or not the CM number j is the last one among the CMs being checked. If it is verified that the CM is not the last CM (NO), j is incremented at step S255 to then revert to comparison with the threshold value at step S252. If the CM is verified to be the last CM (YES), the feature comparator 204 checks whether or not the CM number i is the last one among the CMs being checked. If it is verified that the CM is not the last CM (NO), i is incremented at step S257 to return to the j set of step S251. If the CM is the last CM (YES), the processing is terminated.

Figure 37:
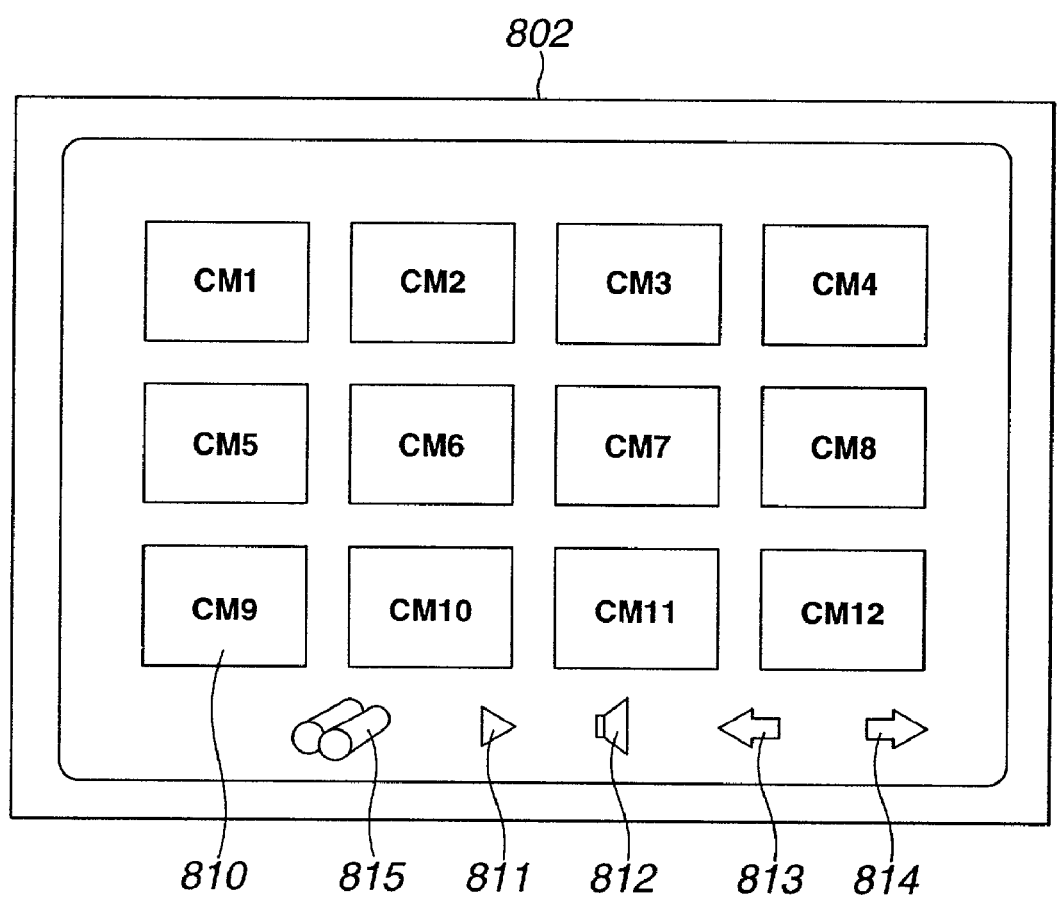
FIG. 37 shows another illustrative display picture of the display unit displaying retrieval icons.

In the CM detection/storage/browsing/retrieval unit 331 of the present embodiment, a retrieval icon is added to the illustrative display image of the display unit 802 of FIG. 32, so that, if the user is desirous to retrieve a CM, the CM desired by the user can be retrieved on simply pointing to the retrieval icon. FIG. 37 shows an illustrative display image on the display unit 802 on which a retrieval icon 805 is additionally demonstrated. Referring to the illustrative display image of FIG. 37, the operation of the CM recording unit 205, feature comparator 204, CM browsing unit 208, CM index generating unit 206 and the CM selection unit 207 is hereinafter explained.

If the retrieval icon 815 is specified by the user 209, the CM selection unit 207 generates the user selection information 207a corresponding to the user selection to send the user selection information 207a to the CM browsing unit 208 and to the feature comparator 204.

When fed with the user selection information 207a, the feature comparator 204 retrieves from the CM recording unit 205 such CM having the feature value partially coincident with that of the CM already selected in the CM retrieval information or the image 810.

That is, if an optional CMi is specified by the user selection information 207a from the CM selection unit 207, the feature comparator 204 compares the feature value of the CMi to that of an other CM, that is CMj recorded in the CM recording unit 205.

For this comparison, the evaluation function J' (i,j) of partial domains of CM is calculated in accordance with the equation (38):

$$J'(i, j) = \sum_{n=N_s}^{N_e} |V_i[n] - V_j[n]|^2 \quad (38)$$

where $N_s$ is the number of the first processing frame in the CM partial domain for comparison and $N_e$ is the of number of the last processing frame in the CM partial domain for comparison.

The feature comparator 204 then compares the evaluation function J' (i,j) to a pre-set threshold value J'$_{thsd}$ and, if the function value is larger or smaller than the threshold value J'$_{thsd}$, the feature comparator 204 verifies the feature values to be coincident with each other.

In connection with this comparison, it should be noted that, if the CMs are different, but purveyed by the same sponsor, video/audio signals common to an article of commerce or to a company or organization are sometimes inserted therein to impart the feeling of commonness to the user. The common video/audio signals are of a duration of approximately one second in many cases. So, if $N_e=N-1$ is the last frame number of the CM domain and $N_s$ is the processing frame onesecond before the last frame, to specify a CM, it becomes possible to retrieve the totality of the CMs furnished by the same company.

The evaluation function J' (i,j) in comparing the feature values may be set as in the following equation (39):

$$J'(i, j) = \text{Min}_s \sum_{n=sN_w}^{(s+1)N_w} |V_i[n] - V_j[n]|^2 \quad (39)$$

where $N_w$ is a length of a domain for coincidence retrieval, s is an index number for shifting the partial coincidence retrieval domain from the beginning to the end of the CM domain and Min$_s$( ) is a value of the smallest one of the index numbers s. In this case, it may also be effective to use only the feature values pertinent to the speech A[n], F[k; n], P[k; n] while removing the feature values pertinent to the image $H_1[n]$, $H_C[n]$, B[n], D[n] and C[n] in the vector V[n].

With the use of this function, it is possible to retrieve the CMs among the CMs having coincident portions. This enables retrieval of the CMs having the same music as the background music. For example, if the same company or organization is furnishing several CMs of a continuing nature, the same background music may be used in many cases in order to impart the feeling of commonness to the user. Therefore, the above function is effective in retrieving the CMs created to have continuing nature.

The evaluation functions J (i,j), J' (i,j) are sometimes referred to as the degree of similarity of two CMs.

The images and the speech signals of the CM, thus retrieved from the CM recording unit 205, are sent as the recording part-replay signals 205a to the CM browsing unit 208.

The CM index generating unit 206 generates at this time the retrieval information of the CMs having the coincident feature values, and sends the retrieval information 206a to the CM browsing unit 208.

This permits the CM browsing unit 208 to display the image of the retrieved CM to enable the speech to be reproduced.

Figure 38:
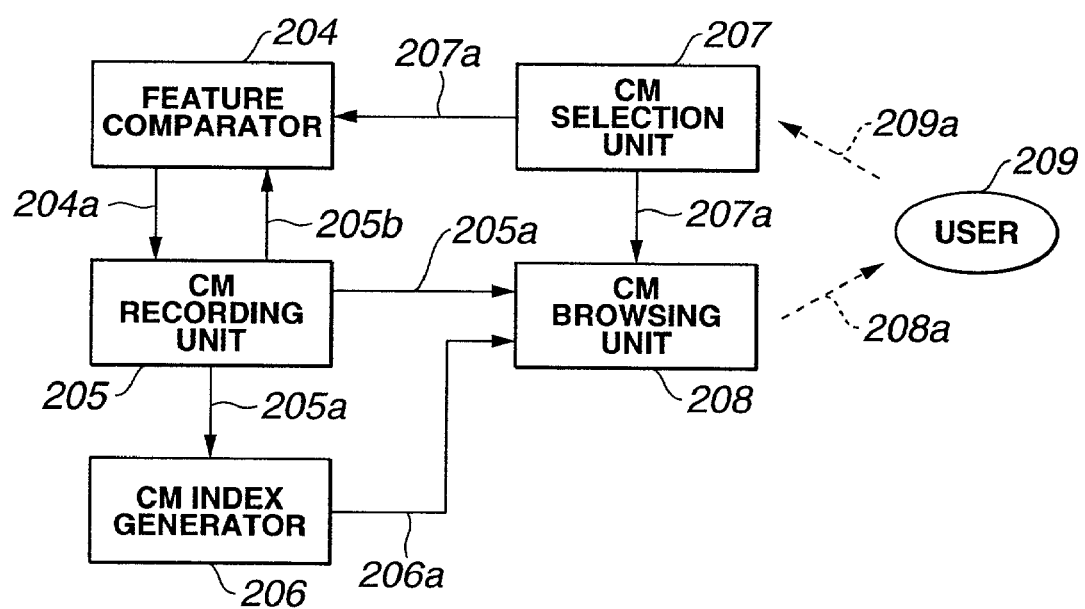
FIG. 38 is a schematic block diagram of a subset of the CM recording unit, feature comparator unit, CM retrieval generating unit, CM browsing unit and the CM selection unit in the CM detection/accumulation/browsing/retrieval unit.
Figure 39:
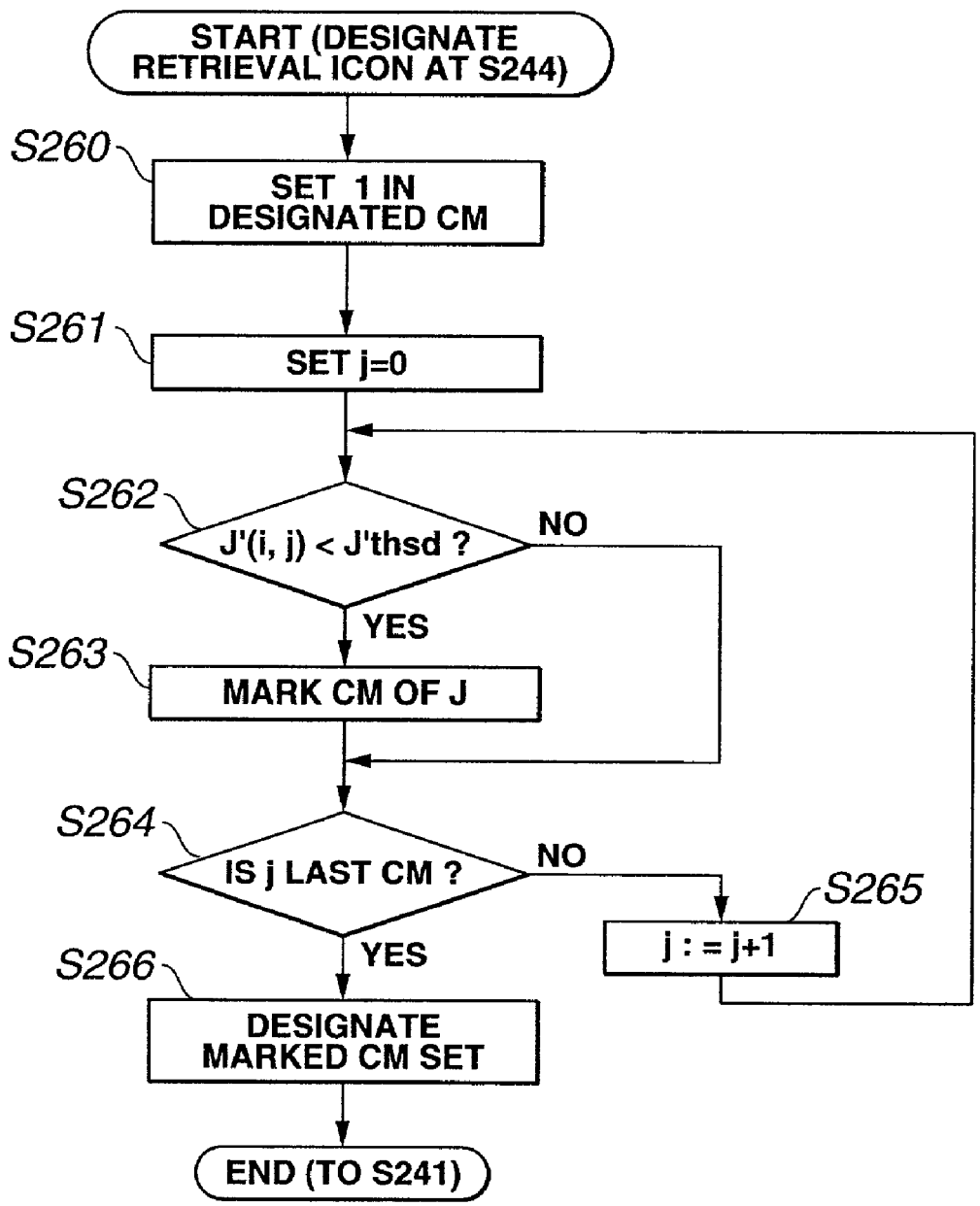
FIG. 39 is a flowchart showing the flow of operation in the subset of FIG. 38.

FIG. 38 shows a subset made up of components extracted from the structure of FIG. 26 for implementing the CM retrieval, namely the CM recording unit 205, feature comparator 204, CM index generating unit 206, CM browsing unit 208 and the CM selection unit 207. FIG. 39 shows a flowchart illustrating the flow of operations of the subset portions shown in FIG. 39, in particular the feature comparator 204. Meanwhile, the flowchart of FIG. 39 corresponds to the processing downstream of the step S244 of the flowchart of FIG. 34.

Referring to FIG. 39, if, in the user command awaiting state of step S244 of the flowchart of FIG. 34, the user selection information 207a specifies a CM retrieval icon 815, the feature comparator 204 at step S260 sets the index variable i in the selected CM index, and sets the index variable j at step S261 to 0.

The feature comparator 204 then calculates, at step S262, the evaluation function J' (i,j) from the feature vector $V_i$, $V_j$ for comparison to the pre-set threshold J'$_{thsd}$. If the evaluation function J' (i,j) is verified to be smaller than J'$_{thsd}$ (YES), a CM in question is verified to be a similar CM and, at step S263, the CM represented by the feature vector $V_j$ is marked. If the evaluation function J' (i,j) is verified not to be smaller than J'$_{thsd}$ (NO), it is verified that the CM being checked is not similar. The feature comparator 204 then proceeds to step S294.

At step S264, the feature comparator 204 checks whether or not j is the last CM number among the CMs in question. If j is verified not to be the last CM (NO), j is incremented at step S265. The feature comparator 204 then reverts to step S262 to make comparison with the threshold value again. If j is the last CM (YES), the feature comparator 204 at step S266 collectively specifies the marked CM set. The feature comparator 204 then reverts to step S241 shown in FIG. 34, that is to the processing of acquiring signals of the specified CM set, from the CM recording unit 205.

Meanwhile, it is also possible in the present embodiment not to remove the same CMs as described above but to store all the CMs and to effect retrieval based on the coincidence of the totality of the CM domains to retrieve the number of times and time point of the same CMs being aired.

With the CM detection/storage/browsing/retrieval unit 331 of the present embodiment described above, it is possible to extract and store only the CM portions from the aired signals, whereby it is possible to furnish a database apparatus adapted for storing only the CM portions without recording the program portions.

Moreover, with the CM detection/storage/browsing/retrieval unit 331 of the present embodiment, described above, it is possible to extract and store feature values only of the CM portions from the aired signals, and the feature values characterizing the CM portions, whereby it is possible to furnish a database apparatus adapted for storing only the CM portions and the feature values without recording the program portions. These feature values are useful in particular in retrieving the same or analogous CMs.

With the CM detection/storage/browsing/retrieval unit 331 of the present embodiment, described above, it is possible to display and browse the CMs stored as described above, whereby it is possible for the audience (user) to display, reproduce and retrieve the list of the stored CMs. This is meritorious in searching for and viewing the CM.

With the CM detection/storage/browsing/retrieval unit 331 of the present embodiment, described above, it is possible to remove the same CMs from the stored CMs to save the storage capacity as well as to save the labor of browsing the same CM a number of times.

With the CM detection/storage/browsing/retrieval unit 331 of the present embodiment, it is possible to retrieve similar CMs and to retrieve and display e.g., the CMs of the same article of commerce and the same purveyor from the stored CMs extremely readily.

With the CM detection/storage/browsing/retrieval unit 331 of the present embodiment, it is possible to retrieve the CMs having the coincident last CM portion. That is, since the image or speech common to the article of commerce or to the company or organization is contained in many cases in the last portion of the CM, such retrieval renders it possible to retrieve the CMs of the same article of commerce or sponsors extremely easily.

Moreover, with the CM detection/storage/browsing/retrieval unit 331 of the present embodiment, it is possible to retrieve the CMs having the common background music. That is, since the same background music is frequently used in the CM created by the same sponsor or for the same article of commerce with a continuing nature, it becomes possible to retrieve and display the CMs created with continuity.

Finally, with the CM detection/storage/browsing/retrieval unit 331 of the present embodiment, it is possible to measure the time point and the number of times of airing of the same CMs. The corresponding apparatus is valuable for the CM author to compare the airing schedule and actual airing.

The CM database prepared by the CM database unit 354 of FIG. 6 is explained hereinafter in detail. FIG. 40 shows schematics of major components of th CM database of the CM database unit 354 embodying the present invention. First, image signals and audio signals 400a and the supplementary information 400b, such as names of articles of commerce, service names, names of organizations, and the aforementioned access site information, for the CM to be registered, referred to below as reference CM, are provided. The image signals and audio signals 400a and the supplementary information 400b for the reference CM, are acquired at the outset a from the broadcasting station or the CM author, or sliced from the broadcast signals, and are input to a reference CM feature extraction unit 401.

The reference CM feature extraction unit 401 extracts the feature values characterizing the CM, referred to below as the reference CM feature value, from the image signals and audio signals 400a of the reference CM, for recording on a CM recording unit 404.

As the feature value characterizing a CM, part or all of physical values derived, from the image and audio signals may be used, as explained previously with reference to FIG. 29 or the equations 14 ff.

The reference CM feature values, extracted by the reference CM feature extraction unit 401, are sent to the CM recording unit 404, along with the supplementary information 400b, for recording therein.

The CM recording unit 404 is a device for recording and/or reproducing signals using one or a combination of different recording mediums, such as a magnetic tape, a magnetic disc, a magneto-optical disc, a recordable optical disc, or a semiconductor memory, and records the aforementioned reference CM feature values or the supplementary information 400b.

Figure 41:
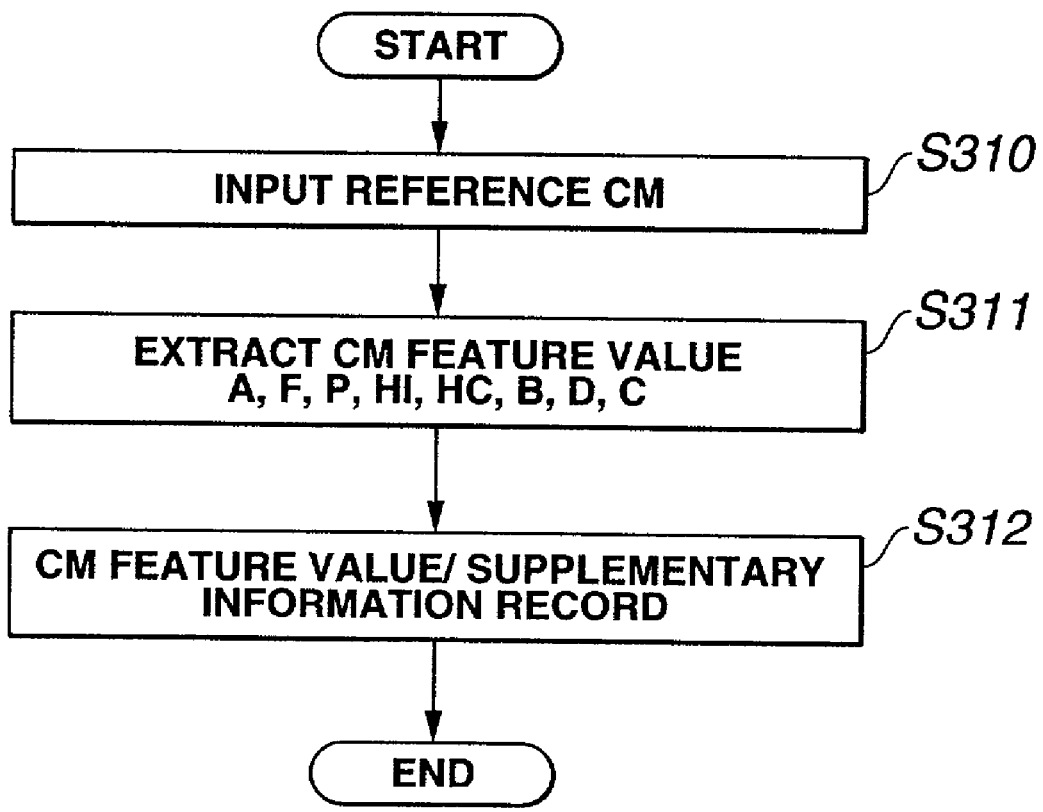
FIG. 41 is a flowchart showing the flow of operation in the preparation of the CM database of the CM database unit of the present system.

FIG. 41 shows a schematic flow of operations for preparing a database in the CM database unit 354.

In FIG. 41, the image signals and audio signals 400a are input at step S310 to the reference CM feature extraction unit 401. At step S311, the reference CM feature extraction unit 401 extracts the feature vector V from the image signals and audio signals 400a. At step S412, the feature vector V of this reference CM is recorded in the CM recording unit 404, along with the supplementary information 400b. Meanwhile, the feature vector V and the supplementary information of the reference CM may also be recorded in the CM recording unit 404 as one of CM descriptors arranged into a data set, as will be explained subsequently.

A CM database unit 354 of the present embodiment, used for referencing the CM database, prepared as described above, will be hereinafter explained.

The CM detection unit 402, similar to one described above, is fed with an aired signal 400c composed of the video signal, audio signal, control signal and the program guide signal. The aired signal 400c is that received through the ground wave broadcasting, satellite broadcasting or, cable broadcasting, or over telephone network. The aired signal 400c may also be these received signals recorded on a distinct recording device and which are subsequently reproduced. The video and audio signals are those signal making up a main portion of the aired signals comprised of the main program and the CM portion. The control signal also includes the information such as the airing mode, airing time, airing frequency or the airing channel. The program guide signals may contain data pertinent to the video and audio signals received from the digital broadcasting or over the telephone network. In the following description, it is assumed that the these signals are those of a sole broadcast program. However, signals of plural channels may also be input simultaneously.

The CM detection unit 402, similar to one described above, detects at least the start time of the CM domain (CM start time) and the length of the CM domain (CM length) from the aired signal 400c composed of the video signal, audio signal, control signal -and the program guide signal, and outputs a CM detection signal 402a containing the CM start time and the CM length. The CM detection signal 402a detected by the CM detection unit 402 is sent to a broadcast CM feature extraction unit 403.

The broadcast CM feature extraction unit 403 is divided separately from the reference CM feature extraction unit 401 only for the sake of illustration. However, it is the same as the reference CM feature extraction unit 401 so, that these may be unified together into one structural unit. However, if the CM detection unit 402 is configured for detecting the CM from the input signal 400c, a certain time delay (time required for CM detection) is caused in the CM detection signal 402a output from the CM detection unit 402. Thus, the broadcast CM feature extraction unit 403 has a temporary storage device, comprised of a storage device, not shown, and absorbs the time offset.

Based on the CM detection signal 402a, furnished from the CM detection unit 402, the broadcast CM feature extraction unit 403 extracts the signal of the CM domain from the aired signal 400c, and extracts the feature vector V from the signal of the CM domain in the same way as in the reference CM feature extraction unit 401. In the following explanation, the CM feature vector extracted by the reference CM feature extraction unit 401 and recorded by the CM recording unit 404 is termed a reference CM feature vector $V_j$ and the feature vector extracted by the broadcast CM feature extraction unit 403 from the aired signal 400c is termed the broadcast CM feature vector $V_i$. The broadcast CM feature vector $V_i$, output from the broadcast CM feature extraction unit 403, is sent to a feature comparator unit 405.

The feature comparator unit 405, which is equivalent to the feature comparator 204, compares the broadcast CM feature vector $V_i$ obtained from the broadcast CM feature extraction unit 403 to the reference CM feature vector $V_j$ recorded in the CM recording unit 404 as above. If, as a result of the comparison, the feature values are the same, the feature comparator unit 405 takes out the airing time and the airing duration of the CM domain corresponding to the broadcast CM feature vector $V_i$ and the supplementary information corresponding to the reference CM feature vector $V_j$ coincident with the broadcast CM feature vector $V_i$ (supplementary information recorded in the CM recording unit 404) as the CM information output.

Thus, the feature comparator unit 405 sequentially compares the feature vector $V_j$ recorded in the CM recording unit 404 (feature value of the reference CM) to the feature vector $V_i$ of the signal in the CM domain extracted from the aired signal 400c (CM feature value in the aired signal). If there is any signal portion the feature vectors of which are verified to be the same, the feature comparator unit 405 outputs the airing time and the airing duration of the CM domain corresponding to the broadcast CM feature vector $V_i$ and the supplementary information corresponding to the reference CM feature vector $V_j$ coincident with the broadcast CM feature vector $V_i$ (information of the CM author, such as the name of the article of commerce, service name or the name of the organization) as the CM information output.

Figure 42:
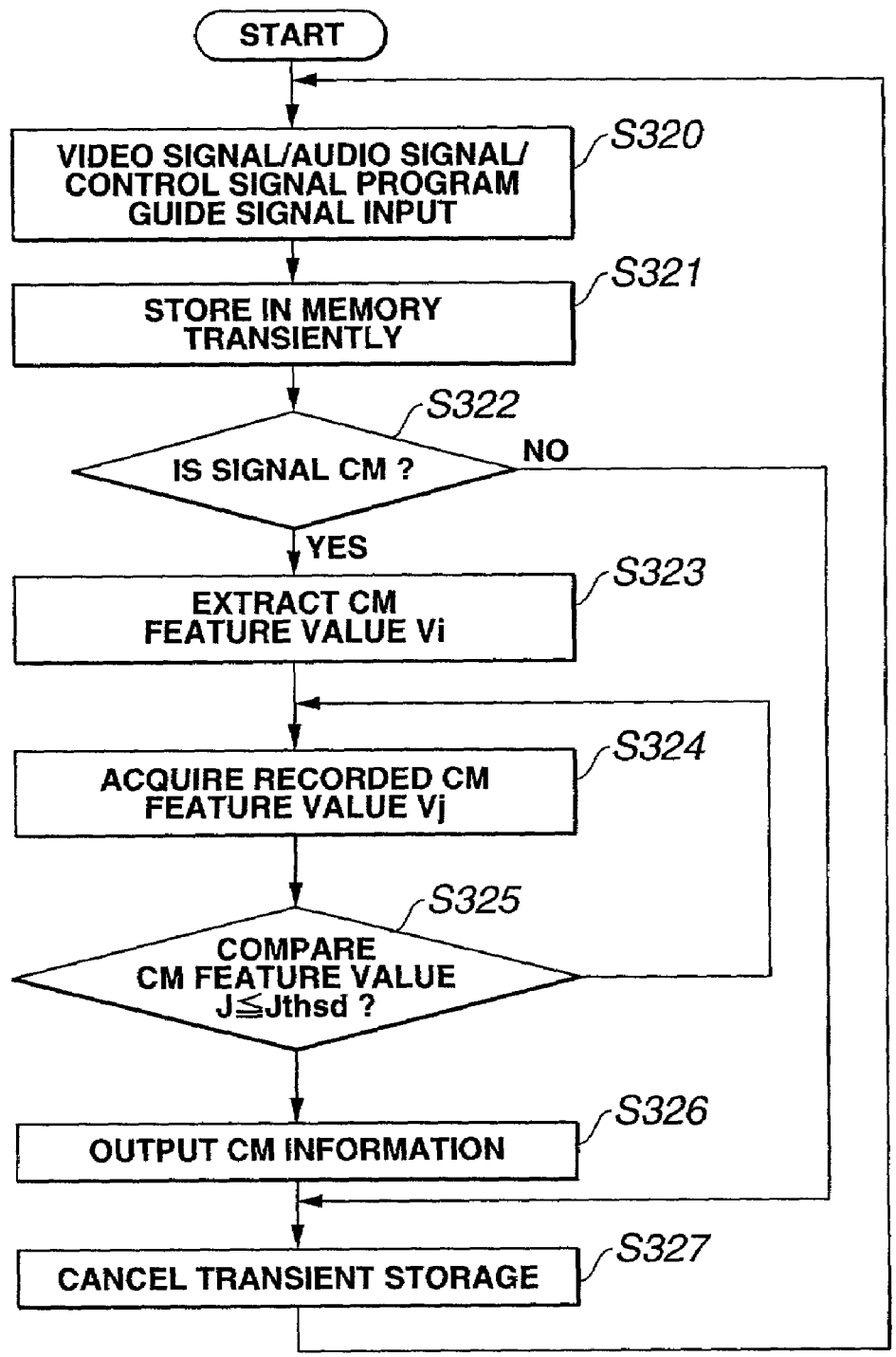
FIG. 42 is a flowchart showing the flow of reference to the CM database.

FIG. 42 shows the flow of operations of the CM detection unit 402, broadcast CM feature extraction unit 403 and the feature comparator unit 405.

In this figure, the CM detection unit 402 and the broadcast CM feature extraction unit 403 at step S320 are fed with the aired signal 400c made up of the video signal/audio signal/control signal/program guide signal.

First, at step S321, the aired signals 400c are transiently stored in a temporary storage device, not shown, in the broadcast CM-feature extraction unit 403, for absorbing the processing delay in the CM detection unit 402. In this CM detection unit 402, it is also checked at step S322 whether or not there is any signal portion suspected to be a CM domain of the aired signal.

If it is verified that the signal portion is not the CM, processing transfers to step S327 to discard the signal transiently stored in the storage device to revert to the processing at step S320. The above-described procedure is repeated. If the signal portion is verified to be the CM (YES), processing transfers to step S323.

At step S323, the broadcast CM feature extraction unit 403 extracts the broadcast CM feature vector $V_i$ which is routed to the feature comparator unit 405.

The feature comparator unit 405 at step S324 acquires the reference CM feature vector $V_j$ associated with the sole CM recorded in the CM recording unit 404.

The feature comparator unit 405 at step S323 calculates the evaluation function J (i,j) and compares the evaluation function J (i,j) to the pre-set threshold $V_{thsd}$ to verify whether or not the broadcast CM feature vector $V_i$ extracted by the broadcast CM feature extraction unit 403 coincides with the reference CM feature vector $V_j$.

If, in the comparative decision at step S323, the evaluation function J (i,j) is verified to be larger than the pre-set threshold $J_{thsd}$ (NO), the feature comparator unit 405 reverts to processing at step S324 to acquire the other reference CM feature vector stored in the CM recording unit 404 to proceed to comparative decision at step S324. If, in the comparative decision at step S323, the evaluation function J (i,j) is verified to be not larger than the pre-set threshold $J_{thsd}$ (YES), the feature comparator unit 405 decides the two CMs as being the same CM to output the CM information 405. At step S327, the feature comparator unit 405 discards the transient storage signal of the transient storage device of the broadcast CM feature extraction unit 403 and, if necessary, repeats the same processing.

The CM information 405a, obtained on generating the CM database as described above and having reference using the database, is sent to e.g., a device 406 having display means for display. This demonstrates a CM, extracted as being coincident with the reference CM, by the airing signal 400c, on the device 406 having display means for display.

If the CM information 405a, obtained as described above, is routed to the device 406 having display means for demonstration, there is recorded the CM, extracted as being coincident with the reference CM, by the airing signal 400c, on the device 406 having display means for demonstration. Thus, in the configuration-of recording the CM coincident with the reference CM, it is possible to extract and record only the CMs from the one-day aired signals.

If the CM information 405a is routed to a device 406 having counting means, and the CMs coincident with the reference CM are extracted from the aired signal 400c and counted, it becomes possible to measure how many times the same CM has been aired in one-day aired signals, by way of measuring the number of times of broadcasting of the same CM.

With the use of the database generating processing of the commercial message in the above-described embodiment, and the referencing processing employing the database, it is possible to generate CM descriptor in which the CM feature values are grouped together with the supplementary information into a data set.

The CM descriptor means a data set having two or more of three description values, namely a description value specifying a CM in time, space or frequency, a description value specifying the CM image signal and/or the speech signal and the description value specifying the meaning and contents of the CM. Since the descriptor associates pre-set entities with expressions of something or associates the different expressions with each other, it is necessary that at least two of the description values be comprised in the descriptor.

In the present embodiment, the description value specifying a CM in time, space or frequency includes the CM airing time, CM airing channel and the airing territory whilst the description value specifying the CM image signal-and/or the speech signal includes the above-mentioned feature values (feature vector V) and the description value specifying the meaning and contents of the CM includes e.g., the name of articles of commerce and service names, names of companies and organizations as well as the access site information which is the destination of inquiries as to the organizations and articles of commerce.

In the present embodiment, the CM start time or channel or the territory code is taken out by the CM detection unit 402 from the aired signal 400c, while the feature values characterizing the CM are taken out by the broadcast CM feature extraction unit 403 and the supplementary information specifying the meaning and contents of the CM is taken out by the reference CM feature extraction unit 401 outputting the supplementary information 400b. Thus, if the information necessary as the descriptor is output in the CM information 405a, it is possible to realize a CM descriptor generating method and apparatus.

According to the embodiment of the present invention, the feature values characterizing the reference CM in a pre-set reference CM can be extracted to form a database. Moreover, with the present embodiment; if the main program and the aired CM portions are separated and detected from the aired signal, the feature values characterizing the aired CM are extracted and the feature values so extracted are compared to the feature values of the reference CM previously registered in the database, it is possible to detect only the CM portion corresponding to the reference CM from the aired signal for storage and demonstration.

Moreover, with the present embodiment, it is possible to generate descriptors specifying the CM video and/or audio signals.

In addition, in the present embodiment, the time point as well as the number of times of airing of pre-registered CMs practically aired can be detected, while the aired CMs can be checked and searched automatically, so that CM sponsors or those engaging in marketing can check or search the aired CMs extremely readily.

What is claimed is:

1. An information transmission/reception system comprising:
    a transmission unit which generates and sends out a transmission signal containing a commercial message;
    a detailed information furnishing unit which furnishes detailed information related to said commercial message including air time, frequency and channel information to a database unit;
    the database unit stores access site information corresponding to said detailed information received from the detailed information furnishing unit in a database on the database unit;
    an access site information furnishing unit which requests a confirmation from said database unit effective to determine whether access site information corresponding to said detailed information is stored in the database unit, and furnishes said access site information if said access site information has been stored in the database unit; and
    a signal processing unit including
        (1) a detecting section which detects said commercial message from said transmission signal sent out from said transmission unit,
        (2) a first connecting section which connects to said access site information furnishing unit,
        (3) a first acquisition section which acquires the access site information corresponding to the commercial message detected by said detecting section from the access site information furnishing unit connected to said first connecting section,
        (4) a second connecting section which connects to an information unit identified by an access site address included in the access site information acquired by said first acquisition section, and
        (5) a second acquisition section which acquires further information related to the commercial message from the information unit based on the air time, frequency and channel of the commercial message.

2. The information transmission/reception system according to claim 1 wherein said commercial message is contained in a broadcast signal of image and/or speech signals.

3. The information transmission/reception system according to claim 1 wherein said access site information is one or a combination of an Internet IP address, a URL, an E-mail address and a telephone number.

4. An information processing apparatus comprising:
    a reception section which receives a transmission signal containing a commercial message;
    a detection section which detects said commercial message from the transmission signal received by said reception section;
    a database section which stores at least the commercial message and access site information received from the detailed information furnishing unit in a database on the database section;
    a first connecting section which connects to an access site information furnishing unit for requesting confirmation that access site information corresponding to the detailed information furnishing unit has been stored in the database on the database section, and for furnishing the access site information and the detailed information related to said commercial message if the access site information has been stored in the database section;
    a first acquisition section which acquires the access site information corresponding to the commercial message detected by said detecting section from said access site information furnishing unit connected to said first connecting section;
    second connecting section which connects to an information unit identified by an access site address included in the access site information acquired by said first acquisition section; and a second acquisition section for acquiring further information related to said commercial message from the information unit based on the air time, frequency and channel of the commercial messages, wherein,
the detailed information corresponds to the commercial message and the access site information.

5. The information transmission/reception system according to claim 4 further comprising:
a storage unit which stores said commercial message detected by said detecting section;
a browsing unit which browses a plurality of said commercial messages stored in said storage unit as necessary; and
a retrieving unit which retrieves a desired commercial message from said plurality of the commercial messages stored in said storage unit.

6. The information processing apparatus according to claim 4 wherein said commercial message is contained in a broadcast signal of image and/or speech signals.

7. The information processing apparatus according to claim 4 wherein said access site information is one or a combination of an Internet IP address, a URL, an E-mail address and a telephone number.

8. An information processing apparatus comprising:
a database section which stores at least a commercial message sent out as a transmission signal, and access site information corresponding to detailed information furnishing unit which finishes detailed information related to said commercial message;
a reception section which receives the transmission signal containing said commercial message;
a detection section which extracts said commercial message from the transmission signal received by said reception section and which detects transmission time of said commercial message in said transmission signal and a frequency and a transmission channel of said transmission signal;
a database referencing unit which references said commercial message stored in said database section on the database referencing unit, based on said commercial message detected by said detecting section, and for correlating said commercial message stored in said database section and the transmission time and the frequency or the transmission channel of said transmission signal with said access site information stored in the database section; and
access site information furnishing unit which requests confirmation from database unit effective to determine whether said access site information has been stored, and which furnishes said access site information if said access site information has been stored;
an information unit which acquires further information related to said commercial message based on the air time, frequency and channel of the transmission signal,
a connection unit which connects to the information unit identified by the access site address included in the access site information acquired by said access site information furnishing unit.

9. The information processing apparatus according to claim 8 wherein said commercial message is contained in a broadcast signal of image and/or speech signals.

10. The information processing apparatus according to claim 8 wherein said access site information is one or a combination of an Internet IP address, a URL, an E-mail address and a telephone number.

11. An information transmission/reception system comprising:
detailed information furnishing unit which furnishes detailed information related to a commercial message;
a database unit which stores at least the commercial message and access site information, in a database on the database unit, which corresponds to detailed information furnishing unit which finishes detailed information related to said commercial message;
a reception section which receives the transmission signal containing said commercial message;
transmission unit which generates and sends out a transmission signal containing said commercial message and access site information corresponding to said detailed information furnishing unit if said access site information has been stored;
signal processing unit including a detecting section which detects said commercial message and the access site information corresponding to said commercial message from said transmission signal sent out from said transmission unit, a connecting section which connects to an information unit identified by an access site address included in the access site information for acquiring the detailed information related to said commercial message detected by said detecting section from said information unit based on the air time, frequency and channel of the commercial message retrieved from the access site information connected to said connecting section; and
access site information furnishing unit which requests confirmation from the database on the database unit effective to determine whether said access site information has been stored, and for furnishing said access site information if said access site information has been stored.

12. The information transmission/reception system according to claim 11 wherein said commercial message is contained in a broadcast signal of image and/or speech signals.

13. The information transmission/reception system according to claim 11 wherein said access site information is one or a combination of an Internet IP address, a URL, an E-mail address and a telephone number.

14. An information processing apparatus comprising:
a reception section which receives a transmission signal containing a commercial message and access site information;
a database section which stores at least the commercial message, and the access site information in a database on the database section;
a detecting section which detects said commercial message and the access site information from the transmission signal received by said reception section;
a connecting section which connects to an information unit based on an information unit address included in the access site information detected by said detecting section; and
an acquisition section which acquires the detailed information related to said commercial message detected by said detecting section from the information unit based on the air time, frequency and channel of the commercial message connected to said connecting section,
wherein,
the information unit furnishes detailed information related to said commercial message if the database section confirms said access site information has been stored in the database section.

15. The information processing apparatus according according to claim 14 comprising:
a storage unit which stores said commercial message detected by said detecting section;

a browsing unit which browses a plurality of said commercial messages stored in said storage unit as necessary; and a retrieval unit which retrieves a desired commercial message from said plurality of the commercial messages stored in said storage unit.

16. The information processing apparatus according to claim 14 wherein said commercial message is contained in a broadcast signal of image and/or speech signals.

17. The information processing apparatus according to claim 14 wherein said access site information is one or a combination of an Internet IP address, a URL, an E-mail address and a telephone number.

18. A method for transmitting/receiving information comprising the steps of:

providing detailed information related to a commercial message;

generating and sending out a transmission signal containing said commercial message;

detecting said commercial message from said transmission signal sent out;

requesting confirmation from the database unit effective to determine whether access site information corresponding to said detailed information is stored in a database on a database unit; and upon determination that said access site information has been stored providing said access site information;

acquiring the access site information corresponding to the detailed information related to said commercial message based on said detected commercial message; and acquiring the detailed information related to the detected commercial message from the information unit based on the air time, frequency and channel of the commercial message, connecting to the information unit identified by an access site address included in the detected access site information.

19. The method for transmitting/receiving the information according to claim 18 further comprising the steps of:

detecting transmission time of said commercial message in said transmission signal and a frequency or a transmission channel of said transmission signal; and acquiring said access site information based on the detected transmission time of said commercial message and the detected frequency or the transmission channel of said transmission signal.

20. The method for transmitting/receiving the information according to claim 18 wherein said commercial message is contained in a broadcast signal of image and/or speech signals.

21. The method for transmitting/receiving the information according to claim 18 wherein said access site information is one or a combination of an Internet IP address, a URL, an E-mail address and a telephone number.

22. An information processing method comprising the steps of:

receiving a transmission signal containing a commercial message;

detecting said commercial message from the received transmission signal;

requesting confirmation from the database unit effective to determine whether access site information corresponding to said detailed information has been stored in a database on a database unit; and upon determination that said access site information has been stored:

connecting to access site information furnishing unit which furnishes access site information corresponding to detailed information furnishing unit which furnishes detailed information related to said commercial message;

acquiring the access site information corresponding to the detected commercial message from the connected access site information furnishing unit;

connecting to said detailed information furnishing unit based on the acquired access site information; and acquiring the detailed information related to the detected commercial message from the connected access site information furnishing unit and based on the air time, frequency and channel of the commercial message.

23. The information processing method according to claim 22 further comprising the steps of:

detecting transmission time of said commercial message in said transmission signal and a frequency or a transmission channel of said transmission signal;

connecting to said access site information furnishing unit; and acquiring said access site information corresponding to the detected transmission time of said commercial message and the detected frequency or transmission channel of said transmission signal.

24. The information processing method according to claim 22 further comprising the steps of:

storing the detected commercial messages;

browsing a plurality of the stored commercial messages as necessary; and retrieving desired commercial messages from the plurality of stored commercial messages.

25. The information processing method according to claim 22 wherein said commercial message is contained in a broadcast signal of image and/or speech signals.

26. The information processing method according to claim 22 wherein said access site information is one or a combination of an Internet IP address, a URL, an E-mail address and a telephone number.

27. An information processing method comprising the steps of:

storing at least a commercial message sent out as a transmission signal and access site information corresponding to detailed information furnishing unit which furnishes detailed information related to said pre-set signal in a database on a database unit;

receiving the transmission signal containing said commercial message;

extracting said commercial message from the received transmission signal and detecting transmission time of said commercial message and a frequency or a channel of said transmission signal;

referencing said stored commercial message based on the extracted commercial message and correlating the transmission time of said stored commercial message and the frequency or channel of said transmission signal with said access site information; and requesting confirmation from the database unit effective to determine whether said access site information has been stored in the database on the database unit, and furnishing said access site information if said access site information has been stored, connecting to an information unit based on the detected commercial message and the detected access site information; and acquiring the detailed information related to the detected commercial message from the connected information unit based on the air time, frequency and channel from said transmission signal.

28. The information processing method according to claim 27 wherein said commercial message is contained in a broadcast signal of image and/or speech signals.

29. The information processing method according to claim 27 wherein said access site information is one or a combination of an Internet IP address, a URL, an E-mail address and a telephone number.

30. The information transmission/reception system according to claim 1 wherein the detecting section detects said commercial message from said transmission signal sent based on at least one transmission property of said commercial message.

31. The information transmission/reception system according to claim 30 wherein the at least one property includes one of a time duration of the commercial message, a sound volume of the commercial message, or image switching in the commercial message.

* * * * *